US012508586B2

(12) United States Patent
Gutierrez et al.

(10) Patent No.: US 12,508,586 B2
(45) Date of Patent: Dec. 30, 2025

(54) UNIFORM FLUID FLOW WITH CONSTANT RESISTANCE AND VELOCITY

(71) Applicant: Plexium, Inc., San Diego, CA (US)

(72) Inventors: Edgar Gutierrez, San Diego, CA (US); Jesse Lu, San Diego, CA (US)

(73) Assignee: Plexium, Inc., San Diego, CA (US)

( * ) Notice: Subject to any disclaimer, the term of this patent is extended or adjusted under 35 U.S.C. 154(b) by 453 days.

(21) Appl. No.: 18/148,323

(22) Filed: Dec. 29, 2022

(65) Prior Publication Data

US 2023/0146199 A1 May 11, 2023

Related U.S. Application Data

(63) Continuation-in-part of application No. 17/364,710, filed on Jun. 30, 2021, now Pat. No. 11,642,675.

(60) Provisional application No. 63/046,500, filed on Jun. 30, 2020.

(51) Int. Cl.
*B01L 3/00* (2006.01)

(52) U.S. Cl.
CPC ..... *B01L 3/5027* (2013.01); *B01L 2300/0809* (2013.01)

(58) Field of Classification Search
CPC ............ B01L 3/5027; B01L 3/502746; B01L 2200/0605
See application file for complete search history.

(56) References Cited

U.S. PATENT DOCUMENTS

| 6,555,389 B1 | 4/2003 | Ullman et al. |
| 7,445,926 B2 | 11/2008 | Mathie et al. |
| 10,202,569 B2 | 2/2019 | Novak et al. |
| 2008/0003142 A1 | 1/2008 | Link et al. |
| 2008/0257754 A1 | 10/2008 | Pugia et al. |
| 2010/0025242 A1 | 2/2010 | Pamula et al. |
| 2011/0263463 A1 | 10/2011 | Rothberg et al. |
| 2013/0210682 A1 | 8/2013 | Eltoukhy et al. |
| 2014/0079602 A1 | 3/2014 | Ono |
| 2018/0015455 A1 | 1/2018 | Levner et al. |

(Continued)

FOREIGN PATENT DOCUMENTS

| EP | 2240600 B1 | 3/2013 |
| WO | WO 2020090481 A1 | 5/2020 |

OTHER PUBLICATIONS

International Search Report and Written Opinion, regarding Application No. PCT/US2021/039839, dated Oct. 5, 2021, 19 pages.

*Primary Examiner* — Natalia Levkovich
(74) *Attorney, Agent, or Firm* — Sheppard Mullin Richter & Hampton LLP

(57) ABSTRACT

A method for fluid transport includes receiving fluid at an inlet port of an inlet. The fluid is outputted through an opening of the inlet into a channel. A first ratio of a first distance to a second distance is substantially equal to a cubic root of a second ratio between a first length dimension and a second length dimension of the inlet, the first distance being measured from an entrance of the inlet port to a first position within the inlet, the second distance being measured from the entrance of the inlet port to a second position within the inlet, the first length dimension and the second length dimension each being measured along a direction orthogonal to a measurement direction along the first distance and the second distance, the first length dimension and the second length dimension being measured at the first position and the second position, respectively.

20 Claims, 43 Drawing Sheets

(56) References Cited

U.S. PATENT DOCUMENTS

2018/0229237 A1 8/2018 Spero et al.
2021/0402404 A1 12/2021 Gutierrez et al.

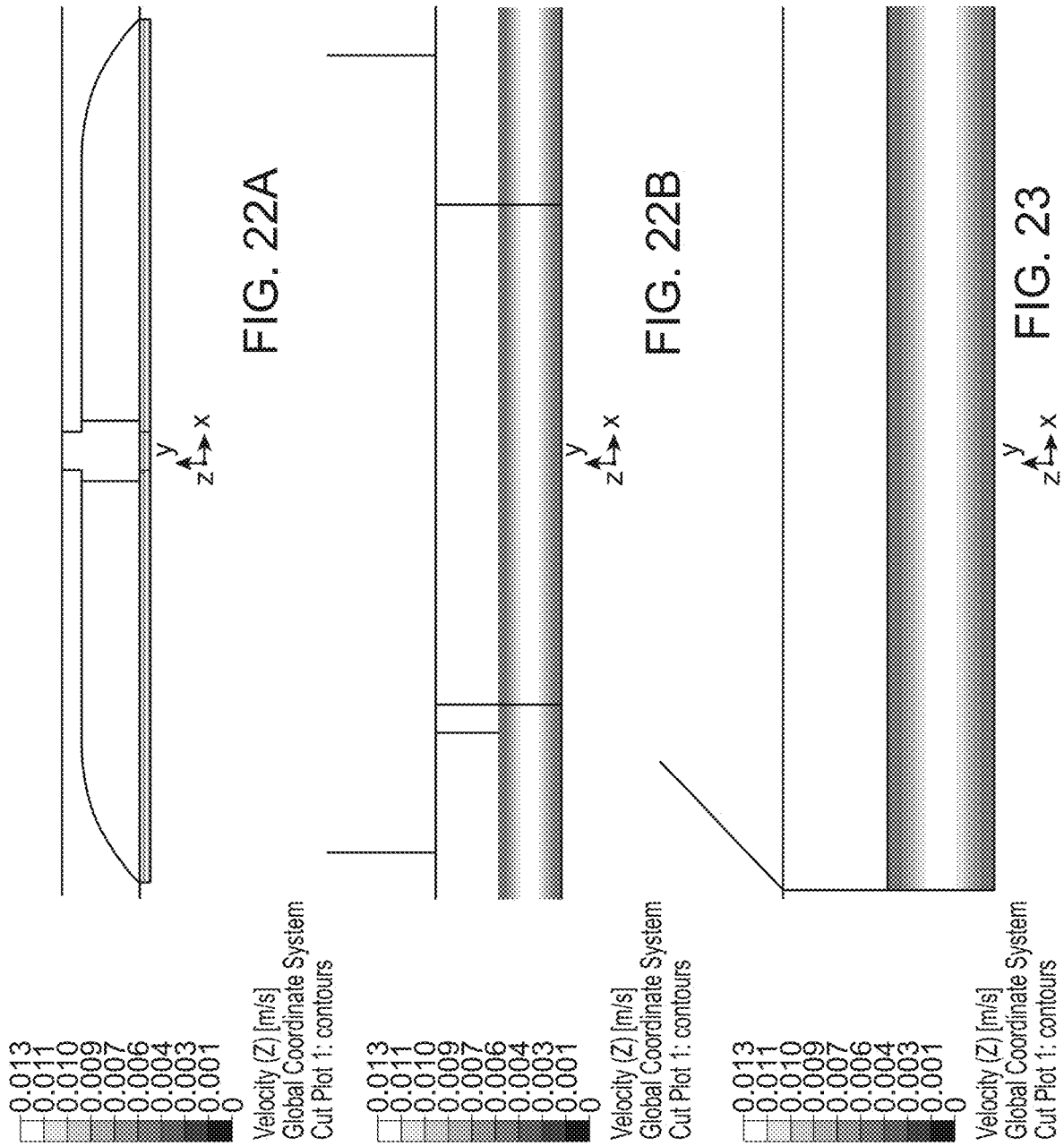

UNIFORM FLUID FLOW WITH CONSTANT RESISTANCE AND VELOCITY

CROSS REFERENCE TO RELATED APPLICATIONS

This application is a continuation-in-part of U.S. application Ser. No. 17/364,710, filed Jun. 30, 2021, which claims priority under 35 U.S.C. § 119(e) to U.S. Provisional Application No. 63/046,500, filed Jun. 30, 2020, which is hereby incorporated by reference in its entirety.

TECHNICAL FIELD

The present disclosure relates to a device and method for fluid transport. Specifically, the present disclosure relates to ultra-high-throughput microfluidic devices and related methods.

BACKGROUND

Developed microfluidic devices and methods involve multiple channels or single channel ports. With both designs, velocity profiles across the channel of fluids passing through the respective devices vary in a predominant direction of flow producing a non-uniform velocity profile. The non-uniform velocity profiles undesirably reduce accuracy of sensors connected to the devices and impede throughput. Additionally, in some developed microfluidic devices, an active sensor area of the device may be separated from the inlet and outlet structures by a distance in channel length direction on the order of several millimeters (about 12 mm in one exemplary device). Further, in some developed microfluidic devices, in part due to the relatively large footprint of the inlet and outlet structures or branched-channel networks, an area of the substrate available for the sensor area is significantly reduced.

The present inventors developed improvements in microfluidics devices and methods that overcome at least the above-referenced problems with the devices of the related art.

SUMMARY

One or more of the following features may be included in any feasible combination.

A device for fluid transport is provided. The device includes an inlet body including an inlet. The device includes a base supporting the inlet body, the base including a channel in fluid communication with the inlet. The device includes an outlet body including an outlet, the base supporting the outlet body, the outlet in fluid communication with the channel. The inlet is configured to receive the fluid at an inlet port. The inlet is configured to output the fluid through an opening in fluid communication with the channel. The inlet is configured to provide substantially uniform flow of the fluid across a substantial portion of at least one dimension of the channel.

The at least one dimension may be one of a vertical plane and a horizontal plane.

The inlet, the channel, and the outlet may be configured to provide substantially uniform flow of the fluid across a substantial portion of a horizontal plane of the channel.

The inlet, the channel, and the outlet may be configured to provide substantially uniform flow of the fluid through a substantial portion of a cubic area within the channel.

The device may be a microfluidic device. The channel may be a microfluidic channel.

The inlet body, the base, and the outlet body may form a unitary body.

The inlet may be a single inlet of the device. The channel may be a single channel of the device. The outlet may be a single outlet of the device.

A ratio of a cross-sectional area of the inlet port to a cross-sectional area of an entrance of the channel may be about 1 to about 7.5.

A ratio of a cross-sectional area of the inlet port to a cross-sectional area of the opening may be about 1 to about 50.

A ratio of a cross-sectional area of the opening to a cross-sectional area of an entrance of the channel may be about 6.67 to about 1.

A ratio of a depth of the inlet port to a depth at an end of the inlet may be about 1 to about 2.

A ratio of a depth of the inlet port to a depth at an end of the inlet to a height at or near the inlet port may be about 1 to about 2 to about 3.

A ratio of a height of the channel to a depth of the inlet port to a depth at an end of the inlet to a height at or near the inlet port may be about 1 to about 4 to about 8 to about 12.

A ratio of a width to a depth of the opening in a horizontal plane may be about 25 to about 1.

A ratio of a width to a height of the channel in a vertical plane may be about 180 to about 1.

A cross-sectional shape of at least one side of the inlet and/or the outlet in a horizontal plane may have a bowtie shape or a Venturi shape, the at least one side facing away from the channel.

Both sides of the inlet and/or the outlet in the horizontal plane may have a bowtie shape or a Venturi shape.

A cross-sectional shape of the inlet and/or the outlet in a vertical plane may be a bow shape or a bracket shape.

A cross-sectional shape of the inlet port in a horizontal plane may be a rectangular shape.

The base may include a parallel plate structure.

The device may be configured to provide substantially uniform flow of the fluid at a volumetric flow rate of between about 1 µL/sec and about 1000 µL/sec.

Additionally, a microfluidic system for fluid transport is provided. The microfluidic system includes a microfluidic device. The microfluidic device includes an inlet body including an inlet. The microfluidic device includes a base supporting the inlet body. The base includes a channel in fluid communication with the inlet. The microfluidic device includes one or more sensors formed on a surface of the channel, or one or more sensors formed in one or more wells formed in the surface of the channel. The microfluidic device includes an outlet body including an outlet, the base supporting the outlet body, the outlet in fluid communication with the channel.

The channel may be configured to facilitate flow of the fluid. The fluid may include a plurality of solid beads, for example, suspended therein. The fluid may include a plurality of suspended cells. The inlet may be configured to receive the fluid at an inlet port. The inlet may be configured to output the fluid through an opening in fluid communication with the channel. The inlet may be configured to provide substantially uniform flow of the fluid across a substantial portion of a horizontal dimension of the channel. The device may be configured to compensate for edge effects otherwise present therein.

Each of the plurality of beads may have a maximum dimension, for example, a width or a diameter, of about 10 μm to about 200 μm.

Each of the plurality of suspended cells may have a maximum dimension, for example, a width or a diameter, of about 10 μm to about 50 μm.

About 100,000 sensors may be formed on the surface of the channel, or about 100,000 sensors may be formed in about 100,000 wells, respectively, the wells being formed in the surface of the channel.

The base may include a parallel plate structure.

The microfluidic device may be configured to provide substantially uniform flow of the fluid at a volumetric flow rate of between about 1 μL/sec and about 1000 μL/sec.

A method for fluid transport is provided. The method includes providing an inlet body including an inlet. The method includes providing a base supporting the inlet body, the base including a channel in fluid communication with the inlet. The method includes providing an outlet body including an outlet, the base supporting the outlet body, the outlet in fluid communication with the channel. The method includes receiving the fluid at an inlet port of the inlet. The method includes outputting the fluid through an opening of the inlet in fluid communication with the channel. The method includes providing, with the inlet, substantially uniform flow of the fluid across a substantial portion of a horizontal dimension of the channel.

The method may include providing, with the inlet, the channel, and the outlet, substantially uniform flow of the fluid across a substantial portion of a horizontal plane of the channel.

The base may include a parallel plate structure.

The method may include providing, with the inlet, the channel, and the outlet, substantially uniform flow of the fluid at a volumetric flow rate of between about 1 μL/sec and about 1000 μL/sec.

A device for fluid transport is provided. The device includes an inlet body including an inlet. The device includes a base supporting the inlet body, the base including a channel in fluid communication with the inlet. The inlet is configured to receive the fluid at an inlet port. The inlet is configured to output the fluid through an opening in fluid communication with the channel. The inlet is configured to provide substantially uniform flow of the fluid across a substantial portion of at least one dimension of the channel.

The inlet is configured to output the fluid through an opening at a bottom portion of the inlet and in fluid communication with the channel.

A first ratio of a first distance to a second distance is substantially equal, to a cubic root of a second ratio between a first length dimension and a second length dimension of the inlet body, the first distance being measured from an entrance of the inlet port to a first position within the inlet body, the second distance being measured from the entrance of the inlet port to a second position within the inlet body, the first length dimension and the second length dimension each being measured along a direction orthogonal to a direction along which the first distance and the second distance are measured, the first length dimension being measured at the first position and the second length dimension being measured at the second position.

A microfluidic system for fluid transport is provided. The microfluidic system includes a microfluidic device. The microfluidic device includes an inlet body including an inlet. The microfluidic device includes a base supporting the inlet body. The base includes a channel in fluid communication with the inlet. The base includes one or more sensors formed on a surface of the channel, or one or more sensors formed in one or more wells formed in the surface of the channel. The channel is configured to facilitate flow of the fluid. The fluid includes a plurality of beads. The fluid includes a plurality of suspended cells. The inlet is configured to receive the fluid at an inlet port. The inlet is configured to output the fluid through an opening in fluid communication with the channel. The inlet is configured to provide substantially uniform flow of the fluid across a substantial portion of a horizontal dimension of the channel. The device is configured to compensate for edge effects otherwise present therein.

These and other capabilities of the disclosed subject matter will be more fully understood after a review of the following figures, detailed description, and claims.

DESCRIPTION OF DRAWINGS

These and other features will be more readily understood from the following detailed description taken in conjunction with the accompanying drawings, in which:

FIG. 22A is a cross-section highlighting velocities of a fluid flowing at a volumetric flow rate of about 100 μL/sec in the XY plane through a first point of the channel of the type-α device according to an exemplary embodiment;

FIG. 22B is a zoomed-in center portion of the bottom of FIG. 22A;

FIG. 23 is a zoomed-in portion of a cross-section highlighting velocities of a fluid flowing at a volumetric flow rate of about 100 μL/sec in the XY plane through a second point of the channel of the type-α device according to an exemplary embodiment;

It is noted that the drawings are not necessarily to scale. The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting exemplary embodiments and that the scope of the present invention is defined solely by the claims.

DETAILED DESCRIPTION

Figure 20:
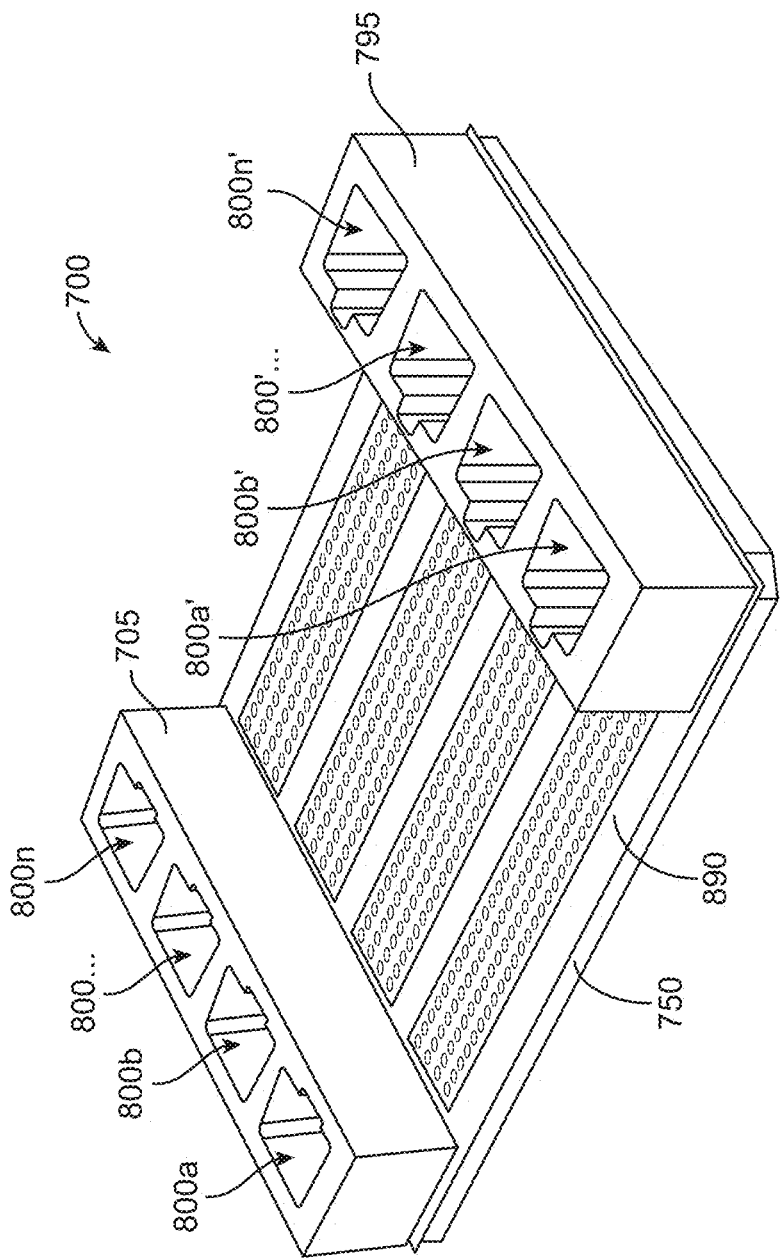
FIG. 20 is a perspective view of a multi-channel microfluidic device according to the related art.

FIG. 20 is a perspective view of a multi-channel microfluidic device 700. The multi-channel microfluidic device 700 includes an inlet body 705, a base 750, an outlet body 795, a plurality of inlets, i.e., 800a, 800b, 800 . . . , and 800n, a plurality of outlets, i.e., 800a', 800b', 800' . . . , and 800n', and a plurality of channels 890 in the base 750, each channel corresponding with the plurality of inlets 800 and outlets 800', respectively. Implementation of the plurality of inlets 800 and outlets 800' (or branched channels) may result in challenges in applications where the channels are not defined by a monolith (e.g., silicone elastomer casts bonded to glass), which is common in research laboratories. In addition, the plurality of inlets 800 and the plurality of outlets 800' may require a significant part of a total area of the device available for an assay. Surface space may be lost in the divisions between channels, and the flow velocity may vary from the center to edge of each channel.

Figure 21:
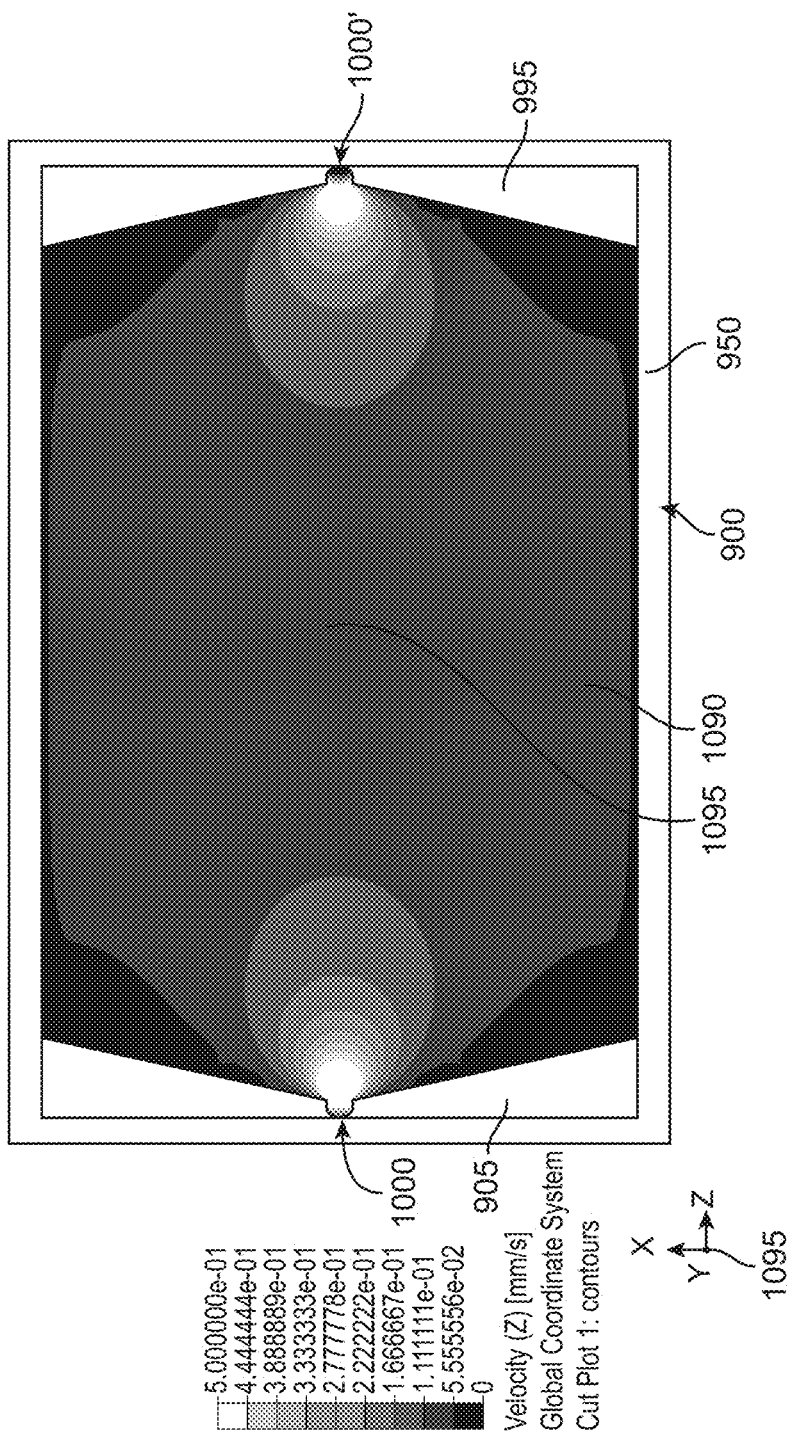
FIG. 21 is a plan wireframe view highlighting velocities of a fluid flowing at a volumetric flow rate of about 1,000 μL/sec in the XZ plane of a conventional channel of a single-channel microfluidic device according to the prior art.

FIG. 21 is a contour plot top-view highlighting velocities of a fluid (e.g., water) flowing at a volumetric flow rate of about 1,000 μL/sec (about 1 mL/sec) in the XZ plane of a channel 1090 of a wide single-channel microfluidic device 900. The single-channel microfluidic device 900 includes an inlet body 905, a base 950, an outlet body 995, a single inlet 1000 within the inlet body 905, a single outlet 1000' within the outlet body 995, and a channel 1090 within the base 950. The single inlet 1000 connects to the channel 1090, which connects to the single outlet 1000'. The single inlet 1000, the channel 1090, and the single outlet 1000' permit fluid to flow through the single-channel microfluidic device 900. As used throughout the present specification, unless noted otherwise, as shown, for example, in FIG. 21, at an approximate center 1095 of the channel 1090, an X-direction corresponds with a width of the device (up and down on the page), a Y-direction corresponds with a height of the device (into and out of the page), and a Z-direction corresponds with the predominant direction of flow (left to right of the page). The approximate center 1095 occurs within the XZ plane of the channel 1090.

In general, fluid enters the single-channel microfluidic device 900 via the single inlet 1000, drops downward in a predominantly negative Y-direction into the channel 1090, flows generally across the channel 1090 in the Z-direction, flows into the single outlet 1000', and rises upward in the predominantly Y-direction out of the single-channel microfluidic device 900. However, due to the single inlet 1000 and the single outlet 1000', substantial portions of the fluid propagate in the positive and negative X-directions particularly near the single inlet 1000 and the single outlet 1000'. The use of the single inlet 1000 and the single outlet 1000' produces non-uniform velocity profiles of fluids flowing through the channel 1090.

In this example, setting the volumetric flow-rate at about 1 mL/sec (roughly the volume occupied by the assay channel, i.e., about 0.675 mL per second), the velocity in the Z-direction of the fluid below or near the single inlet 1000 and the single outlet 1000' is relatively high, i.e., on the order of about 0.4444 mm/sec (shown as "4.444444e-01") to about 0.5000 mm/sec (shown as "5.000000e-01"); whereas, the velocity in the Z-direction of the fluid along edges of the channel 1090 is relatively low, i.e., on the order of about 0.0000 mm/sec to about 0.05556 mm/sec. The velocity in the Z-direction of fluid between the single inlet 1000 and the single outlet 1000' within the channel 1090 varies, as shown, from on the order of about 0.0000 mm/sec to about 0.5000 mm/sec with various increments therebetween, i.e., about 0.05556 mm/sec, about 0.1111 mm/sec, about 0.1667 mm/sec, about 0.2222 mm/sec, about 0.2778 mm/sec, about 0.3333 mm/sec, about 0.3889 mm/sec, and about 0.4444 mm/sec. The velocity in the Z-direction of the fluid near a center 1095 of the channel 1090 is on the order of about 0.05556 mm/sec to about 0.1111 mm/sec. While one may use a device with this design to conduct analysis of the fluid, the effective usable area of the channel 1090 is significantly diminished, particularly if the analysis is sensitive to flow velocity, shear, or medium exchange. In addition, if sensors are provided in the periphery of the channel 1090 and near the single inlet 1000 or the single outlet 1000', the non-uniform velocities in the Z-direction reduce accuracy of sensors in the single-channel microfluidic device 900. Further, even if sensors are provided only in the region of the channel 1090 having the velocity in the Z-direction on the order of about 0.05556 mm/sec to about 0.1111 mm/sec, the velocities in the Z-direction may still be relatively non-uniform within the region and accuracy of sensors in the single-channel microfluidic device 900 is reduced. The relatively higher velocities (and shear stress) in the inlet may destroy living cells if used in the assay.

A microfluidic device including an inlet and an outlet is provided. The microfluidic device may be configured to minimize unused potential active sensor area, maximize uniform flow area in the active sensor area, offset frictional effects at a periphery of a channel in the active sensor area, and/or modify flow through the inlet and outlet structures to promote uniform flow in the channel of the active sensor area.

Each of the inlet and outlet may form an opening for predominantly vertical fluid flow in the Y-direction. Each of the inlet and outlet may be connected to respective ends of a channel for predominantly horizontal fluid flow in the Z-direction. The channel may be configured with sensors and/or wells for analysis. Devices according to the present disclosure may be applied to channels having one or more sensors at the bottom of one or more wells and/or having one or more sensors on relatively flat surfaces at the bottom and/or the top of the channel. Each of the inlet and outlet conduits may change in a length in the Y-direction (the vertical direction in the YZ plane) and a depth in the Z-direction (the horizontal direction in the XZ plane). The inlet conduit geometry may be configured to provide the fluid with a varying resistance along the XY plane before entering the channel. The outlet conduit geometry may be configured in the same way with a varying resistance to receive the fluid exiting the channel along the width in the X-direction at a bottom of the outlet. Each of the inlet and outlet geometry may be configured to minimize a change in a planar (Z-direction) velocity profile upon entering the channel of the device. The inlet geometry may be configured to smoothen the planar velocity profile of the fluid. The inlet geometry may be configured to produce substantially even shear stress on planar walls and surfaces of the channel under laminar flow conditions. Various exemplary embodiments of the microfluidic device may circumvent a need for branched bifurcating channels, which, with developed microfluidic devices, were provided to even out fluid flow across a width of channels.

Additionally, the relatively short length (in the Y-direction) of the inlet relative to the channel may be configured to minimize sedimentation of particles (e.g., beads and cells) in the inlet under sufficiently rapid laminar flow velocity. For example, in some exemplary embodiments, beads may have a maximum dimension of about 25 µm to about 50 µm and suspended cells may have a maximum dimension of about 10 µm to about 30 µm.

Further, the inlet and outlet geometry of the present microfluidic devices may be configured to promote efficient manufacturability. The inlet and outlet geometry may be configured to produce a positive draft angle in the cavity that provides the varying resistance along the XY-plane. The inlet and outlet conduit geometry may be configured to promote large-scale manufacturing through injection molding. The inlet and outlet may be injection molded. The inlet and outlet may be formed as a top piece or pieces separate from the channel. Alternatively, the inlet and outlet may be formed together with a base or substrate enclosing the channel. The inlet, outlet and channel therebetween may be formed by injection molding in a unitary body.

In some exemplary embodiments, a single-channel microfluidic device may be configured with a relatively large sensor region in the channel, with a single inlet and a single outlet (as opposed to multiple inlets and outlets), with each of the single inlet and the single outlet having a relatively minimal footprint with respect to the sensor region, and relatively even flow along the width (X-direction) of the channel. As noted above, some previously developed designs use branched bifurcating channel networks to even out planar velocity profiles, which take up a relatively large part of a total planar surface and which are inherently difficult to manufacture. In addition, the height of developed inlets and outlets is mostly fixed to the height of the channel and relatively short, resulting in undesirable sedimentation of heavy particles (e.g., beads and cells) in the inlets and outlets of developed devices, particularly in regions with relatively slower flow rates. Whereas, the length (in the Y-direction) of the inlet and outlet according to exemplary embodiments of the present disclosure may be roughly an order of magnitude longer than a height of the channel and the length (in the Y-direction) of the inlet and outlet corresponds with a direction of movement of sedimentation in the fluid. Further, the conduit geometry of the inlet and outlet of exemplary embodiments of the present disclosure is configured to produce sufficient flow throughout the inlet and outlet allowing for particles to stay in suspension and reach the channel where surface shear is sufficiently high to promote the flow of particles through the device.

As noted above, in some developed microfluidic devices, the distance in the Z-direction between the inlet and outlet structures and the sensor area was on the order of about 12 mm and only about 50,000 wells were provided in the sensor area. Whereas, with the relatively small footprint of the inlets and outlets of exemplary embodiments of the present disclosure, substantially more wells may be provided in a comparably sized sensor area, e.g., on the order of about 150,000 wells and/or about 150,000 sensors.

In exemplary embodiments, the channel may be a parallel plate microfluidic channel. The following flow equations may be used to quantify attributes of flow through the channel. A volumetric flow of the parallel plate microfluidic channel may be expressed as Equation (1), as follows:

$$Q = \frac{\Delta P \cdot w \cdot h^3}{12 \cdot L \cdot \mu} \tag{1}$$

In the present equations, from a perspective of flow along or across the inlet body 200, in which the predominant direction of flow is along the length, or Y-direction, h=height (Z-direction), w=width (X-direction), L=length (Y-direction) along a predominant direction of flow, µ=viscosity, ΔP=pressure difference, R=resistance, and Q=volumetric flow. Here, the "length," "height," and "width" directions for the inlet body 200 may be different from the "length," "height," and "width" directions for the channel 290 because the predominant direction of fluid flow is different between the inlet body 200 and the channel 290. Please note, in the parallel plate structure, the width (in the X-direction) is significantly greater than the height (in the Z-direction), i.e., w>>h. Here, L denotes or represents a dimension or distance of flow, at a specific point or position within the inlet body 200, in the predominant direction of flow (e.g., how far fluid travels from the inlet port 205 to the specific position), h denotes or represents a dimension, in the height (z-direction), corresponding to the position in which the dimension of flow L is determined, and w represents a dimension in the X-direction, which, here may be constant. The inlet port 205 may be tapered inward or outward, for example, in a x and/or z-direction or dimension.

A flow principle of the parallel plate microfluidic channel may be expressed as Equation (2), as follows:

$$Q = \frac{\Delta P}{R} \quad (2)$$

Flow resistance relations of the parallel plate microfluidic channel may be expressed as Equation (3), as follows:

$$R \propto \frac{L \cdot \mu}{w \cdot h^3} \quad (3)$$

From a perspective of flow along or across the inlet body 200, resistance is strongly dependent on the height (in the Z-direction). Specifically, resistance is inversely proportional to the cubic power of the height (in the Z-direction).

Figure 42A:
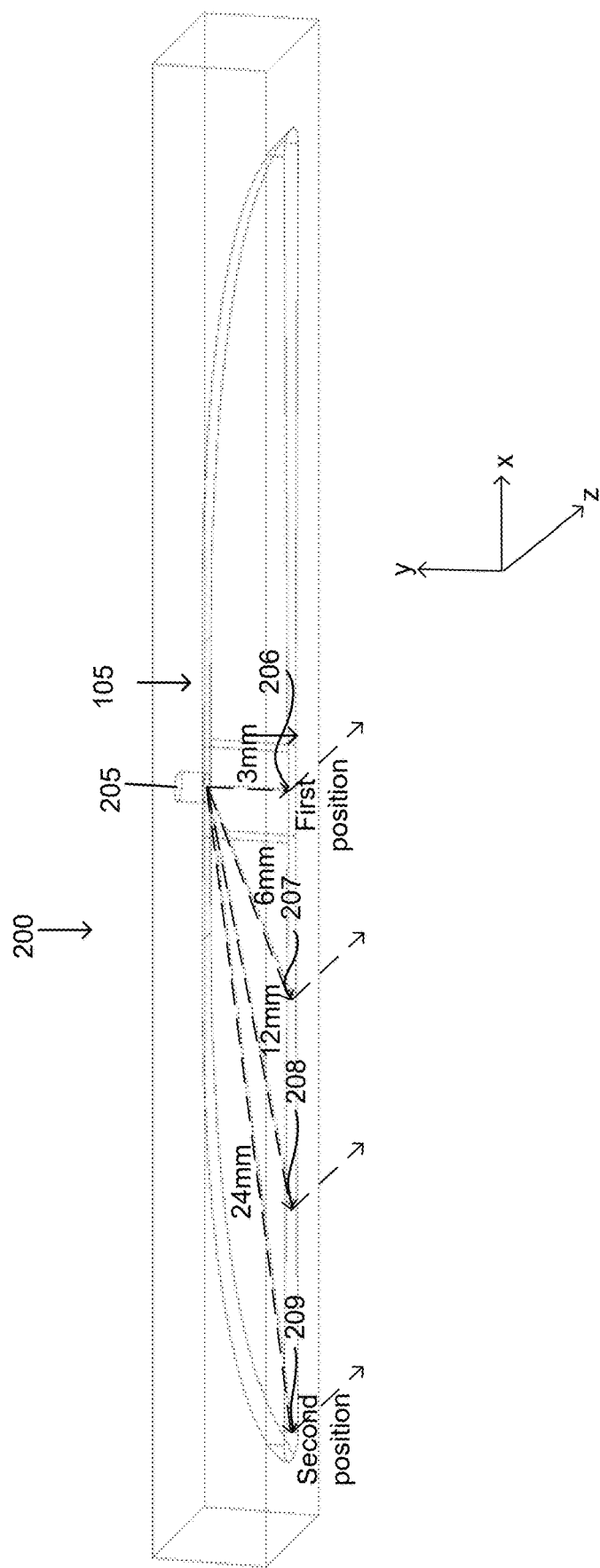
FIGS. 42A-42D, 43-46 are perspective wireframe views of an inlet, as part of a type-alpha (type-α) microfluidic device according to an exemplary embodiment.
Figure 42B:
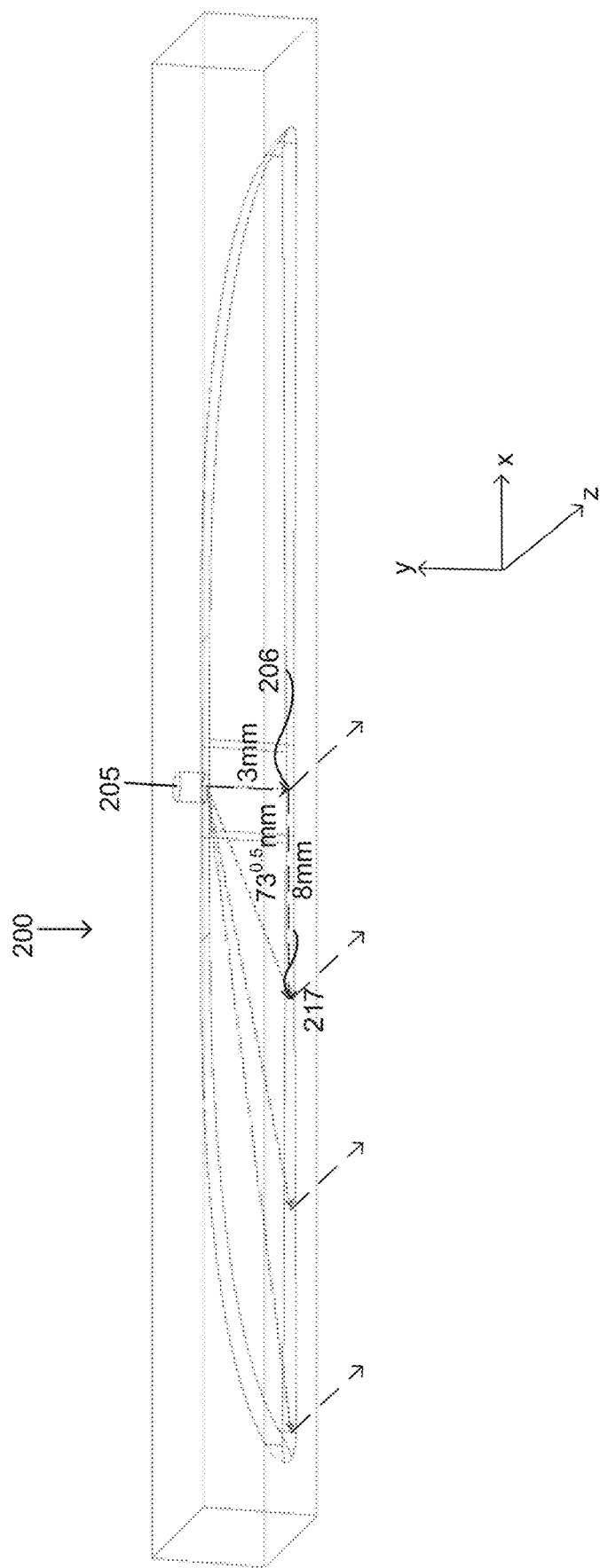
Figure 42C:
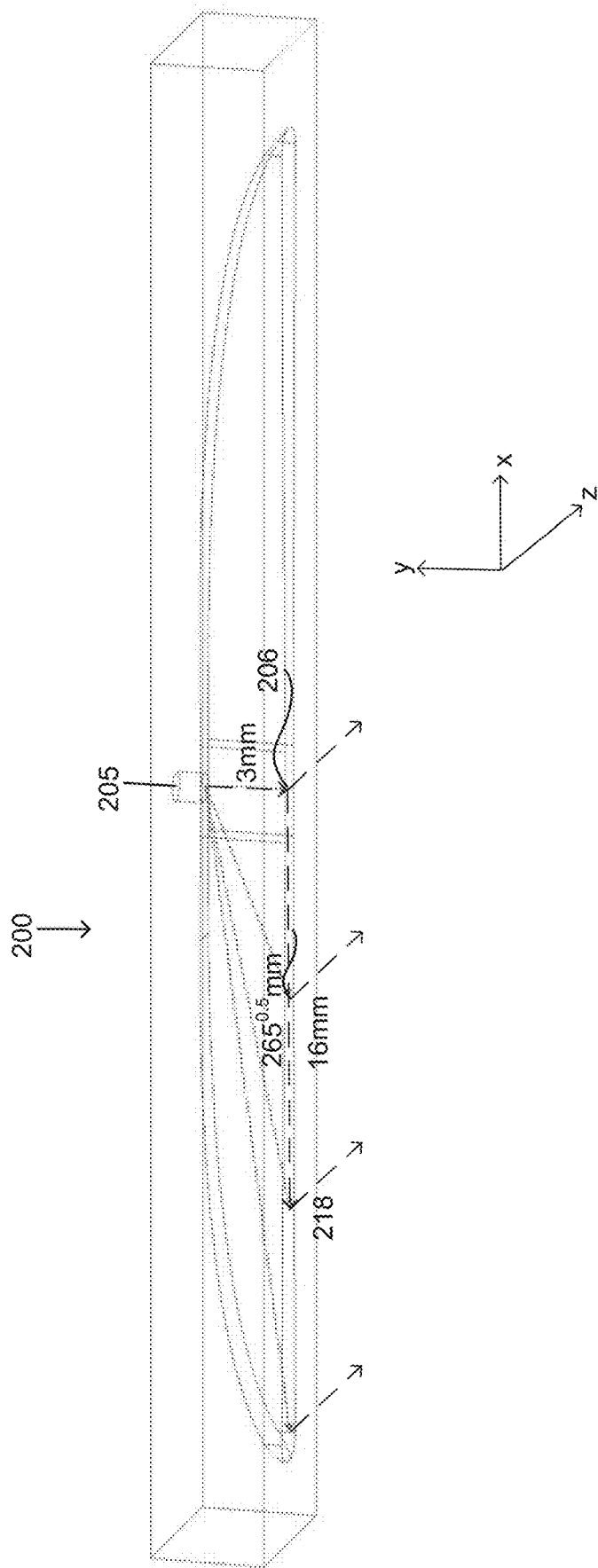
Figure 42D:
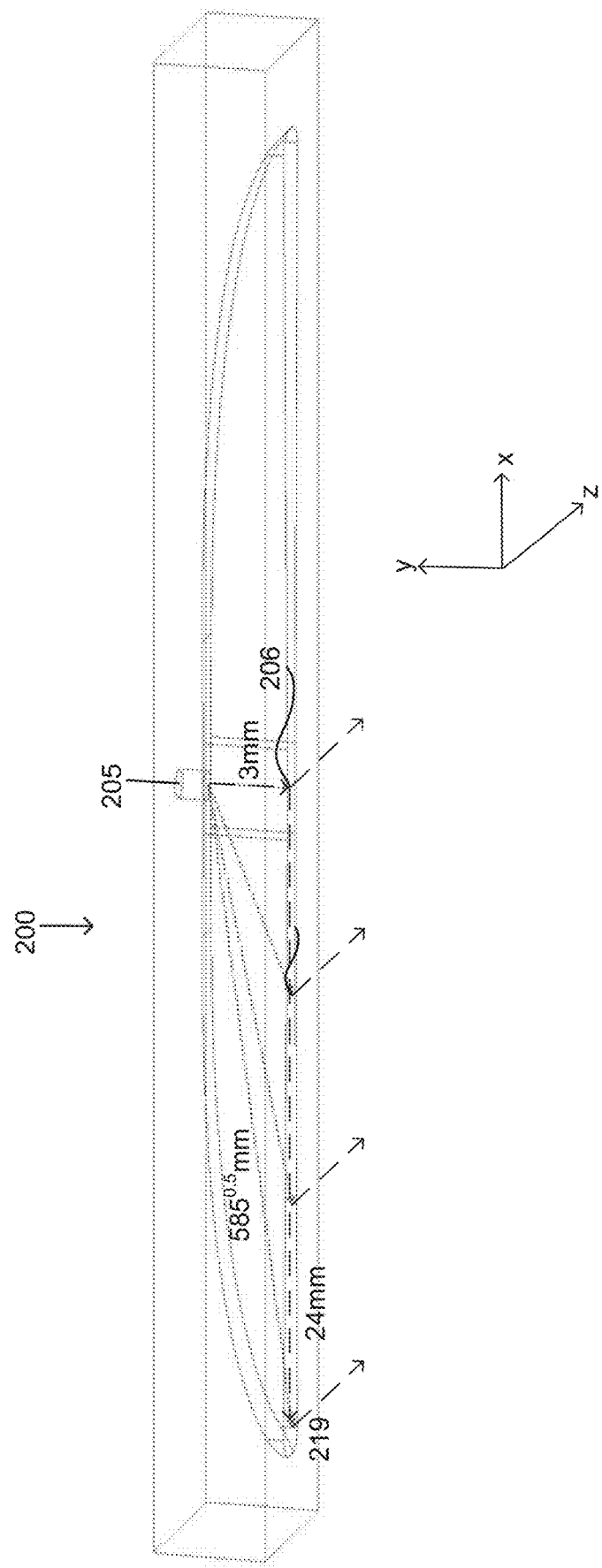
Figure 43:
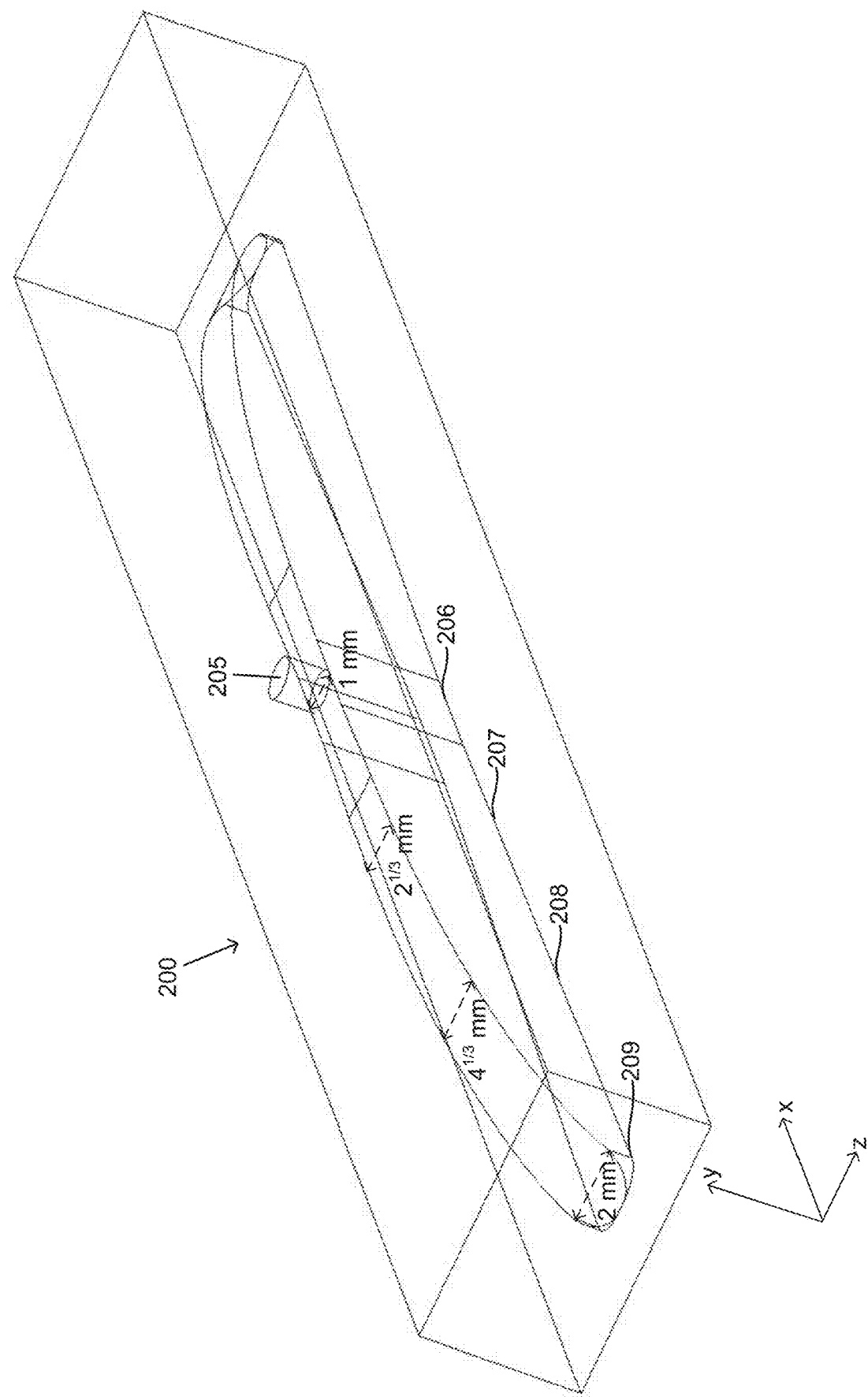
Figure 44:
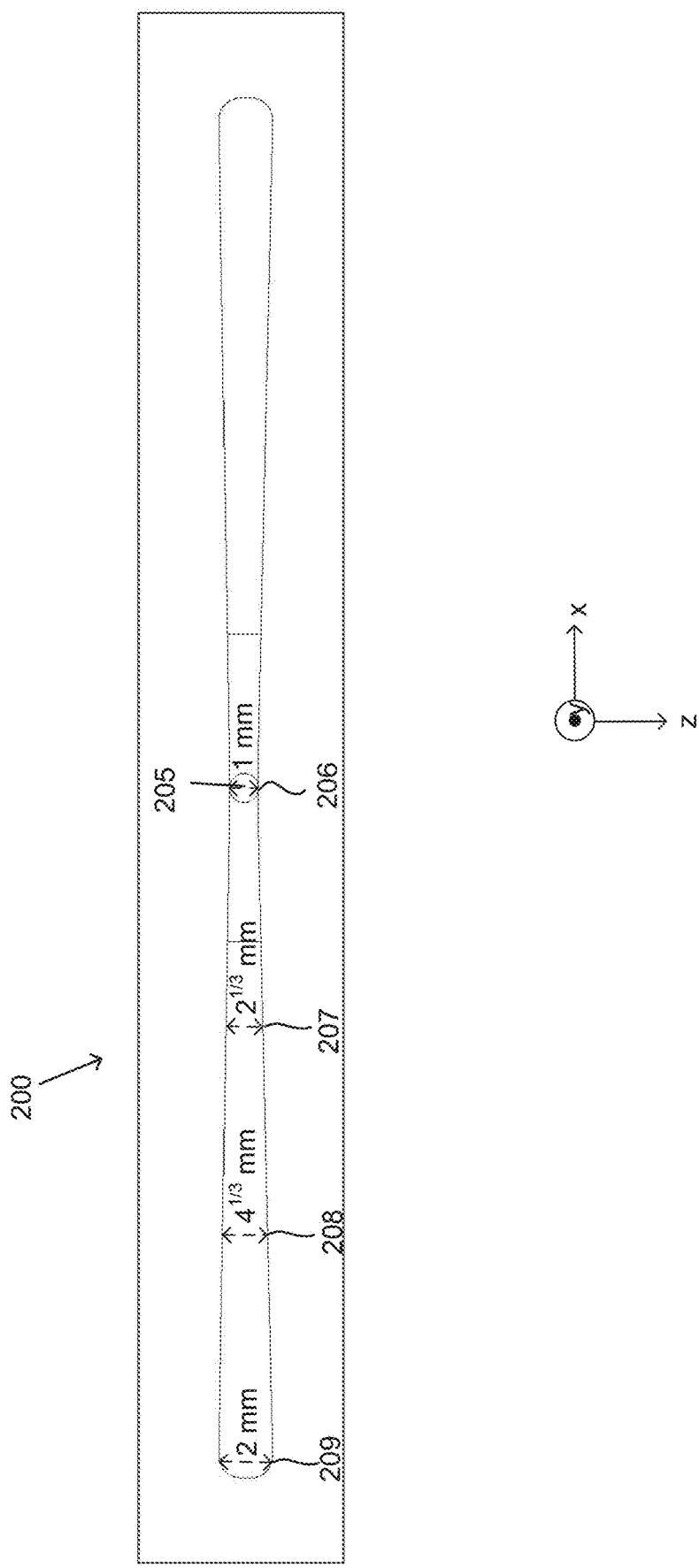

Applying Equation (3), as specific illustrative examples in FIGS. 42A-D, and 43-44, resistances at positions 206, 207, 208, and 209 of the inlet body 200 are approximately constant. Here, approximately may encompass a deviation of no more than +/−five percent, or a deviation or no more than +/−ten percent. Thus, from Equation 3, a ratio of L to $h^3$ is constant at each of the positions 206, 207, 208, and 209. Assume, for the sake of illustration, that at the position 206, L is 3 mm, at the position 207, L is 6 mm, at the position 208, L is 12 mm, and at the position 209, L is 24 mm. In other words, a distance (e.g., hypotenuse or straight line distance, in both the x and y directions) from the inlet port 205 to the position 206 is 3 mm, a distance from the inlet port 205 to the position 207 is 6 mm, a distance from the inlet port 205 to the position 208 is 12 mm, and a distance from the inlet port 205 to the position 209 is 24 mm. Also assume that h at the position 206 is 1 mm. Therefore, in order to satisfy Equation (3), at the position 207, h is $2^{1/3}$ mm, or approximately 1.26 mm, at the position 208, h is $4^{1/3}$ mm, or approximately 1.59 mm, and at the position 209, h is $8^{1/3}$ or 2 mm, as illustrated in FIGS. 43-44, which illustrate perspective and top views of the inlet body 200, respectively. As illustrated in FIG. 42A, as a result of constant resistances at the positions 206, 207, 208, and 209, velocities of the fluid flow from the inlet body, at any position, into the channel 290, may be uniform.

Figure 45:
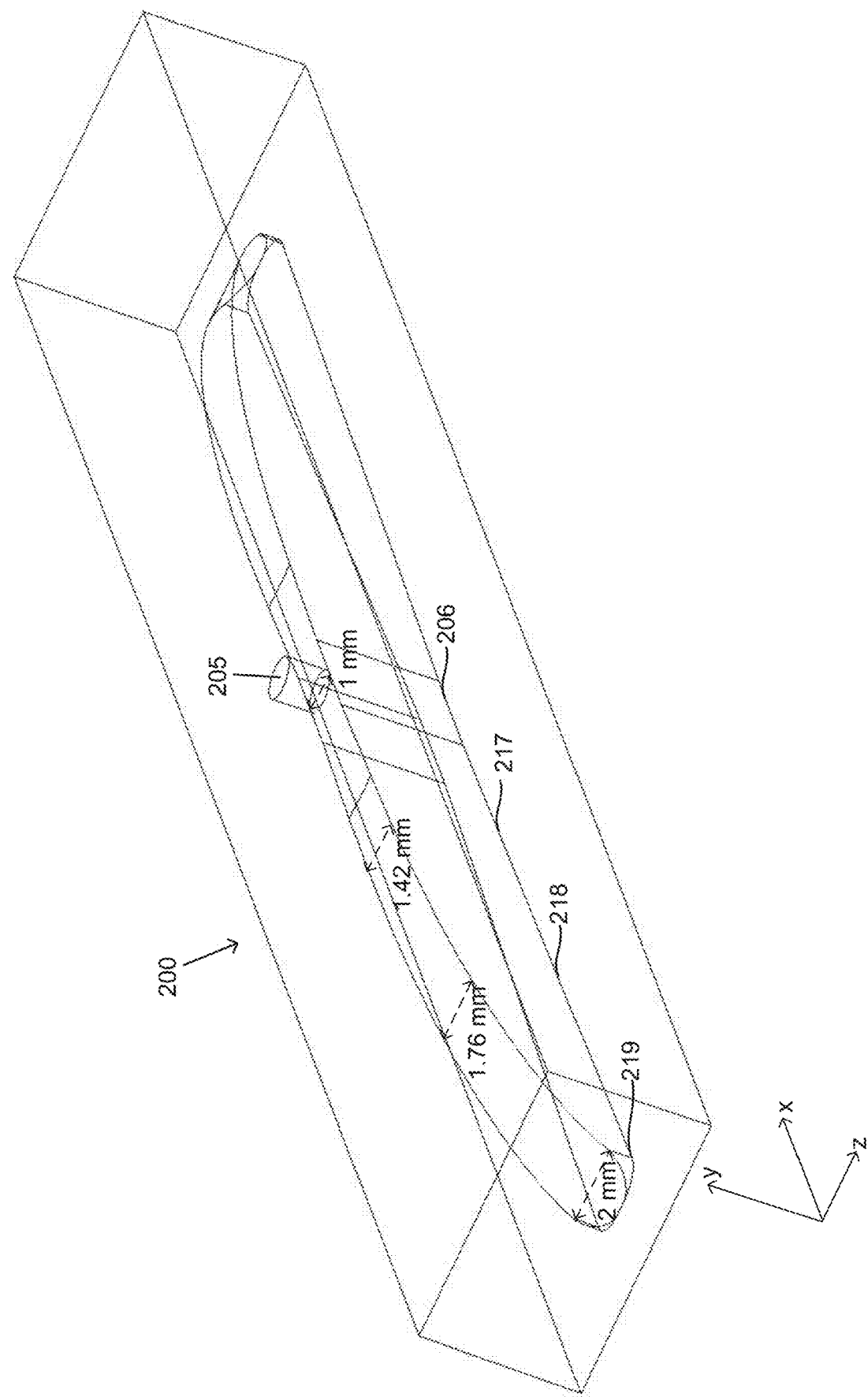

The numerical values are provided solely for elucidation of the concept of application of Equation (3). More generally, $$\frac{L_1}{h_1^3} = \frac{L_2}{h_2^3},$$

where $L_1$ and $L_2$ are distances from the inlet port 205 to a first position at a base of the inlet body 200 and a second position at a base of the inlet body 200, respectively, $h_1$ and $h_2$ are dimensions in a height direction at the first position and the second position, respectively. Assume, in FIGS. 42B-44D, that a x-direction dimension is provided, but not the dimensions of L besides the position 206. In particular, assume that the x-direction dimension from the position 206 to a position 217 is 8 mm, the x-direction dimension from the position 206 to a position 218 is 16 mm, and that the x-direction dimension from the position 206 to a position 219 is 24 mm. Thus, the dimensions of L may be determined or approximated by the Pythagorean theorem. Therefore, if at the position 206, L is 3 mm, at the position 217, L is $73^{1/2}$ or approximately 8.54 mm as illustrated in FIG. 42B, at the position 218, L is $265^{1/2}$ or approximately 16.28 mm, and at the position 219, L is $585^{1/2}$ or approximately 24 mm, while h at the position 206 is 1 mm. Then, at the position 217, h is $$\left(\frac{\sqrt{73}}{3}\right)^{1/3} \text{mm},$$

or approximately 1.42 mm, at the position 218, h is $$\left(\frac{\sqrt{265}}{3}\right)^{1/3} \text{mm},$$

or approximately 1.76 mm, and at the position 219, h is $$\left(\frac{\sqrt{585}}{3}\right)^{1/3} \text{mm}$$

or approximately 2 mm. The dimensions of h at the positions 217, 218, and 219 are illustrated in FIG. 45.

In summary, a first ratio of a first distance to a second distance is substantially equal, approximately equal, or equal to a cubic root of a second ratio between a first length dimension and a second length dimension. The first distance may be measured from an entrance of the inlet port 205 to a first position within the inlet body 200, while the second distance may be measured from the entrance of the inlet port 205 to a second position within the inlet body 200. The first length dimension may correspond to, and be measured at, or directly over (e.g., extending along the y-direction), the first position, while the second length dimension may correspond to, and be measured at, or directly over (e.g., extending along the y-direction), the second position. As a nonlimiting example, the second position may be at an edge of the inlet body 200 farthest from the inlet port 205. The first position may be at a bottom of the inlet body 200 at a location nearest the inlet port 205 (e.g., directly beneath the inlet port 205).

Any structure satisfying the functions and objectives disclosed herein is within the scope of the present disclosure. Below, exemplary embodiments satisfying the functions and objectives disclosed herein are provided in detail; however, the present disclosure is not limited thereto. Although the exemplary embodiments herein are directed to microfluidic applications, the disclosed configurations may be scaled up or down to any suitable scale. Additionally, the exemplary embodiments herein may provide uniform flow of a fluid through and/or over a bed or a horizontal structure of any device. For example, the exemplary embodiments herein may provide uniform flow of a fluid through and/or over a region for causing a catalytic reaction. In some exemplary embodiments, the device may be configured to promote uniform fluid flow through and/or over a catalyst bed.

Type-α Microfluidic Devices

Figure 1:
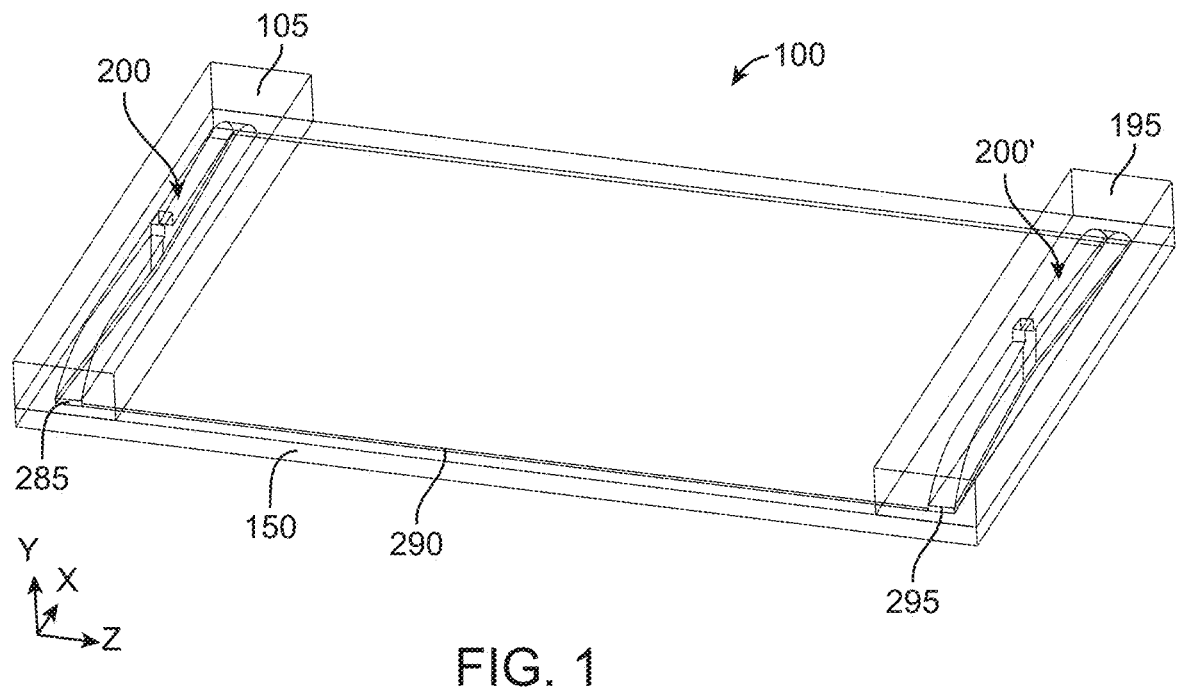
FIG. 1 is a perspective wireframe view of a type-alpha (type-α) microfluidic device according to an exemplary embodiment.

FIG. 1 is a perspective wireframe view of a type-α microfluidic device 100 according to an exemplary embodiment. Please note a convention used herein: reference numbers beginning with odd numbers (e.g., 100, 150, etc.) denote structures, and reference numbers beginning with even numbers (e.g., 200, 290, etc.) denote openings or apertures in the structures (the convention does not apply to process 1100). The type-α microfluidic device 100 may include an inlet body 105, a base 150, and an outlet body 195. Alternatively, the type-α microfluidic device 100 may include only the inlet body 105 and a portion of the base 150, without including the outlet body 195. An inlet 200 may be formed in the inlet body 105. The inlet body 105 may be substantially similar to the outlet body 195. Alternatively, the inlet body 105 may have variations compared to the outlet body 195. The inlet body 105, the base 150, and the outlet body 195 may be a unitary body or separate components. In some exemplary embodiments, the inlet body 105 and the outlet body 195 are interchangeable. In some exemplary embodiments, the inlet 200 and an outlet 200' are substantially identical and interchangeable, only inverted in orientation. The term "inlet" is not intended to be limiting and may, in some exemplary embodiments, be indicative of a direction of fluid flow; reversing the direction of fluid flow may result in reversing the terms "inlet" and "outlet."

Figure 46:
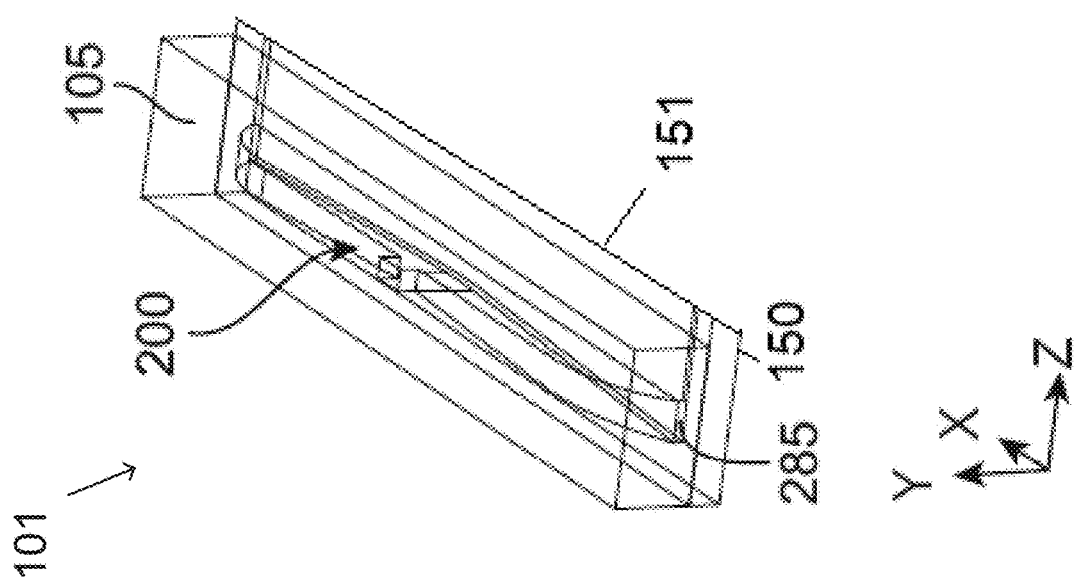

The outlet 200' may be formed in the outlet body 195. The inlet 200 may be substantially similar to the outlet 200'. Alternatively, the inlet 200 may have variations compared to the outlet 200'. A channel 290 may be provided in fluid connection between the inlet 200 and the outlet 200'. An inlet transition 285 may be provided between a bottom opening of the inlet 200 and an inlet side of the channel 290. An outlet transition 295 may be provided between an outlet side of the channel 290 and a bottom opening of the outlet 200'. In scenarios in which the type-α microfluidic device 100 may be modified to include only the inlet body 105 without including the outlet body 195, the type-α microfluidic device 100 may be modified into a modified microfluidic device 101 which includes only a portion of the channel 290, or a partial channel 151, as illustrated in FIG. 46. Alternatively, the modified microfluidic device 101 may not include the channel 290.

Figure 41A:
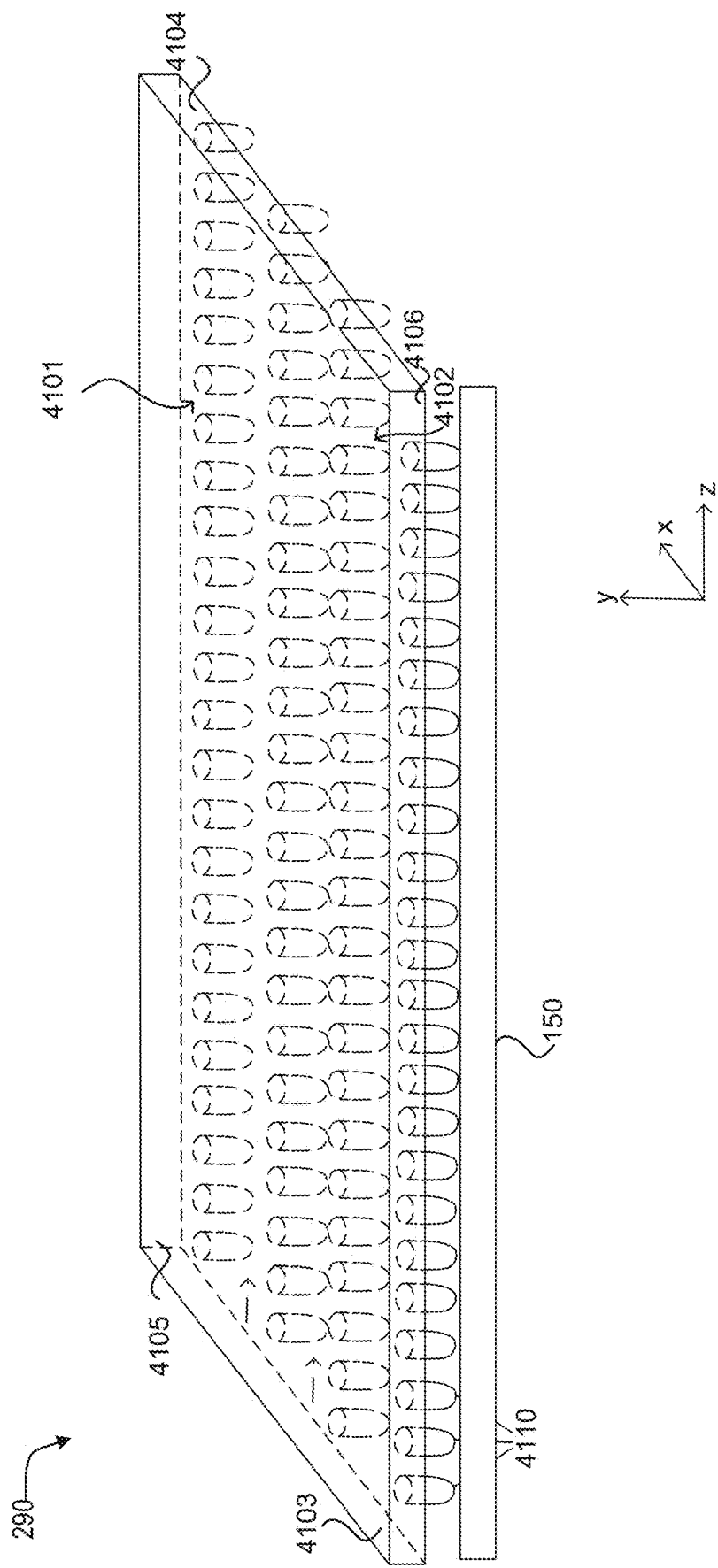
FIGS. 41A-41B are perspective wireframe views of a channel including wells, as part of a type-alpha (type-α) microfluidic device according to an exemplary embodiment.
Figure 41B:
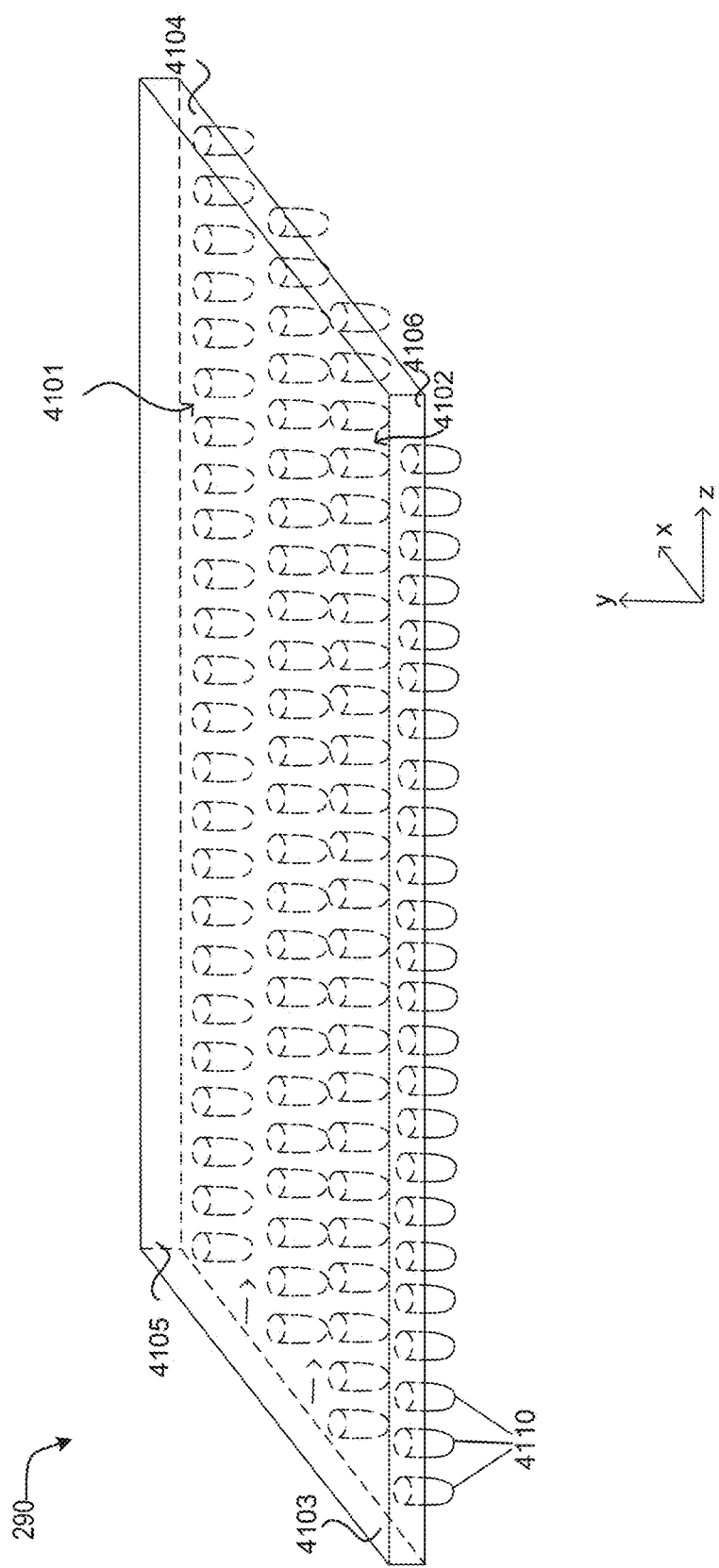

As illustrated in FIGS. 41A and 41B, the channel 290 may be defined or bordered by a top surface 4101, a bottom surface 4102, and side surfaces 4103, 4104, 4105, and 4106. In other words, the top surface 4101, the bottom surface 4102, and the side surfaces 4103, 4104, 4105, and 4106 may form the borders of the channel 290. Fluid flow may enter the channel 290 from a bottom portion of the inlet body 205 through the side surface 4103, which coincides with a surface of the inlet body 205. Additionally, in some examples, the channel 290 may include, or define, one or more wells 4110 at the bottom surface 4102. Thus, the one or more wells 4110 may be positioned at a bottom of the channel 290, so that fluid flows within an interior of the channel 290 and over the one or more wells 4110. Top open surfaces of the wells 4110 may coincide with the bottom surface 4102. Thus, fluid flow entering the channel 290 may permeate into the wells 4110. In some examples, as illustrated in FIG. 41A, the base 150 may be positioned or situated beneath the wells 4110. In other examples, as illustrated in FIG. 41B, the wells 4110 may be unsupported by any base.

In some exemplary embodiments, for a microfluidic application, the channel may have a parallel plate structure, and a height of the channel 290 in the Y-direction may be uniform and may be on the order of about 0.05 mm to about 0.50 mm. The channel 290 may have a rectangular prism shape. Specifically, the height of the channel 290 in the Y-direction may be on the order of about 0.25 mm. In some exemplary embodiments, the height of the channel 290 in the Y-direction is reduced to minimize volume consumption of transport fluid through the device 100. In some exemplary embodiments, the height of the channel 290 in the Y-direction is optimized to account for shear stress over surfaces of the channel 290. The shear stress over surfaces of the channel 290 is a direct linear function of the height of the channel 290 at a constant pressure difference. For example, for beads having the maximum dimension of about 25-50 μm and for suspended cells having the maximum dimension of about 10-20 μm, the height of the channel 290 of about 0.25 mm is observed as yielding sufficient and desirable shear stress when a fluid, such as oil, is introduced to the fluid (e.g., water) to isolate well arrays. In some exemplary embodiments, a width of the channel 290 in the X-direction may be on the order of about 45.0 mm. In other exemplary embodiments, a width of the channel 290 in the X-direction may be on the order of about 200 mm. In some exemplary embodiments, a ratio of the height of the channel 290 in the Y-direction to the width of the channel 290 in the X-direction may be about 1 to about 180. In some exemplary embodiments, a length of the channel 290 in the Z-direction may be on the order of about 70 mm.

The inlet body 105, the base 150, the outlet body 195, the inlet 200, the inlet transition 285, the channel 290, the outlet transition 295, and the outlet 200' may be formed by injection molding or any other suitable method.

Figure 2:
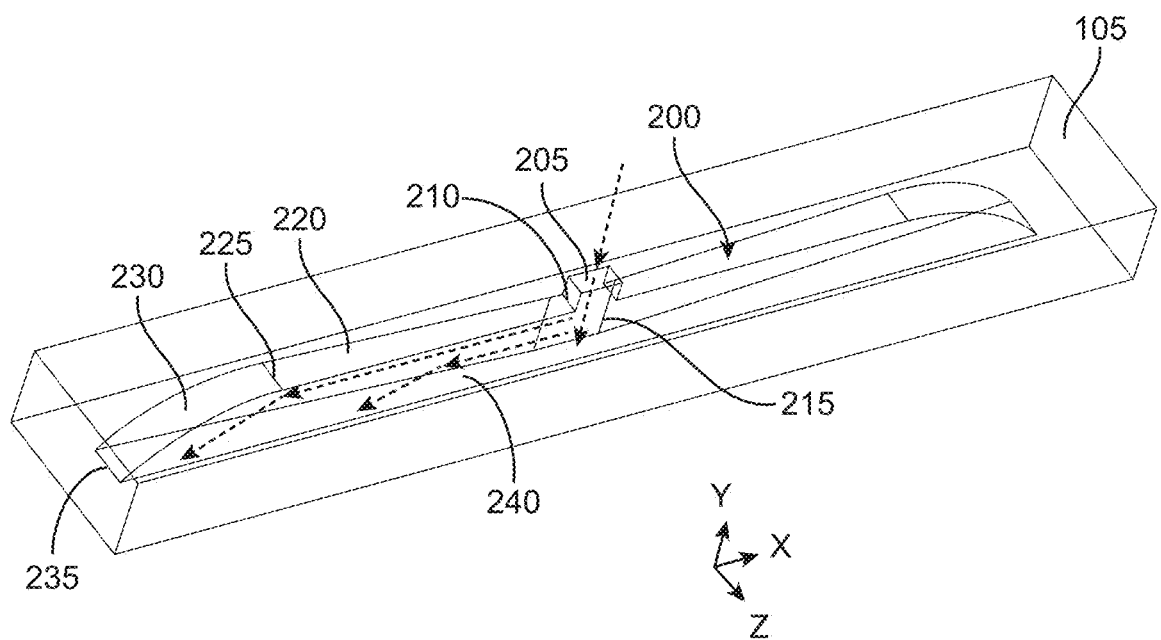
FIG. 2 is a detailed perspective wireframe view of an inlet body and inlet or an outlet body and outlet of the type-α microfluidic device according to an exemplary embodiment.

FIG. 2 is detailed perspective wireframe view of the inlet body 105 and the inlet 200 of the type-α microfluidic device 100 according to an exemplary embodiment. Additionally, or alternatively, the outlet body 195 and the outlet 200' may be implemented substantially similar to or same as the inlet body 105 and the inlet 200, respectively. The inlet 200 may be configured to convert flow of fluid through the inlet 200 from an entry (e.g., a port 205, examples described below) of the inlet 200 to an exit (e.g., an opening 240, examples described below) of the inlet 200. Specifically, the inlet 200 may be configured to convert flow of fluid at the entry of the inlet 200 (e.g., at the port 205) into substantially uniform flow at the exit of the inlet 200 (e.g., at the opening 240). As used herein, the term "substantially uniform" flow may be used to refer to fluid flow within a range defined as, for example, about 10% of a maximum observed value in a given region of a device in a given trial. Non-limiting examples of substantially uniform flow are provided hereinbelow. For clarity, simulations are represented with 10-step graduations in velocity, thereby limiting the resolution of uniformity to within 10%.

Conversely, the outlet 200' may be configured to convert flow of fluid through the outlet 200' from an entry (e.g., the opening 240) of the outlet 200' to an exit (e.g., the port 205) of the outlet 200'. Specifically, the outlet 200' may be configured to convert substantially uniform flow of fluid at the entry of the outlet 200' (e.g., at the opening 240) into flow suitable for fluid to exit the outlet 200' (e.g., at the port 205).

As such, the inlet 200 is configured to provide substantially uniform flow of the fluid as the fluid enters the channel 290. Substantially uniform flow into the channel 290 improves accuracy of sensors connected to the device 100 and/or throughput of the fluid through the device 100.

Figure 47:
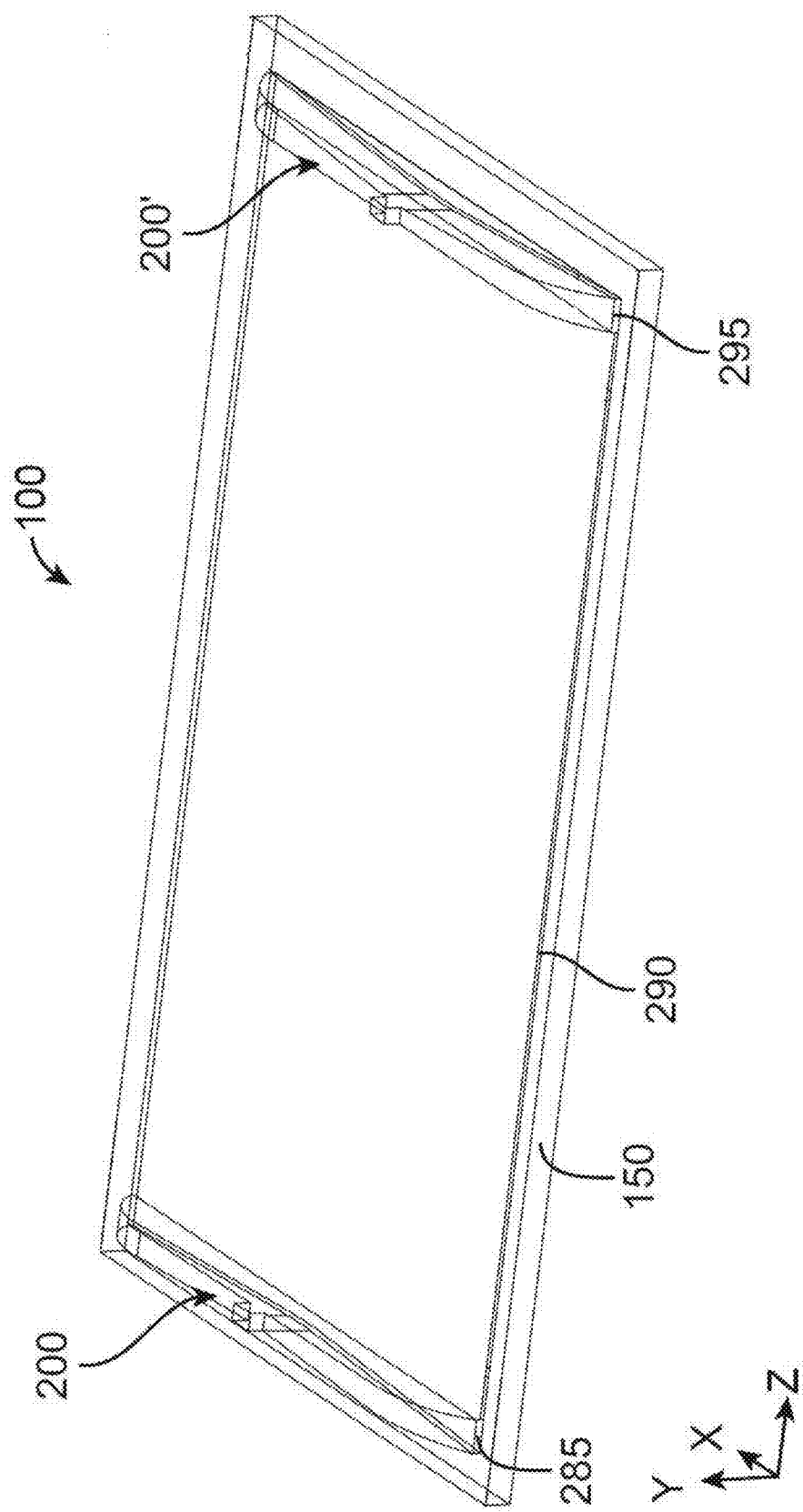
FIGS. 47-48 are perspective wireframe views of a type-alpha (type-α) microfluidic device according to an exemplary embodiment.
Figure 48:
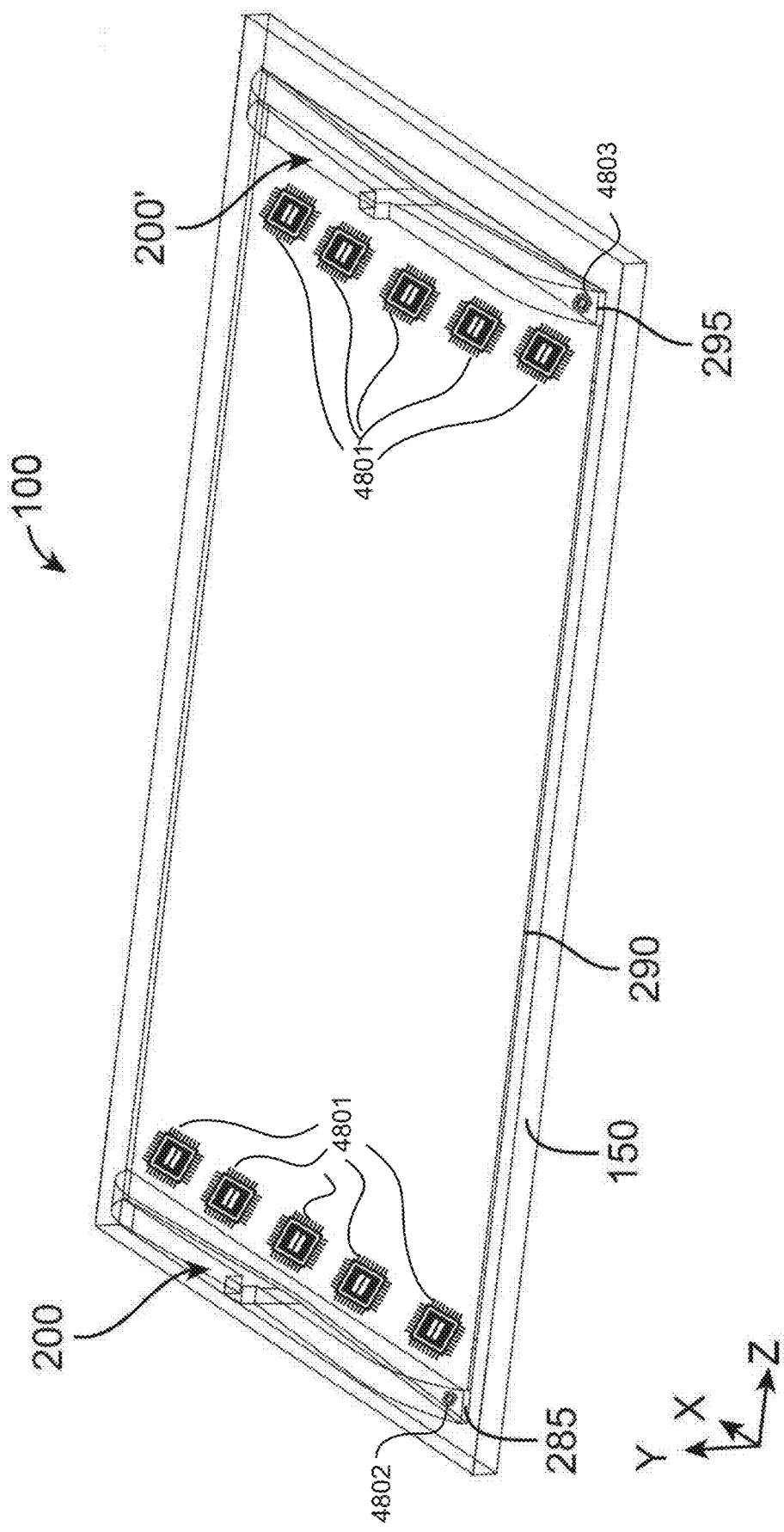

In some examples, the device 100 may exclude the inlet body 105 and/or the outlet body 205, as illustrated in FIG. 47. In some examples, as illustrated in FIG. 48, one or more sensors 4801 may be disposed within the channel 290, for example, adjacent to an entrance and/or an exit of the channel 290. In some examples, one or more sensors 4802 may be disposed within the inlet 200, and/or one or more sensors 4803 may be disposed within the outlet 200'.

As demonstrated, for example, on the left side of FIGS. 4A, 4B, and 5-9 below (particularly FIGS. 5-9), as represented by the dashed line arrows in FIG. 2, a velocity of the fluid is depicted by the dashed line arrows, and the velocity of the fluid at the end of each vector in the inlet 200 is substantially the same at substantially all points along the inlet 200 in the X-direction. The gradual increase in depth in the Z-direction of each of the inlet and outlet conduits from the top inlet-port towards the edge along the X-direction, strongly decreases the cross-sectional resistance as each of the inlet and outlet opens out to the edges of each of the inlet and outlet, such that the inversely proportional resistance contributed by the depth balances the linear resistance contributed by any path length from the inlet-port to the bottom of the inlet (refer to Equation 3). For example, when the structure is the inlet 200, a cumulative resistance of flow paths (e.g., those marked with dashed line arrows in FIG. 2) from the port 205 are at or near equal to the cumulative resistance of flow paths at the opening 240 on the bottom of the inlet 200. The velocities of these flow paths at the bottom of the inlet are then also equally uniform.

In the embodiment of FIG. 2, one side of the inlet 200 may be substantially flat (approximately coplanar with the XY plane), corresponding with the XY plane on a side of the inlet 200 facing the channel 290 and facing the outlet 200'. Conversely, the outlet 200' may be substantially flat (approximately coplanar with the XY plane), corresponding with the XY plane on a side of the outlet 200' facing the channel 290 and facing the inlet 200.

Conversely, the outlet 200' is configured to receive substantially uniform flow of the fluid as the fluid exits the channel 290. Substantially uniform flow from the channel 290 ensures the accuracy of the sensors connected to the device 100 and/or throughput of the fluid through the device 100. As demonstrated, for example, on the right side of FIGS. 4-9 below, the velocity in the Z-direction of the fluid exiting the channel 290 is substantially the same at substantially all points along the outlet 200' in the X-direction.

The inlet 200 and/or the outlet 200' may include the port 205. The port 205 may have a depth 210 in the Z-direction. In some exemplary embodiments, the depth 210 in the Z-direction of the port 205 may be in a range between about 0.5 mm to about 1.5 mm, and, in some embodiments, in a range between about 0.9 and about 1.0 mm. The port 205 may have substantially linear edges (as shown in FIG. 1) or non-linear edges (not shown). The port 205 may be configured with an open top (in the XZ plane), an open bottom (in the XZ plane), and four closed sides (two each in the XY and YZ planes).

The port 205 may have a rectangular (including a square) cross section in one or more of each of the XY, YZ and XZ planes, as shown in FIG. 2. Other cross-sectional shapes in the XZ plane, such as circular or oval, are within the scope of the present disclosure (see, e.g., FIG. 18).

The inlet 200 and/or the outlet 200' may include a tapered region 220. The tapered region 220 may be tapered in the Z-direction. That is, when viewed from above (from the XZ plane), the tapered region 220 may have a relatively short depth in the Z-direction near the port 205, and a relatively large depth in the Z-direction near an inflection point 225. As shown in FIG. 2, when viewed from above (from the XZ plane), the tapered region 220 may be provided only on one side of the inlet 200, i.e., the side facing away from the channel 290. Conversely, when viewed from above (from the XZ plane), the tapered region 220 may be provided only on one side of the outlet 200', i.e., the side facing away from the channel 290. In other words, the side of the inlet 200 or the outlet 200' facing the channel 290 may not have the taper and may be relatively flat (approximately coplanar with the XY plane). (Cf., the exemplary embodiments of FIGS. 11-15, 16A, and 16B, where both sides of the inlet 400 and the outlet 400' are tapered.)

The tapered region 220 may have a height 215 in the Y-direction. In some exemplary embodiments, the height 215 in the Y-direction may be about 3.0 mm. In some exemplary embodiments, the height 215 in the Y-direction may be equal to about an eighth of the distance from the center of the inlet 200 and/or the outlet 200' to the edge (at 235), such that the taper of the depth 235 in the Z-direction may gradually double. The inlet may be an essentially vertical channel (or conduit).

The inflection point 225 may be provided between the tapered region 220 and a curved and tapered region 230. The curved and tapered region 230 may be curved in the Y-direction and tapered in the Z-direction. That is, when viewed from the side (from the XY plane), the curved and tapered region 230 may start to curve in the Y-direction at the inflection point 225, and the curve in the Y-direction may terminate at an end of the curved and tapered region 230. Also, when viewed from above (from the XZ plane), the curved and tapered region 230 may have a relatively short depth in the Z-direction at the inflection point 225, and a relatively large depth 235 in the Z-direction at the end of the curved and tapered region 230. In some exemplary embodiments, the depth 235 in the Z-direction of the end of the curved and tapered region 230 may be in a range between about 1.0 mm to about 3.0 mm, and, in some embodiments, in a range between about 1.8 and about 2.0 mm.

The total volume of the type-α microfluidic device 100 may be about 1,168 μL, the volume of the channel 290 may be about 742.5 μL, the volume of the inlet 200 or the outlet 200' may be about 212.75 μL, and the volume of the inlet 200 and the outlet 200' may be about 425.5 μL. As such, a percentage of the volume of the inlet 200 and the outlet 200' to the total volume of the type-α microfluidic device 100 may be about 36.43%.

The curved and tapered region 230 may be a dead-volume area with relatively slow flow velocity (or a vortex forming region), which may be minimized for complete medium exchanges. In some exemplary embodiments, relatively sharp 90° intersections of adjacent surfaces may be avoided with chamfering and/or curved intersections (not shown).

In some exemplary embodiments, as shown in FIG. 2, the depth in the Z-direction may linearly vary, for example, from about 0.75 mm near the port 205 to about 1.5 mm at the end; from about 0.9 mm near the port 205 to about 1.8 mm at the end; from about 1.0 mm near the port 205 to about 2.0 mm at the end; or from about 1.5 mm near the port 205 to about 3.0 mm at the end. In the exemplary embodiment set forth in FIG. 2, for example, the depth varies by a ratio of 1:2 so that an inversely proportional resistance contributed by the depth changes by 8 (i.e., $2^3$) thereby balancing a linear resistance contributed by the change in length (~8) from the center of the inlet port to the bottom of the inlet edge, e.g., about 3.0 mm to about 24.0 mm (see, e.g., Equation 3). The inlet 200 and the outlet 200' may have one or more substantially linear edges, as shown, for example, in FIG. 2. In some exemplary embodiments, the depth in the Z-direction may increase from the port 205 to the end (at depth 235). The inlet 200 and the outlet 200' may have one or more curved edges (not shown). Alternatively, in some exemplary embodiments, the depth in the Z-direction may be substantially constant from the port to the end (e.g., not tapered) with a substantially linear edge (see, FIG. 17).

In some exemplary embodiments, the tapering from about 1.0 mm of the depth 210 to about 2.0 mm (or about 0.75 mm to about 1.5 mm, or about 0.9 mm to about 1.8 mm, or about 1.5 mm to about 3.0 mm) of the depth 235 may be linear. The linear taper is sufficient to balance the flow resistance between the center of the port 205 and any point along opening 240. Lengths of the fluid flow path (dashed lines in FIG. 2) vary approximately from about 3.0 mm at the port 205 to about 24.0 mm between the port 205 and the end (at depth 235) (e.g., an 8-fold longer length from the center to the end), respectively the resistance contributed by the length increases by 8-fold. To balance the resistance, the taper in depth doubles from the center of the port 205 to the depth 235 effectively reduces the resistance contributed by the depth by 8-fold ($2^3$). In other exemplary embodiments, since with the linear taper, there is slightly lower resistance in the center (the maximum Z-direction velocity is reached relatively quickly) compared to the ends, the tapering may be non-linear or curved. The linear taper may produce sufficiently uniform velocity at the entrance of the assay channel 290. In some exemplary embodiments, the opening 240 has a depth in the Z-direction in a range between about 1.5 mm and about 3.0, about 2.0 mm, greater than about 2.0 mm, or less than about 2.0 mm.

The opening 240 may be formed in a bottom surface of the inlet body 105 or a bottom surface of the outlet body 195. That is, the opening 240 may be formed to provide fluid communication between an interior of inlet 200 and the inlet transition 285 or, on the other side of the device, the opening may be formed to provide fluid communication between the outlet transition 295 and an interior of the outlet 200'. The inlet transition 285 and/or the outlet transition may have a substantially rectilinear shape or any other suitable shape. The inlet transition 285 and/or the outlet transition 295 may have substantially linear edges (as shown in FIG. 1) or non-linear edges (not shown).

The inlet transition 285 may function to change the predominant direction of flow of the fluid from a substantially vertical direction in the Y-direction and a substantially horizontal direction in the X-direction after exiting the inlet 200 to a substantially horizontal direction in the Z-direction before entering the channel 290. Conversely, the outlet transition 295 may function to change the predominant direction of flow of the fluid from a substantially horizontal direction in the Z-direction in the channel 290 to a substantially vertical direction in the Y-direction and a substantially horizontal direction in the X-direction before entering the outlet 200'.

Figure 3:
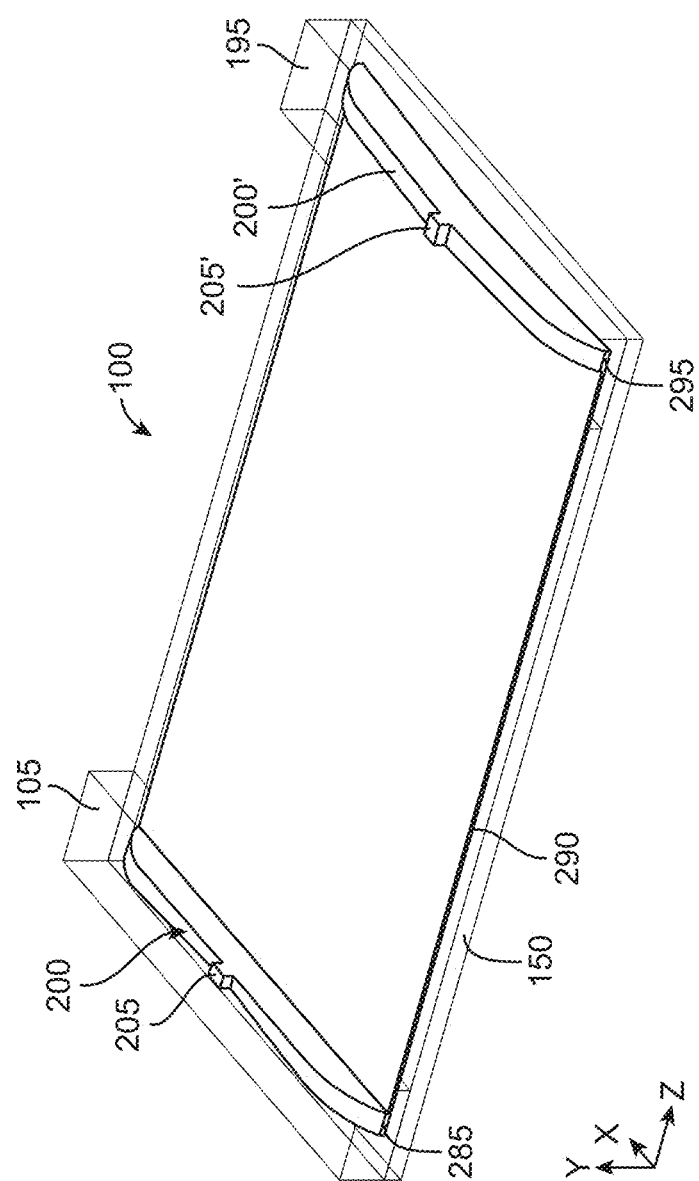
FIG. 3 is a perspective wireframe view highlighting a fluid flow region in an inlet, an inlet transition, a channel, an outlet transition, and an outlet of the type-α microfluidic device according to an exemplary embodiment.

FIG. 3 is a perspective wireframe view highlighting a fluid flow region in the inlet 200, an inlet transition 285, a channel 290, and an outlet transition 295 of the type-α microfluidic device 100 according to an exemplary embodiment. The solid shape within FIG. 3 represents the fluid flow region beginning, at the left side of FIG. 3, by entering at the port 205 of the inlet 200, and flowing down (in the Y-direction) through the port 205, down (in the Y-direction) and outwardly or laterally (in both of the X-directions) within the inlet 200, out of the opening 240 at the bottom of the inlet 200, into the inlet transition 285, changing direction to flow to the right (in the Z-direction) before exiting the inlet transition 285, entering the channel 290, flowing left-to-right (in the Z-direction) through the channel 290, exiting into the outlet transition 295, changing direction so as to flow up into the opening 240 at the bottom of the outlet 200', flowing up (in the Y-direction) and inwardly (in both of the X-directions) towards the port 205, up (in the Y-direction) through the port 205, and exiting out of the top of the port 205. While the predominant direction of fluid flow as described herein is from the left-to-right, it is understood that the inlet and outlet could be reversed so that fluid flows from the right-to-left.

Table 1 summarizes velocity studies of various exemplary embodiments of microfluidic devices of the present disclosure.

| FIG. No. | Volumetric Flow Rate (µL/sec) | Device Type | Viscosity of the Fluid (relative to Water) | Qualitative Grade of Substantially Uniform Flow at Midpoint of the Channel | Range of Predominant Substantially Uniform Velocity at Midpoint of the Channel (mm/sec) |
|---|---|---|---|---|---|
| 4A | 0.1 | type-α | 1× | ++++ | 0.008793-0.009893 |
| 4B | 1 | type-α | 1× | +++++ | 0.08788-0.09886 |
| 5 | 10 | type-α | 1× | +++++ | 0.9025-1.000 |
| 6, 7 | 100 | type-α | 1× | +++++ | 9.000-10.00 |
| 8 | 500 | type-α | 1× | +++++ | 47.00-52.00 |
| 9 | 1,000 | type-α | 1× | +++ | 98.00-110.0 |
| 10 | 5,000 | type-α | 1× | ++ | 652.0-733.0 |
| 14, 15 | 100 | type-β | 1× | +++++ | 9.000-10.00 |
| 16A | 1 | type-β | 1× | +++++ | 0.08563-0.09634 |
| 16B | 10 | type-β | 1× | +++++ | 0.8763-0.9858 |
| 17 | 10 | type-γ | 1× | +++ | 0.07975-0.09115 |
| 21 | 1,000 | PRIOR ART | 1× | + | 0.05556-0.1111 |
| 24 | 100 | type-α (50%) | 1× | +++ | 9.000-10.00 |
| 25 | 1,000 | type-α (50%) | 1× | +++ | 86.00-100.0 |
| 26 | 100 | type-α (75%) | 1× | ++++ | 9.000-10.00 |
| 27 | 100 | type-α (90%) | 1× | +++++ | 11.00-13.00 |
| 28 | 1,000 | type-α (90%) | 1× | ++++ | 114.0-130.0 |
| 29 | 2,000 | type-α | 1× | +++ | 235.0-282.0 |
| 30 | 100 | type-α (150%) | 1× | ++++ | 8.000-10.00 |

-continued

| FIG. No. | Volumetric Flow Rate (µL/sec) | Device Type | Viscosity of the Fluid (relative to Water) | Qualitative Grade of Substantially Uniform Flow at Midpoint of the Channel | Range of Predominant Substantially Uniform Velocity at Midpoint of the Channel (mm/sec) |
|---|---|---|---|---|---|
| 31 | 1 | type-α | 100× | ++++ | 0.1089-0.1226 |
| 32 | 10 | type-α | 100× | ++++ | 0.9812-1.000 |
| 33 | 100 | type-α | 100× | ++++ | 11.00-12.00 |
| 34 | 0.1 | type-α | 1,000× | ++++ | 0.01088-0.01224 |
| 35 | 100 | type-α | 1,000× | ++++ | 11.00-12.00 |
| 36 | 2,000 | type-α | 1,000× | +++++ | 221.0-248.0 |
| 37 | 5,000 | type-α | 1,000× | ++++ | 583.0-656.0 |
| 38 | 10,000 | type-α | 1,000× | ++ | 1,203-1,444 |
| 39, 40 | 100 | type-α (open outlet) | 1× | +++++ | 11.00-13.00 |

Figure 4A:
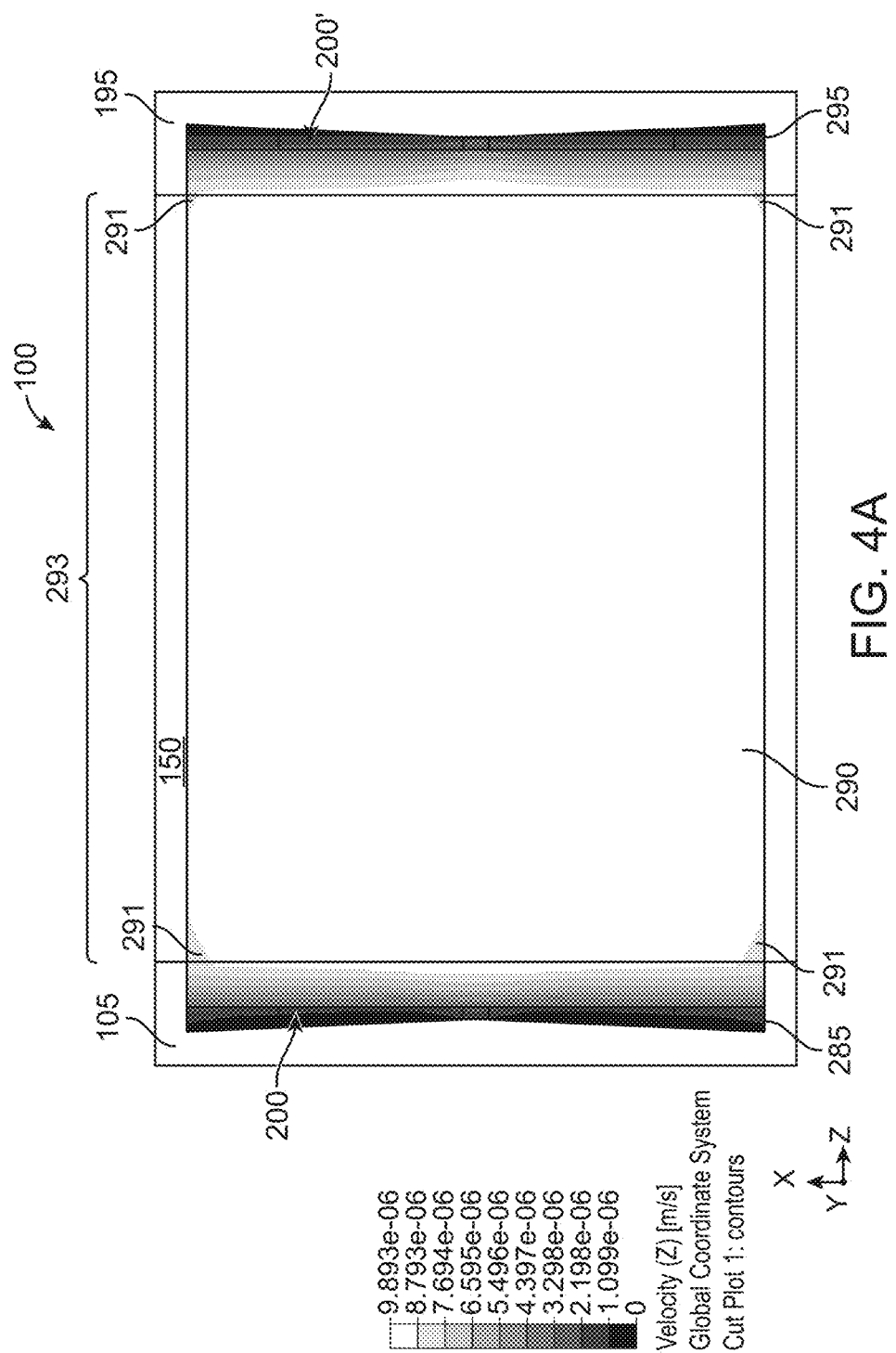
FIG. 4A is a plan wireframe view highlighting velocities of a fluid (e.g., water) flowing at a volumetric flow rate of about 0.1 microliters (μL)/sec in the XZ plane of the inlet transition, the channel, and the outlet transition of the type-α microfluidic device according to an exemplary embodiment.

FIG. 4A is a plan wireframe view highlighting velocities of a fluid (e.g., water) flowing at a volumetric flow rate of about 0.1 µL/sec in the XZ plane of the inlet transition 285, the channel 290, and the outlet transition 295 of the type-α microfluidic device 100 according to an exemplary embodiment. In some exemplary embodiments, the velocity of the fluid may be measured at a point about halfway between an upper internal surface and a lower internal surface of the channel 290. In the exemplary embodiments of FIGS. 4A, 4B, 5-10, 14, 15, 16A, 16B, 17 and 24-30, inclusive, the height of the channel 290 in the Y-direction is about 0.25 mm, and the velocity of the fluid was measured at about 0.125 mm below the upper internal surface or about 0.125 mm above the lower internal surface of the channel 290. At relatively low flow rates, such as that shown in FIG. 4A, the viscous effects of water may become more pronounced and minor edge effects are observed. The upper limit of the present exemplary design may be bound by a laminar flow constraint. With the exemplary embodiment of FIG. 4A, the velocity of fluid flowing in the Z-direction in the inlet transition 285 and the channel 290 varies from about 0.0000 mm/sec to about 0.009893 mm/sec in a region of the inlet transition 285 and the channel 290 located directly below the inlet body 105, but this region of varying velocity is substantially contained to the region below the inlet body 105. Similarly, the velocity of fluid flowing in the Z-direction in the channel 290 and the outlet transition 295 varies from about 0.009893 mm/sec to about 0.0000 mm/sec in a region of the channel 290 and the outlet transition 295 located directly below the outlet body 195, but this region of varying velocity is substantially contained to the region below the outlet body 195. Conversely, the velocity of substantially all of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 is within a relatively narrow range, i.e., about 0.008793 mm/sec to about 0.009893 mm/sec. However, with the exemplary embodiment of FIG. 4A, in four corners of the channel 290, in regions 291 of the sensor region 293 of the device 100 located between the inlet body 105 and the outlet body 195, the velocity in the Z-direction is about 0.007694 mm/sec to about 0.008793 mm/sec. In other words, the velocity of substantially all of the fluid flowing in the Z-direction of the channel 290 in the sensor region 293 of the device 100 is substantially uniform. The substantially uniform flow of the fluid is an advantageous effect of the above-referenced exemplary configuration of the inlet 200 and the above-referenced configuration of the outlet 200'.

In some exemplary embodiments, a first ratio of a cross-sectional area (i.e., X-dimension×Z-dimension) of the port 205 to a cross-sectional area (i.e., X-dimension×Y-dimension) of an entrance of the channel 290 is about 2.0 (e.g., 1.0 mm×2.0 mm) to about 15.0 (e.g., 0.25 mm×60.0 mm) or about 1.0 to about 7.5. In some exemplary embodiments, a second ratio of the cross-sectional area (i.e., X-dimension×Z-dimension) of the port 205 to a cross-sectional area (i.e., X-dimension×Z-dimension) of the opening 240 is about 2.0 (e.g., 1.0 mm×2.0 mm) to about 100.0 (2.0 mm×50.0 mm) or about 1.0 to about 50.0. In some exemplary embodiments, a third ratio of the cross-sectional area (i.e., X-dimension×Z-dimension) of the opening 240 to the cross-sectional area (i.e., X-dimension×Y-dimension) of the entrance of the channel 290 is about 100.0 (2.0 mm×50.0 mm) to about 15.0 (e.g., 0.25 mm×60.0 mm) or about 6.67 to about 1.00. In some exemplary embodiments, a fourth ratio of the depth 210 of the port 205 to the depth 235 at the end of the inlet 200 or outlet 200' is about 1.0 to about 2.0. In some exemplary embodiments, a fifth ratio of the depth 210 of the port 205 to the depth 235 at the end of the inlet 200 or outlet 200' to the height 215 at or near the port 205 is about 1.0 to about 2.0 to about 3.0. In some exemplary embodiments, a sixth ratio of the height of the channel 290 to the depth 210 of the port 205 to the depth 235 at the end of the inlet 200 or the outlet 200' to the height 215 at or near the port 205 is about 0.25 to about 1.0 to about 2.0 to about 3.0, or about 1.0 to about 4.0 to about 8.0 to about 12.0. In some exemplary embodiments, a cross-sectional shape of one or both sides of the inlet 200 or the outlet 200' in the XZ plane is a bowtie shape, i.e., resembling a piece of apparel worn about the neck known as a bowtie, or a Venturi shape. In some exemplary embodiments, a cross-sectional shape of the inlet 200 or the outlet 200' in the XY plane is a bow shape, i.e., resembling a bow for a bow and arrow, or a bracket shape, i.e., resembling an open bracket ("{") or resembling a closed bracket ("}").

Figure 4B:
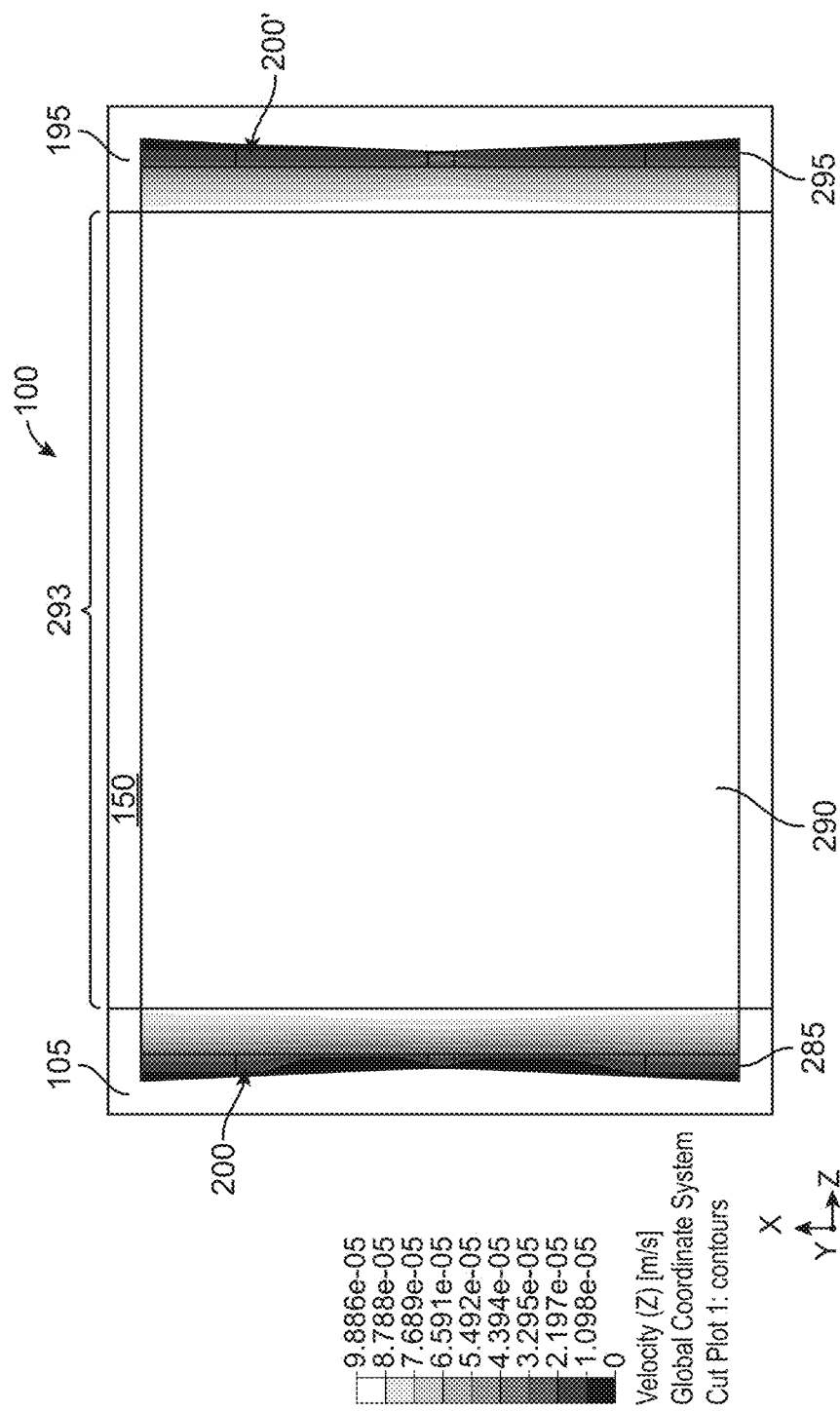
FIG. 4B is a plan wireframe view highlighting velocities of a fluid (e.g., water) flowing at a volumetric flow rate of about 1 μL/sec in the XZ plane of the inlet transition, the channel, and the outlet transition of the type-σ microfluidic device according to an exemplary embodiment.

FIG. 4B is a plan wireframe view highlighting velocities of a fluid (e.g., water) flowing at a volumetric flow rate of about 1 µL/sec in the XZ plane of the inlet transition, the channel, and the outlet transition of the type-α microfluidic device according to an exemplary embodiment. That is, the volumetric flow rate of the trial illustrated in FIG. 4B is about 10 times greater than that used in the trial illustrated in FIG. 4A.

With the exemplary embodiment of FIG. 4B, the velocity of fluid flowing in the Z-direction in the inlet transition 285 and the channel 290 varies from about 0.0000 mm/sec to about 0.09886 mm/sec in a region of the inlet transition 285 and the channel 290 located directly below the inlet body 105, but this region of varying velocity is substantially contained to the region below the inlet body 105. Similarly, the velocity of fluid flowing in the Z-direction in the channel 290 and the outlet transition 295 varies from about 0.09886 mm/sec to about 0.0000 mm/sec in a region of the channel 290 and the outlet transition 295 located directly below the outlet body 195, but this region of varying velocity is substantially contained to the region below the outlet body 195. Conversely, the velocity of substantially all or all of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 is about 0.08788 mm/sec to about 0.09886 mm/sec. Unlike the exemplary embodiment of FIG. 4A, in FIG. 4B, the velocity of all of the fluid flowing in the Z-direction of the channel 290 in the sensor region 293 of the device 100 at a height in the Z-direction of about 0.125 mm above the bottom surface of the channel 290 is substantially uniform, i.e., between about 0.08788 mm/sec and about 0.09886 mm/sec, including regions along the side edges of the channel 290. In other words, for the type-α microfluidic device 100, a change of the volumetric flow rate from about 0.1 μL/sec (FIG. 4A) to about 1 μL/sec (FIG. 4B) is significant, because the velocity of the fluid flowing in the Z-direction of the channel 290 in the sensor region 293 of the device 100 is mostly uniform at 0.1 μL/sec (see, the variation along the side edges in regions 291 in FIG. 4A); whereas, the velocity of the fluid flowing in the Z-direction of the channel 290 in the sensor region 293 of the device 100 is substantially uniform at 1 μL/sec (cf., FIG. 4A with FIG. 4B). The substantially uniform flow of the fluid is an advantageous effect of the above-referenced exemplary configuration of the inlet 200 and the above-referenced configuration of the outlet 200'.

Figure 5:
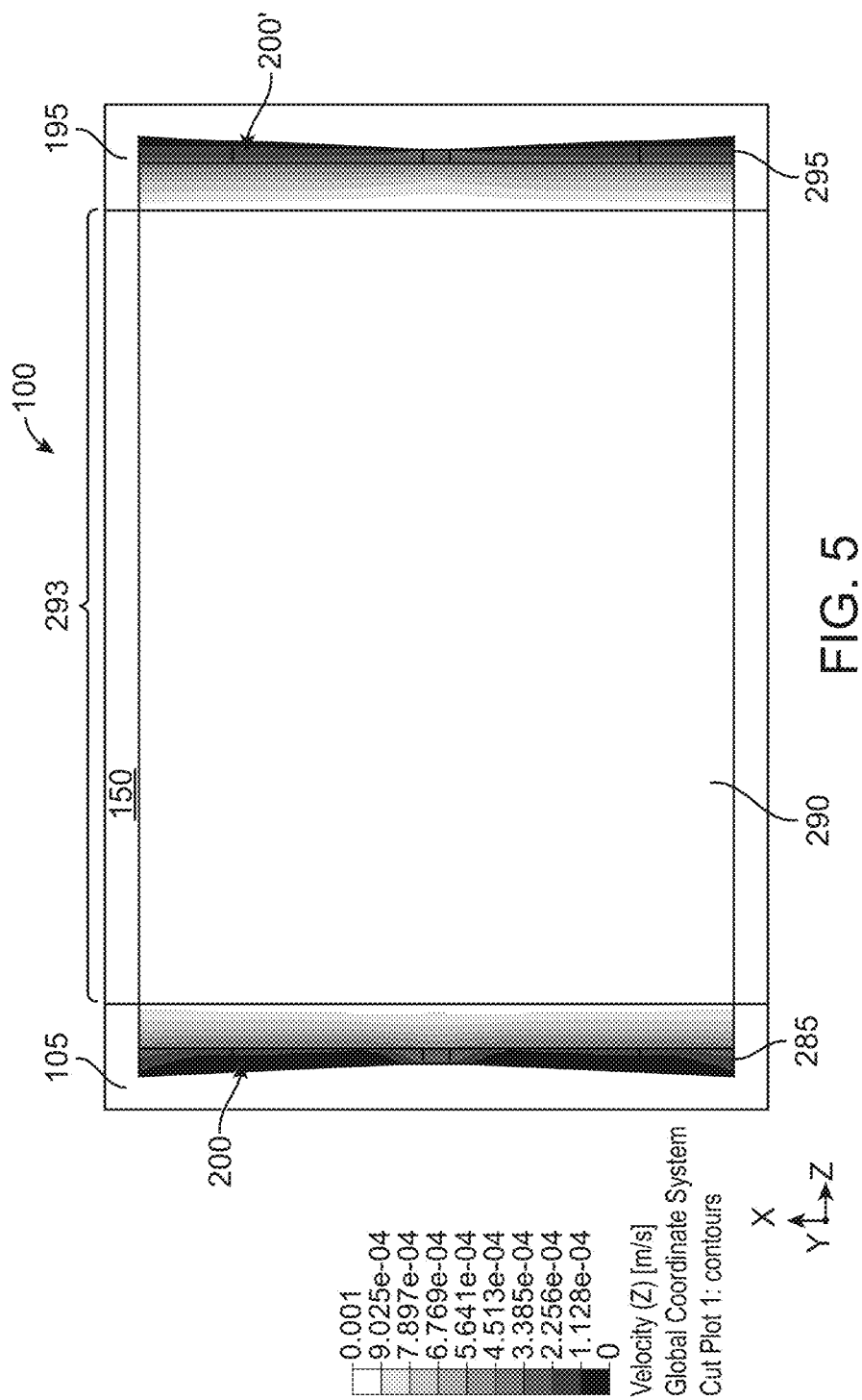
FIG. 5 is a plan wireframe view highlighting velocities of the fluid flowing at a volumetric flow rate of about 10 μL/sec in the XZ plane of the inlet transition, the channel, and the outlet transition of the type-α microfluidic device according to an exemplary embodiment.

FIG. 5 is a plan wireframe view highlighting velocities of the fluid flowing at a volumetric flow rate of about 10 μL/sec in the XZ plane of the inlet transition 285, the channel 290, and the outlet transition 295 of the type-α microfluidic device 100 according to an exemplary embodiment. That is, the volumetric flow rate of the trial illustrated in FIG. 5 is about 10 times greater than that used in the trial illustrated in FIG. 4B.

With the exemplary embodiment of FIG. 5, the velocity of fluid flowing in the Z-direction in the inlet transition 285 and the channel 290 varies from about 0.0000 mm/sec to about 1.000 mm/sec in a region of the inlet transition 285 and the channel 290 located directly below the inlet body 105, but this region of varying velocity is substantially contained to the region below the inlet body 105. Similarly, the velocity of fluid flowing in the Z-direction in the channel 290 and the outlet transition 295 varies from about 1.000 mm/sec to about 0.0000 mm/sec in a region of the channel 290 and the outlet transition 295 located directly below the outlet body 195, but this region of varying velocity is substantially contained to the region below the outlet body 195. Conversely, the velocity of substantially all or all of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 is about 0.9025 mm/sec to about 1.000 mm/sec. The substantially uniform flow of the fluid is an advantageous effect of the above-referenced exemplary configuration of the inlet 200 and the above-referenced configuration of the outlet 200'.

Figure 6:
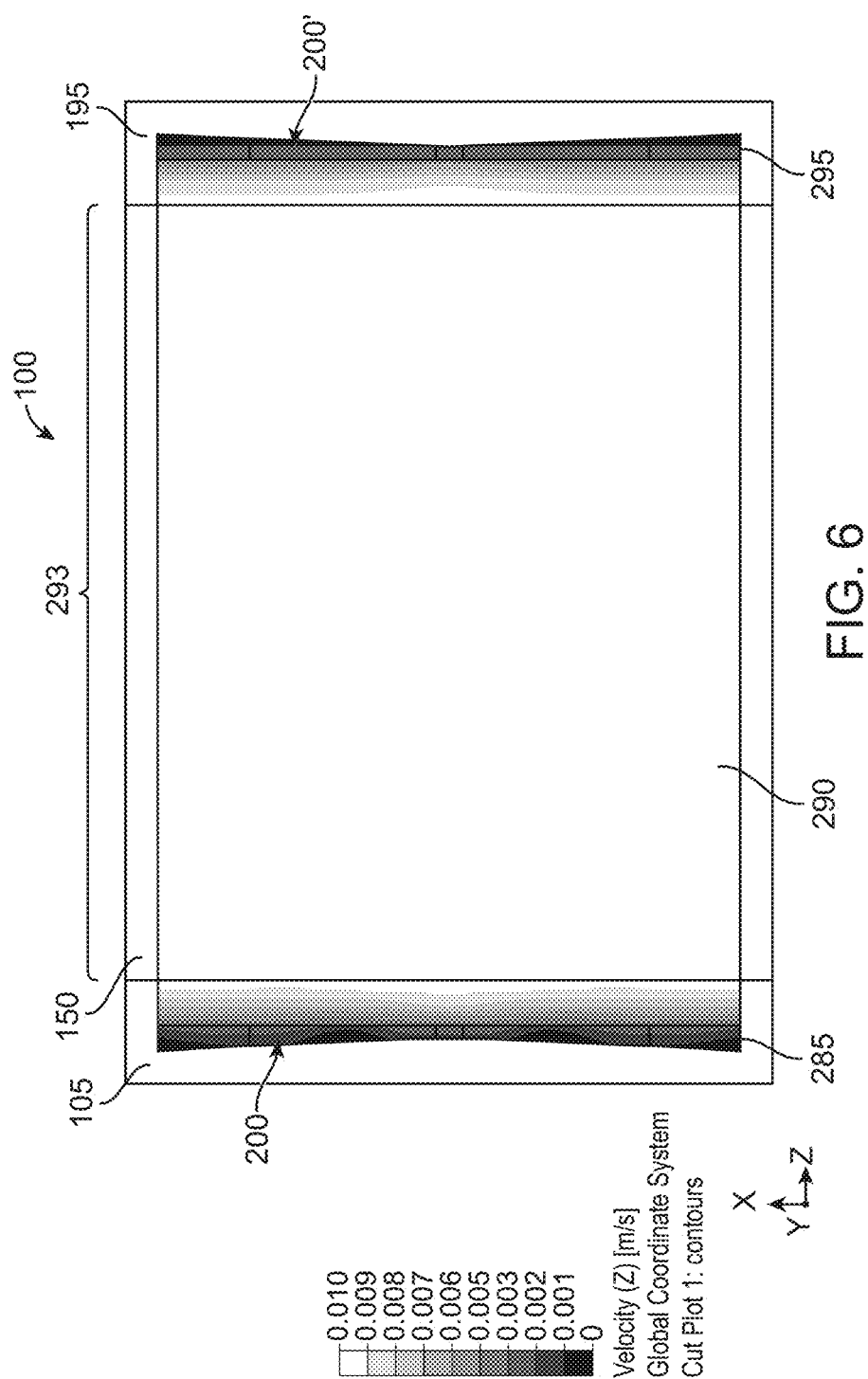
FIG. 6 is a plan wireframe view highlighting velocities of the fluid flowing at a volumetric flow rate of about 100 μL/sec in the XZ plane of the inlet transition, the channel, and the outlet transition of the type-α microfluidic device according to an exemplary embodiment.

FIG. 6 is a plan wireframe view highlighting velocities of the fluid flowing at a volumetric flow rate of about 100 μL/sec in the XZ plane of the inlet transition 285, the channel 290, and the outlet transition 295 of the type-α microfluidic device 100 according to an exemplary embodiment. That is, the volumetric flow rate of the trial illustrated in FIG. 6 is about 10 times greater than that used in the trial illustrated in FIG. 5. Similar to the exemplary embodiment of FIG. 5, in FIG. 6, the velocity of all of the fluid flowing in the Z-direction of the channel 290 in the sensor region 293 of the device 100 at a height in the Z-direction of about 0.125 mm above the bottom surface of the channel 290 is substantially uniform, i.e., between about 9.000 mm/sec and about 10.00 mm/sec, including regions along the side edges of the channel 290.

Figure 7:
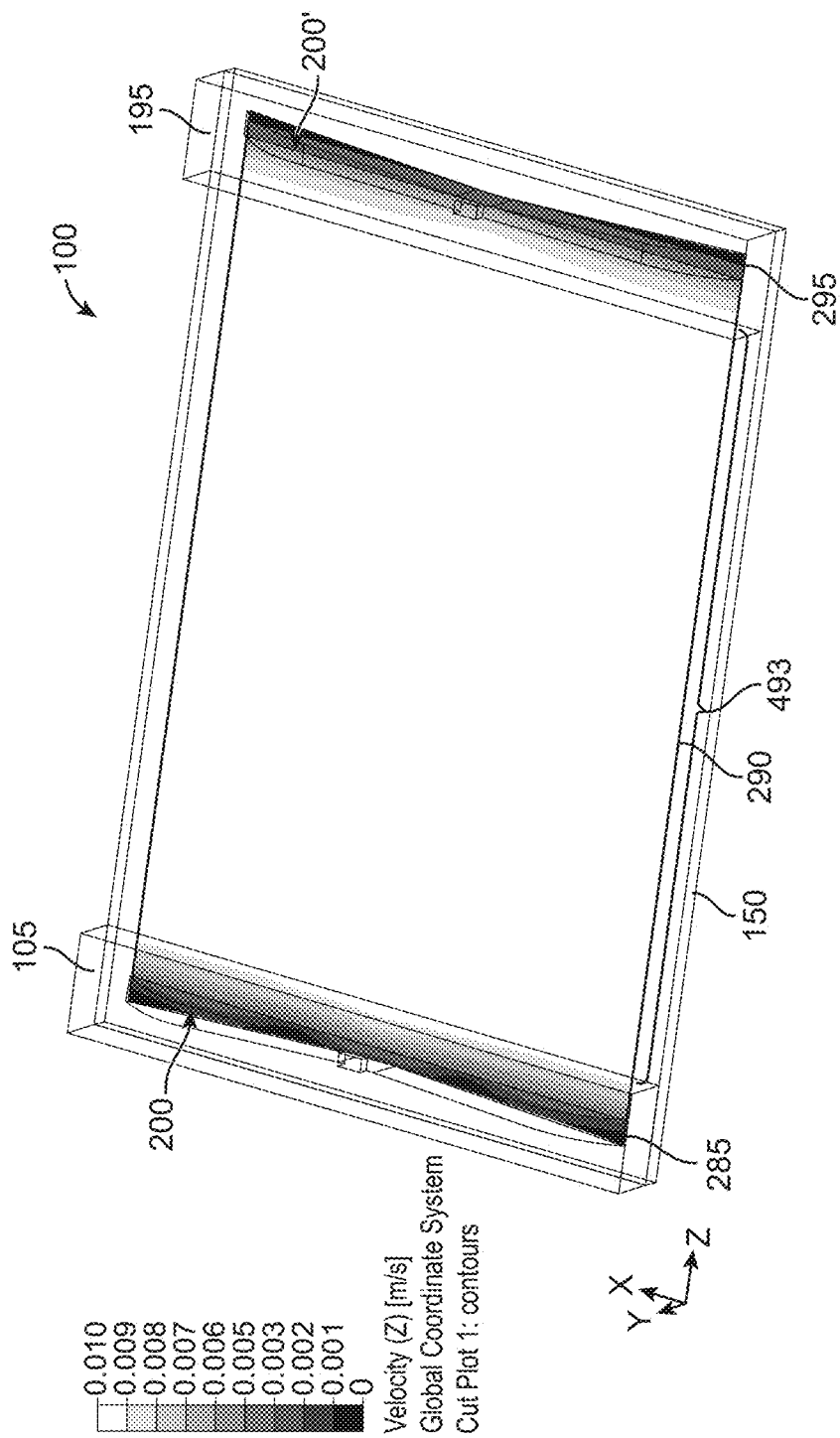
FIG. 7 is a perspective wireframe view highlighting velocities of the fluid flowing at a volumetric flow rate of about 100 μL/sec in the XZ plane of the inlet transition, the channel, and the outlet transition of the type-α microfluidic device according to an exemplary embodiment.

FIG. 7 is a perspective wireframe view highlighting velocities of the fluid flowing at a volumetric flow rate of about 100 μL/sec in the XZ plane of the inlet transition 285, the channel 290, and the outlet transition 295 of the type-α microfluidic device 100 according to an exemplary embodiment. The only difference between FIG. 6 and FIG. 7 is the viewpoint.

Figure 8:
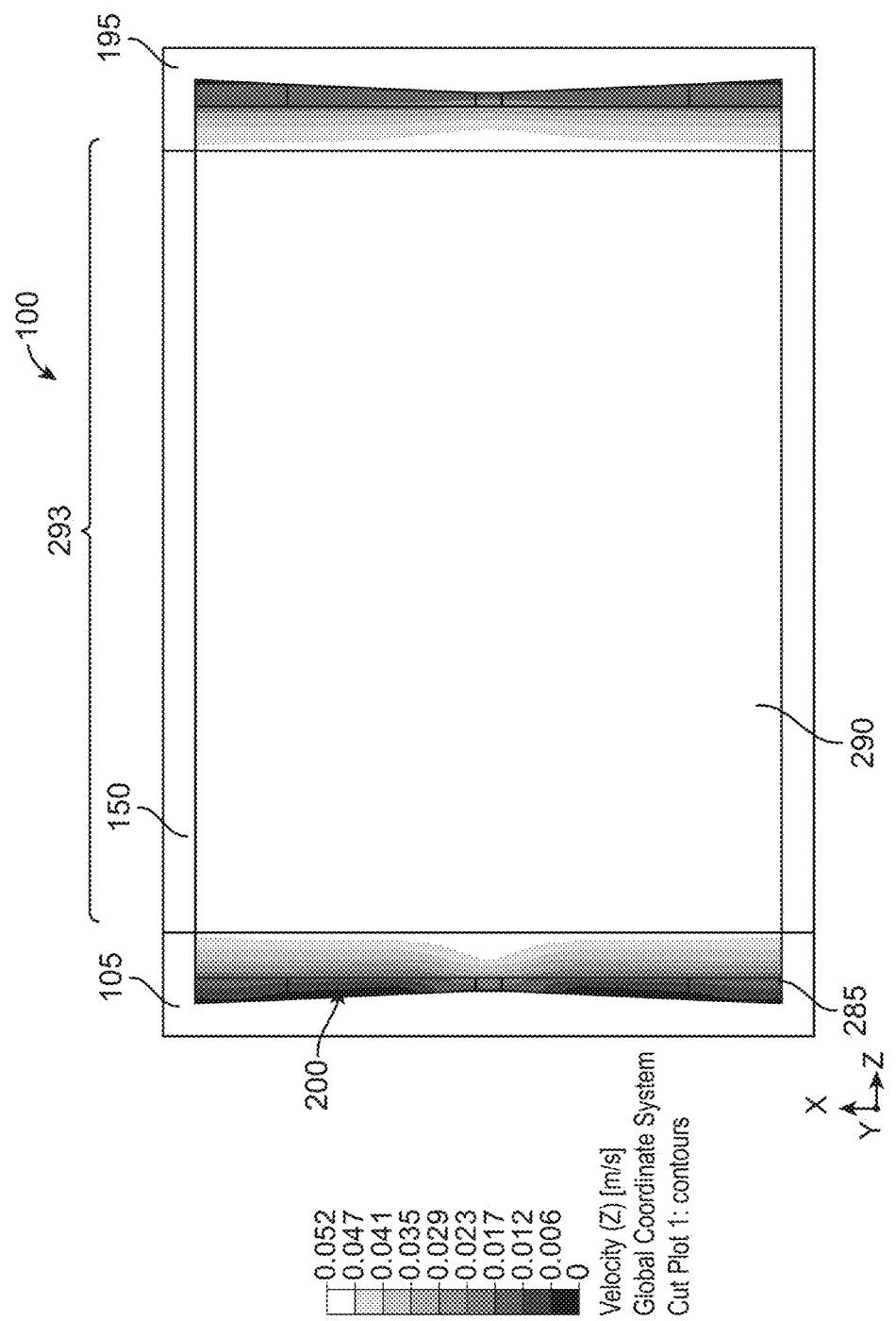
FIG. 8 is a plan wireframe view highlighting velocities of the fluid flowing at a volumetric flow rate of about 500 μL/sec in the XZ plane of the inlet transition, the channel, and the outlet transition of the type-α microfluidic device according to an exemplary embodiment.

FIG. 8 is a plan wireframe view highlighting velocities of the fluid flowing at a volumetric flow rate of about 500 μL/sec in the XZ plane of the inlet transition 285, the channel 290, and the outlet transition 295 of the type-α microfluidic device 100 according to an exemplary embodiment. That is, the volumetric flow rate of the trial illustrated in FIG. 8 is about 5 times greater than that used in the trial illustrated in FIGS. 6 and 7. Similar to the exemplary embodiments of FIGS. 4B and 5-7, inclusive, in FIG. 8, the velocity of all of the fluid flowing in the Z-direction of the channel 290 in the sensor region 293 of the device 100 at a height in the Z-direction of about 0.125 mm above the bottom surface of the channel 290 is substantially uniform, i.e., between about 47.00 mm/sec and about 52.00 mm/sec, including regions along the side edges of the channel 290.

Figure 9:
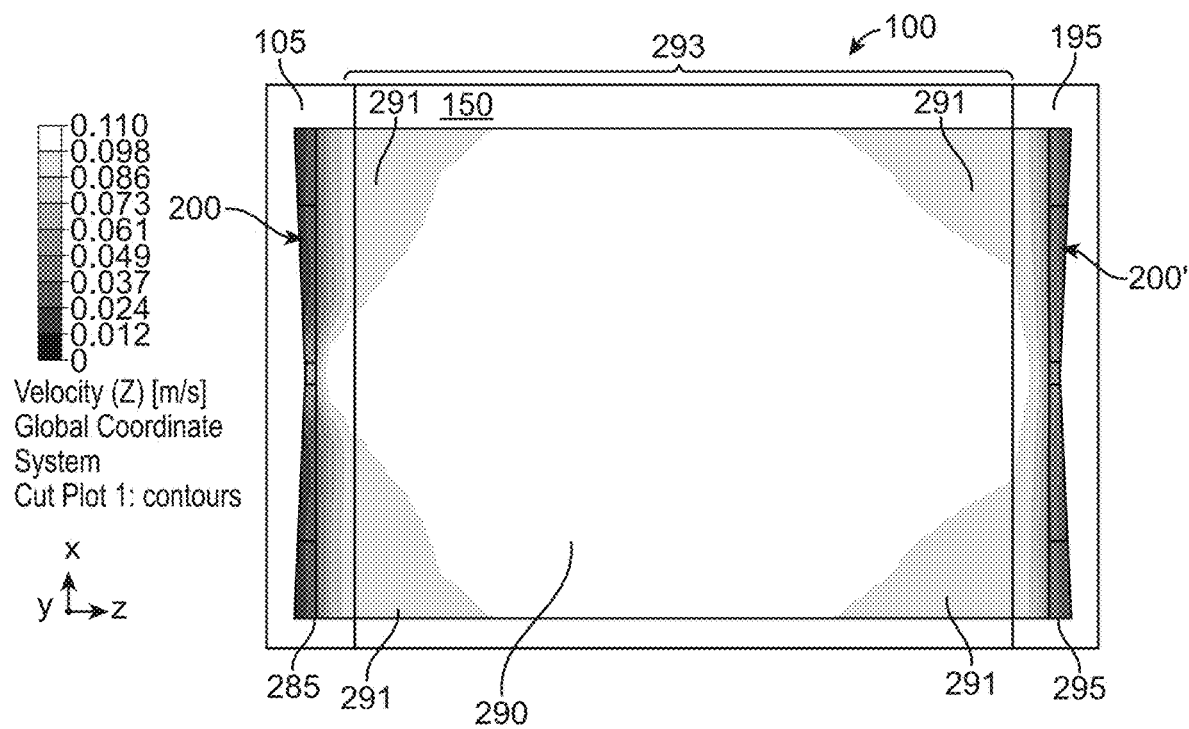
FIG. 9 is a plan wireframe view highlighting velocities of the fluid flowing at a volumetric flow rate of about 1,000 μL/sec (or about 1 milliliter (mL)/sec) in the XZ plane of the inlet transition, the channel, and the outlet transition of the type-α microfluidic device according to an exemplary embodiment.

FIG. 9 is a plan wireframe view highlighting velocities of the fluid flowing at a volumetric flow rate of about 1,000 μL/sec (or about 1 mL/sec) in the XZ plane of the inlet transition 285, the channel 290, and the outlet transition 295 of the type-α microfluidic device 100 according to an exemplary embodiment. That is, the volumetric flow rate of the trial illustrated in FIG. 9 is about 2 times greater than that used in the trial illustrated in FIG. 8. In FIG. 9, the velocity of the fluid flowing in the Z-direction of the channel 290 in the sensor region 293 of the device 100 at a height in the Z-direction of about 0.125 mm above the bottom surface of the channel 290 is significantly less than substantially uniform (even less uniform that the trial illustrated in FIG. 4A). On the left side of FIG. 9, below the inlet body 105, the velocity of the fluid flowing in the Z-direction of the channel 290 in the sensor region 293 of the device 100 varies relatively widely. That is, the velocity of the fluid flowing in the Z-direction of the device 100 is between about 0.0000 mm/sec and about 110.0 mm/sec beneath the inlet body 105; between about 86.00 mm/sec and about 110.0 mm/sec in the channel 290; and between about 110.0 mm/sec and about 24.00 mm/sec beneath the outlet body 195. The highest velocities are observed in an irregular, roughly elliptical area (as viewed in FIG. 9) extending from a point to the right of the port 205 of the inlet 200 to a point to the left of the port 205 of the outlet 200'; and the lowest velocities are observed at the left side of FIG. 9 in two zones on either side of the port 205 of the inlet 200. Within the channel 290, the highest velocities are observed in the center of the channel 290 as seen in FIG. 9. With the exemplary embodiment of FIG. 9, in four corners of the channel 290, along side edges of the regions 291 of the sensor region 293 of the device 100 located between the inlet body 105 and the outlet body 195, the velocity in the Z-direction is about 86.00 mm/sec to about 98.00 mm/sec, lower than that exhibited in the irregular, roughly elliptical area.

Figure 10:
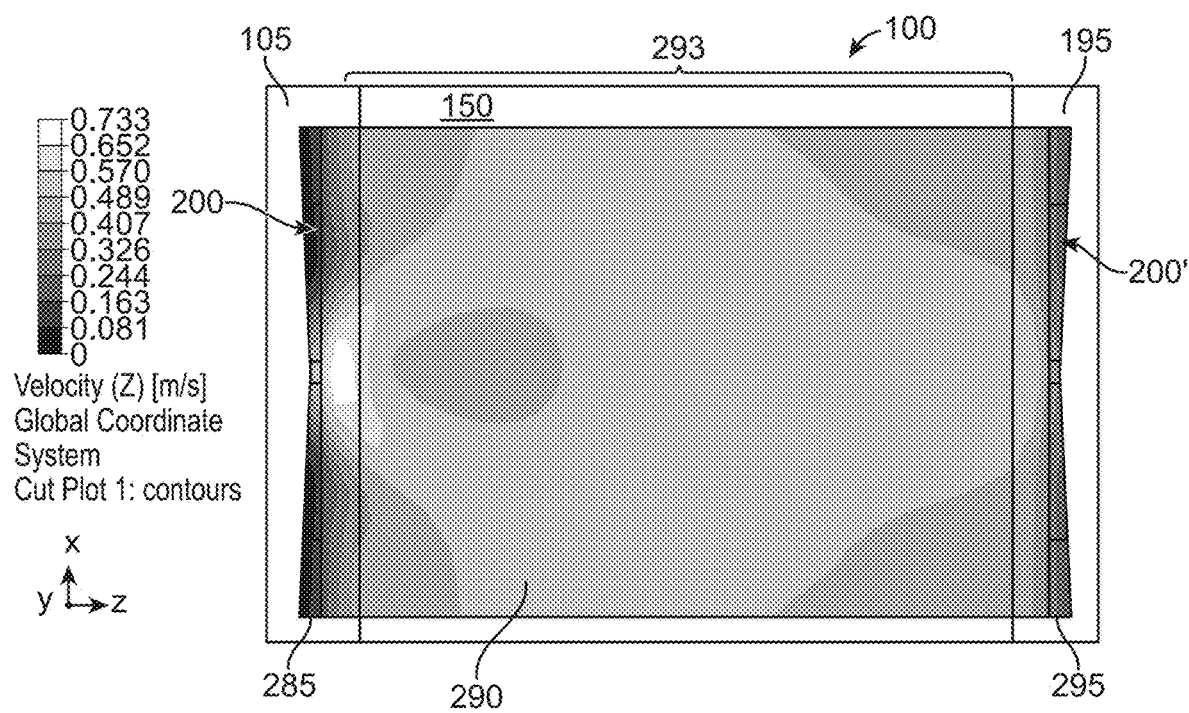
FIG. 10 is a plan wireframe view highlighting velocities of the fluid flowing at a volumetric flow rate of about 5,000 μL/sec (or about 10 mL/sec) in the XZ plane of the inlet transition, the channel, and the outlet transition of the type-α microfluidic device according to an exemplary embodiment.
Figure 11:
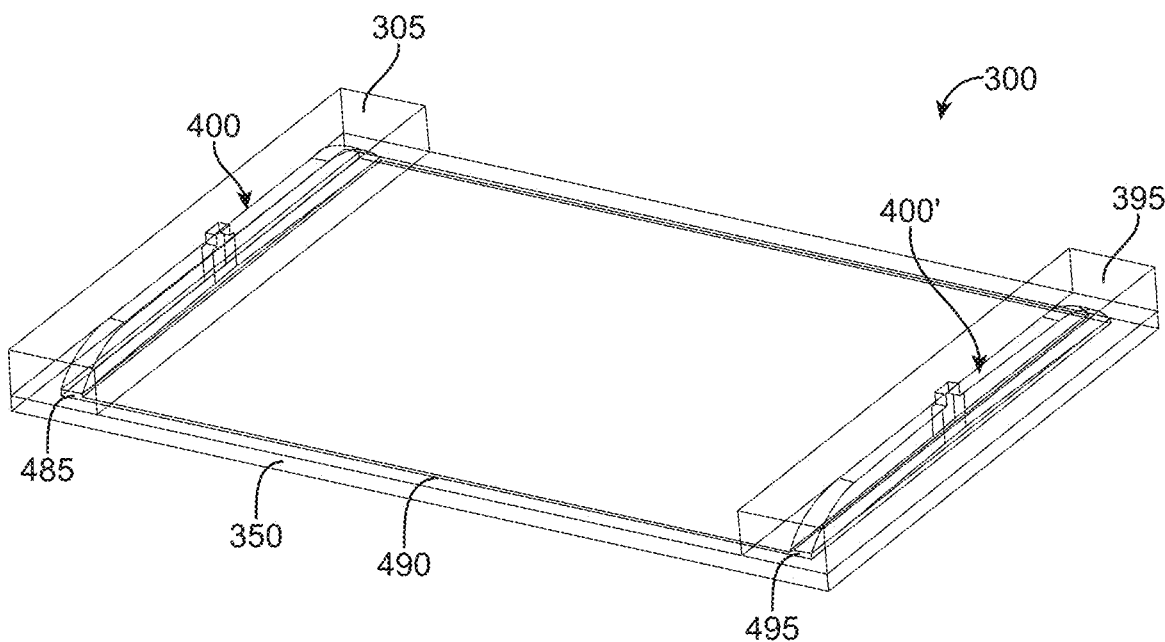
FIG. 11 is a perspective wireframe view of a type-beta (type-β) microfluidic device according to an exemplary embodiment.
Figure 12:
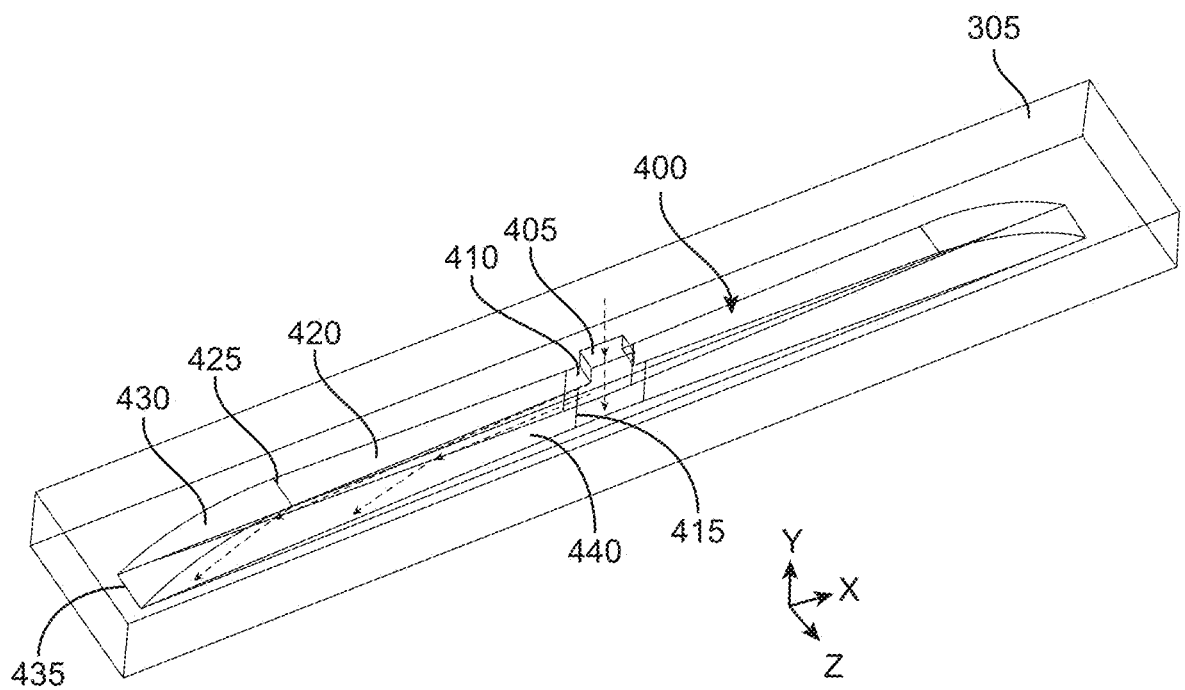
FIG. 12 is detailed perspective wireframe view of an inlet body and inlet or an outlet body and outlet of the type-β microfluidic device according to an exemplary embodiment.
Figure 13:
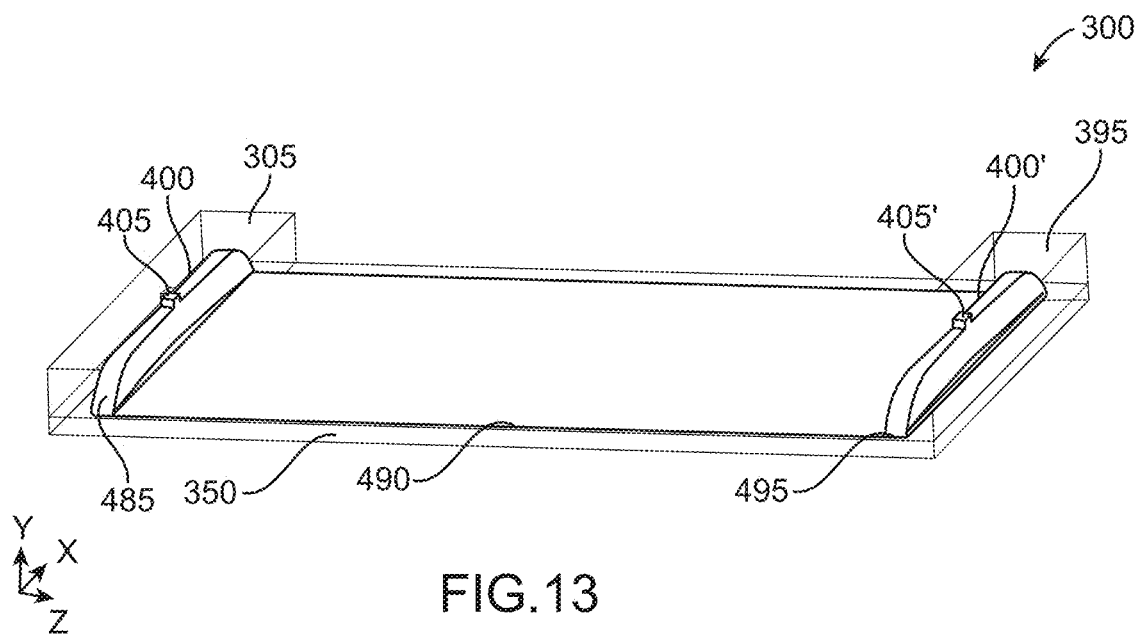
FIG. 13 is a perspective wireframe view highlighting a fluid flow region in an inlet, an inlet transition, a channel, an outlet transition, and an outlet of the type-β microfluidic device according to an exemplary embodiment.

FIG. 10 is a plan wireframe view highlighting velocities of the fluid flowing at a volumetric flow rate of about 5,000 µL/sec (or about 5 mL/sec) in the XZ plane of the inlet transition 285, the channel 290, and the outlet transition 295 of the type-α microfluidic device 100 according to an exemplary embodiment. That is, the volumetric flow rate of the trial illustrated in FIG. 10 is about 5 times greater than that used in the trial illustrated in FIG. 9. Unlike the exemplary embodiments of FIGS. 4B and 5-8, inclusive, in FIG. 10, the velocity of the fluid flowing in the Z-direction of the channel 290 in the sensor region 293 of the device 100 at a height in the Z-direction of about 0.125 mm above the bottom surface of the channel 290 is significantly less than substantially uniform (even less uniform that the trial illustrated in FIG. 4A). On the left side of FIG. 10, below the inlet body 105, the velocity of the fluid flowing in the Z-direction of the channel 290 in the sensor region 293 of the device 100 varies relatively widely. That is, the velocity of the fluid flowing in the Z-direction of the device 100 is between about 0.0000 mm/sec and about 733.0 mm/sec beneath the inlet body 105; between about 326.0 mm/sec and about 652.0 mm/sec in the channel 290; and between about 163.0 mm/sec and about 652.0 mm/sec beneath the outlet body 195. The highest velocities are observed near the port 205 of the inlet 200; and the lowest velocities are observed at the left side of FIG. 10 in two zones on either side of the port 205 of the inlet 200. Within the channel 290, the highest velocities are observed on either side of the port 205 of the inlet 200, and a localized relatively slow spot occurs within the channel 290 immediately to the right (in the Z-direction) of the port 205 of the inlet 200 as seen in FIG. 10.

FIG. 22A is a cross-section in the XY plane through the channel 290 about 3.0 mm in the Z-direction into the channel 290 relative to the port 205 of the inlet 200 of the device 100 according to an exemplary embodiment. It is to be noted that the structure of the port 205 and the inlet 200 are shown for reference and do not form a part of the XY plane in the cross-section. The velocity of the fluid flowing at a volumetric flow rate of about 100 µL/sec in the XZ plane and flowing in the Z-direction of the channel 290 is illustrated at the bottom of FIG. 22A. FIG. 22B includes a zoomed-in center portion the bottom of FIG. 22A. FIG. 22B exhibits a parabolic velocity profile where a maximum velocity is in a middle portion of the plane where all measurements of planar velocity in the Z-direction are measured, i.e., about 0.125 mm from the bottom of the channel 290. FIGS. 22A and 22B demonstrate that the velocity in the Z-direction is more uniform at about 3.0 mm in the Z-direction into the channel 290 compared to about 1.0 mm in the Z-direction into the channel 290 as shown in FIG. 23. In FIGS. 22A and 22B, the velocity in the Z-direction at about 3.0 mm in the Z-direction into the channel 290 varies from a minimum velocity of about 6 mm/s to about 7 mm/s adjacent the upper and lower edges of the channel 290, to a maximum velocity of about 11 mm/s to about 13 mm/s at a halfway point in the Y-direction of the channel, i.e., about 0.125 mm from the bottom of the channel.

FIG. 23 is a zoomed-in cross-section in the XY plane through a far-edge, left side of the channel 290 about 1.0 mm in the Z-direction into the channel 290 relative to the port 205 of the inlet 200 of the device 100 according to an exemplary embodiment, i.e., the cross-section is closer to the inlet 200 than the cross-sections of FIGS. 22A and 22B. Only one side (the negative X-direction side) of the channel 290 of the device 100 is shown. The velocity of the fluid flowing at a volumetric flow rate of about 100 µL/sec in the XZ plane and flowing in the Z-direction of the channel 290 is illustrated at the bottom of FIG. 23. FIG. 23 demonstrates that the velocity in the Z-direction is less uniform at 1.0 mm in the Z-direction into the channel 290 compared to 3.0 mm in the Z-direction into the channel 290 as shown in FIGS. 22A and 22B. Also, please note, FIG. 23 demonstrates that a maximum velocity in the channel 290 does not necessarily extend all the way to an edge of the channel 290. The resolution of the analysis system used to generate FIG. 23 in the XY plane does not result in data associated with and display of relatively slower velocities close to the edge of the channel in all XZ plane velocity profiles presented in the present specification. To the extent that FIG. 23 may suggest that relatively high velocities (on the order of 13 mm/sec) extend all the way or very nearly all the way to the edge of the channel 290, this may be an artifact of the resolution and analysis system used to generate FIG. 23. It is generally known with the present structure that relatively slower velocities occur relatively close to the edge of the channel 290 on the order of about half the height of the channel 290, i.e., within about 0.000 mm to about 0.125 mm in an X-direction from the edge of the channel. The maximum velocity would not, in fact, physically reach the edges of the channel 290 as suggested by the extension of the velocities of about 11.00 mm/sec to about 13.00 mm/sec on the left side of FIG. 23. In other words, the left and right side edges of the channel 290 could reasonably be expected to have graduated velocity profiles similar to the top and bottom edges of the channel 290.

Further, FIG. 23 illustrates that the most uniform velocity in the channel 290 continues to occur about halfway up the channel 290 in the Y-direction. For example, when the channel 290 has a length in the Y-direction of about 0.250 mm, the most uniform velocity occurs at about 0.125 mm from the bottom of the channel 290 in the Y-direction. On the right side of FIG. 23B, the predominant velocity in the Z-direction is between about 6.000 mm/sec and about 13.00 mm/sec. Whereas, at the leftmost side of FIG. 23B, corresponding with a side edge of the channel 290, the velocity in the Z-direction is between about 6.000 mm/sec and about 11.00 mm/sec. Near the top of the channel 290, the velocity in the Z-direction is between about 6.000 mm/sec and about 7.000 mm/sec. Near the bottom of the channel 290, the velocity in the Z-direction is between about 4.000 mm/sec and about 6.000 mm/sec. In other words, there is greater variation of the velocity in the Z-direction near the edges of the channel 290 as compared to the center of the channel 290.

FIGS. 24-28 and 30 illustrate velocity profiles in the XZ plane for the type-α microfluidic device having scaled-down (FIGS. 24-28) inlet 200 and outlet 200' structures, and scaled-up (FIG. 30) inlet 200 and outlet 200' structures. FIG. 29 is another velocity profile in the XZ plane for the type-α microfluidic device having full-scale (100%) inlet 200 and outlet 200' structures with fluid flowing at a volumetric flow rate of 2,000 µL/sec (or about 2 mL/sec), i.e., for the purpose of analyzing the full-scale (100%) inlet 200 and outlet 200', FIG. 29 may be viewed in sequence after FIG. 9 (about 1 mL/sec) and before FIG. 10 (about 5 mL/sec).

As used in this section, the terms "scaled-down", "scaled-up", "full-scale (100%)" and the like are intended to refer to differences in inlet 200 and outlet 200' structures relative to those of the type-α microfluidic device having the depth 210 of the port 205 in the Z-direction of about 1.0 mm and having the depth 235 in the Z-direction of the end of the curved and tapered region 230 of about 2.0 mm. The terms scaled-down, scaled-up, full-scale (100%) and the like should not be construed as qualitative. In other words, for example, the term "full-scale (100%)" is used as a matter of convenience to denote a reference design to which other designs were compared. Also, as used herein, the term "scale" and variants (i.e., half-scale, three-quarter scale (75%), etc.) may, in some embodiments, refer to changes of two dimensions of the inlet 200 and the outlet 200', i.e., e.g., the depth 210 of the port 205 in the Z-direction and the depth 235 in the Z-direction of the end of the curved and tapered region 230. In FIGS. 24-28 and 30, other than the depth 210 and the depth 235, other features of the device 100 may be the same as those of the full-scale (100%) version described above, e.g., the exemplary embodiment of FIGS. 1-3.

Figure 24:
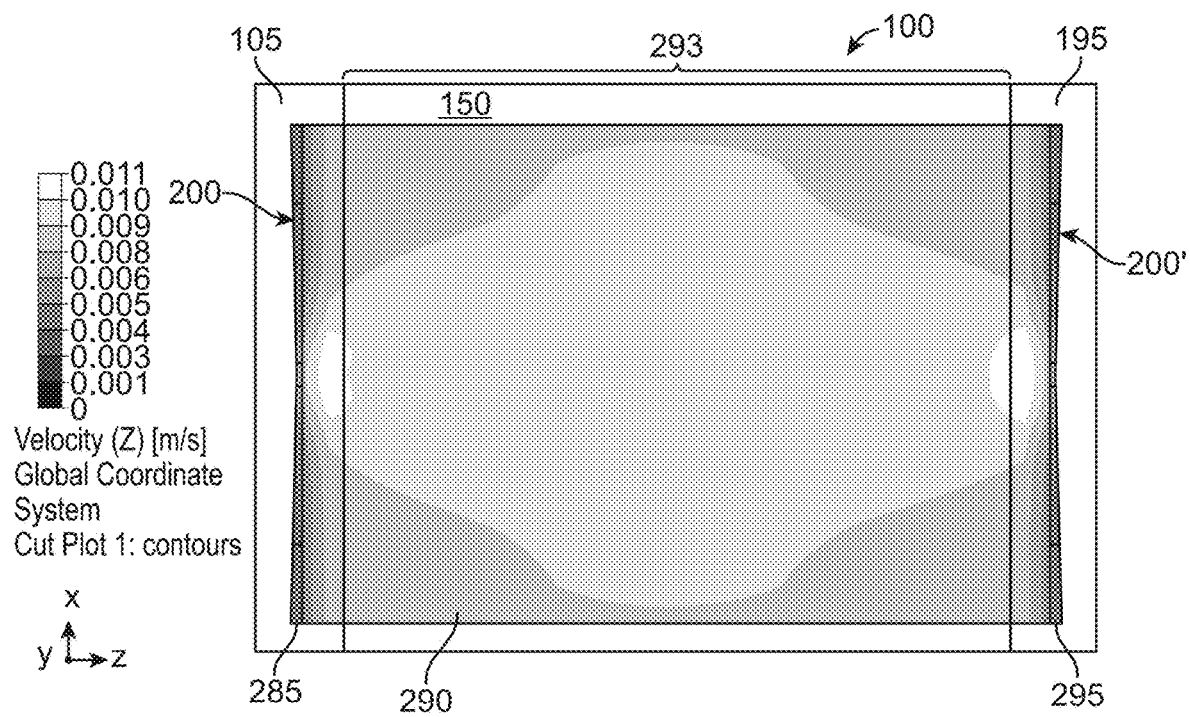
FIG. 24 is a plan wireframe view highlighting velocities of a fluid flowing at a volumetric flow rate of about 100 μL/sec in the XZ plane of the inlet transition, the channel, and the outlet transition of a type-α microfluidic device with a half-scale (50%) inlet/outlet according to an exemplary embodiment.

FIG. 24 is a plan wireframe view highlighting velocities of a fluid flowing at a volumetric flow rate of about 100 μL/sec in the XZ plane of the inlet transition, the channel, and the outlet transition of a type-α microfluidic device 100 with a half-scale (50%) inlet 200/outlet 200' according to an exemplary embodiment. The depth 210 of the port 205 in the Z-direction may be about 0.5 mm, and the depth 235 in the Z-direction of the end of the curved and tapered region 230 may be about 1.0 mm. The total volume of the type-α microfluidic device 100 may be about 967 μL, the volume of the channel 290 may be about 742.5 μL, the volume of the inlet 200 or the outlet 200' may be about 112.25 μL, and the volume of the inlet 200 and the outlet 200' may be about 224.5 μL. As such, a percentage of the volume of the inlet 200 and the outlet 200' to the total volume of the type-α microfluidic device 100 may be about 23.21%.

With the exemplary embodiment of FIG. 24, the velocity of fluid flowing in the Z-direction in the inlet transition 285 and the channel 290 varies from about 4.000 mm/sec to about 11.00 mm/sec in a region of the inlet transition 285 and the channel 290 located directly below the inlet body 105. Similarly, the velocity of fluid flowing in the Z-direction in the channel 290 and the outlet transition 295 varies from about 11.00 mm/sec to about 4.000 mm/sec in a region of the channel 290 and the outlet transition 295 located directly below the outlet body 195. The velocity of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 varies from about 8.000 mm/sec to about 11.00 mm/sec. The peak velocity is about 10.00 mm/sec to about 11.00 mm/sec and occurs in two regions, one relatively close to the port 205 of the inlet 200 and the other relatively close to the port 205 of the outlet 200'. From the standpoint of substantially uniform velocity in the Z-direction, at the volumetric flow rate of about 100 μL/sec, the half-scale (50%) inlet 200/outlet 200' is less ideal than other scales at the same or similar volumetric flow rates.

Figure 25:
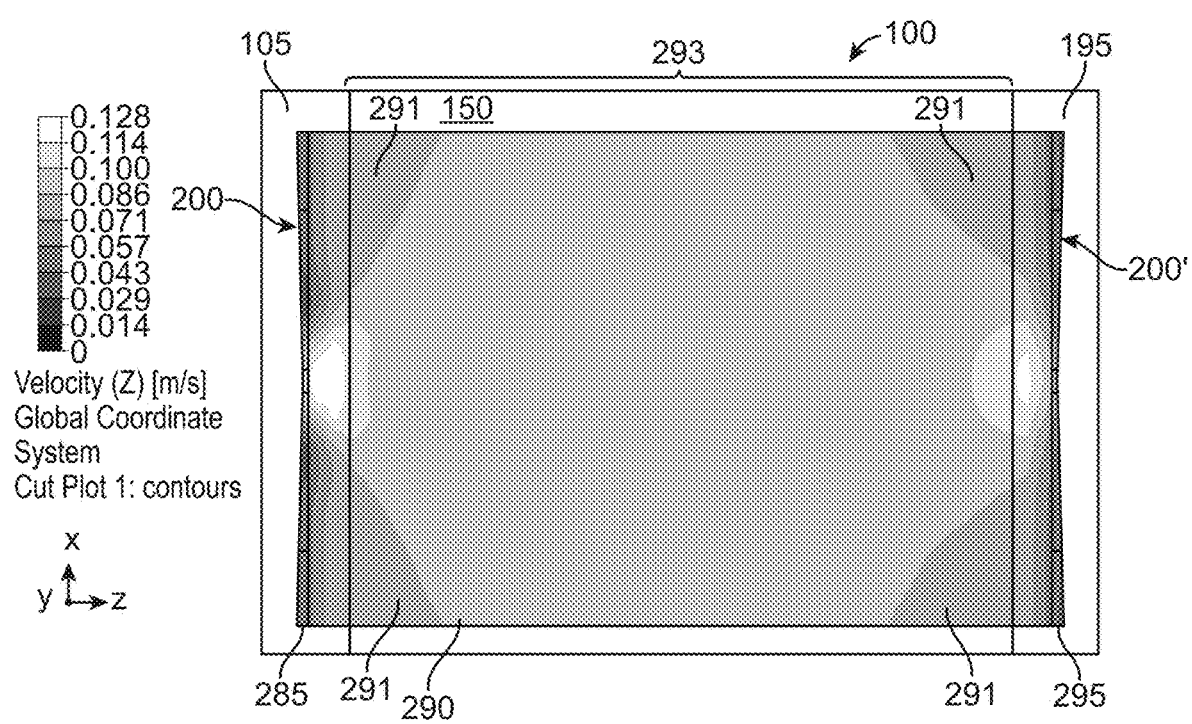
FIG. 25 is a plan wireframe view highlighting velocities of the fluid flowing at a volumetric flow rate of about 1 mL/sec in the XZ plane of the inlet transition, the channel, and the outlet transition of the type-α microfluidic device with the half-scale (50%) inlet/outlet according to an exemplary embodiment.

FIG. 25 is a plan wireframe view highlighting velocities of the fluid flowing at a volumetric flow rate of about 1 mL/sec in the XZ plane of the inlet transition, the channel, and the outlet transition of the type-α microfluidic device 100 with the half-scale (50%) inlet 200/outlet 200' according to an exemplary embodiment. That is, the volumetric flow rate is about 10 times greater than that for the trial shown in FIG. 24. The design of the inlet 200/outlet 200' of FIG. 25 is identical to that of FIG. 24.

With the exemplary embodiment of FIG. 25, the velocity of fluid flowing in the Z-direction in the inlet transition 285 and the channel 290 varies from about 43.00 mm/sec to about 128.0 mm/sec in a region of the inlet transition 285 and the channel 290 located directly below the inlet body 105. Similarly, the velocity of fluid flowing in the Z-direction in the channel 290 and the outlet transition 295 varies from about 128.0 mm/sec to about 43.00 mm/sec in a region of the channel 290 and the outlet transition 295 located directly below the outlet body 195. The velocity of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 varies from about 71.00 mm/sec to about 114.0 mm/sec. The peak velocity is about 114.0 mm/sec to about 128.0 mm/sec and occurs in two regions, one relatively close to the port 205 of the inlet 200 and the other relatively close to the port 205 of the outlet 200'. From the standpoint of substantially uniform velocity in the Z-direction, at the volumetric flow rate of about 1 mL/sec, the half-scale (50%) inlet 200/outlet 200' is less ideal than other scales at the same or similar volumetric flow rates.

Figure 26:
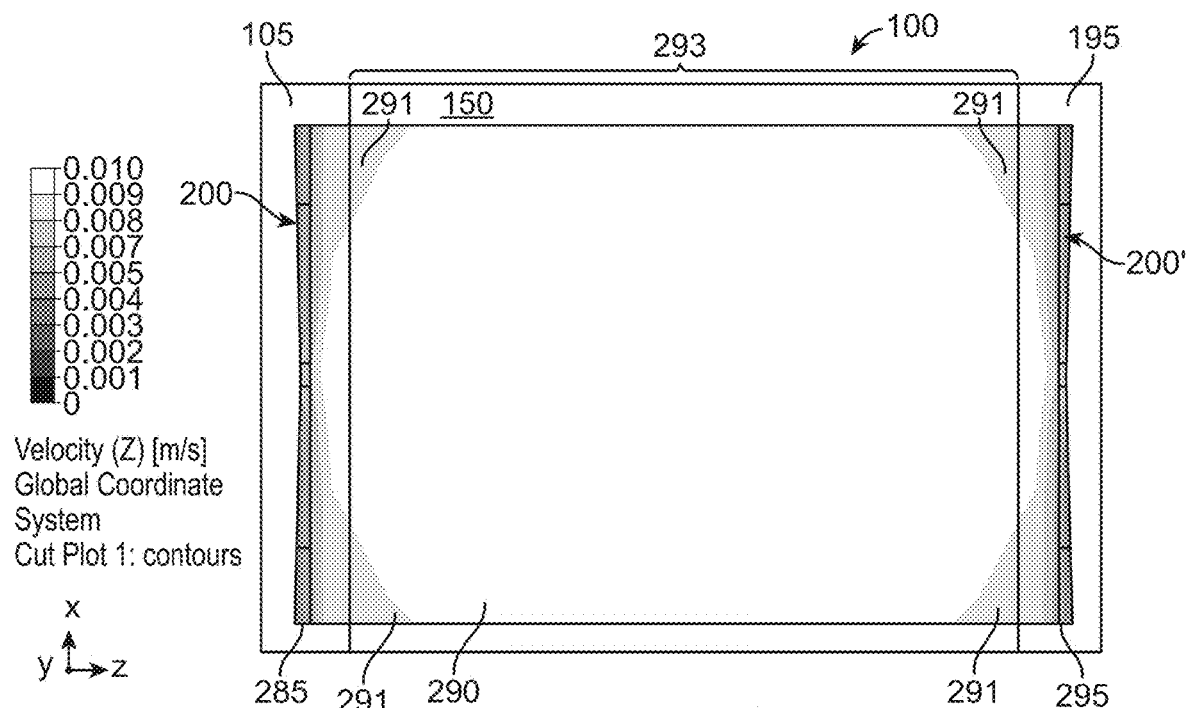
FIG. 26 is a plan wireframe view highlighting velocities of the fluid flowing at a volumetric flow rate of about 100 μL/sec in the XZ plane of the inlet transition, the channel, and the outlet transition of a type-α microfluidic device with a three-quarter scale (75%) inlet/outlet according to an exemplary embodiment.

FIG. 26 is a plan wireframe view highlighting velocities of the fluid flowing at a volumetric flow rate of about 100 μL/sec in the XZ plane of the inlet transition, the channel, and the outlet transition of a type-α microfluidic device with a three-quarter scale (75%) inlet 200/outlet 200' according to an exemplary embodiment. The depth 210 of the port 205 in the Z-direction may be about 0.75 mm, and the depth 235 in the Z-direction of the end of the curved and tapered region 230 may be about 1.5 mm. The total volume of the type-α microfluidic device 100 may be about 1,067 μL, the volume of the channel 290 may be about 742.5 μL, the volume of the inlet 200 or the outlet 200' may be about 162.25 μL, and the volume of the inlet 200 and the outlet 200' may be about 324.5 μL. As such, a percentage of the volume of the inlet 200 and the outlet 200' to the total volume of the type-α microfluidic device 100 may be about 30.41%.

With the exemplary embodiment of FIG. 26, the velocity of fluid flowing in the Z-direction in the inlet transition 285 and the channel 290 varies from about 4.000 mm/sec to about 10.00 mm/sec in a region of the inlet transition 285 and the channel 290 located directly below the inlet body 105. Similarly, the velocity of fluid flowing in the Z-direction in the channel 290 and the outlet transition 295 varies from about 10.00 mm/sec to about 4.000 mm/sec in a region of the channel 290 and the outlet transition 295 located directly below the outlet body 195. The velocity of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 varies from about 8.000 mm/sec to about 10.00 mm/sec. In four corners of the channel 290, in regions 291 of the sensor region 293 of the device 100 located between the inlet body 105 and the outlet body 195, the velocity in the Z-direction is about 8.000 mm/sec to about 9.000 mm/sec. The peak velocity is about 9.000 mm/sec to about 10.00 mm/sec and occurs across a substantial portion of the channel 290 and in portions of the device 100 below the inlet body 105 and below the outlet body 195 adjacent to the channel 290. From the standpoint of substantially uniform velocity in the Z-direction, at the volumetric flow rate of about 100 μL/sec, the three-quarter scale (75%) inlet 200/outlet 200' is closer to ideal than the relatively smaller scale device but less ideal than other scales at the same or similar volumetric flow rates.

Figure 27:
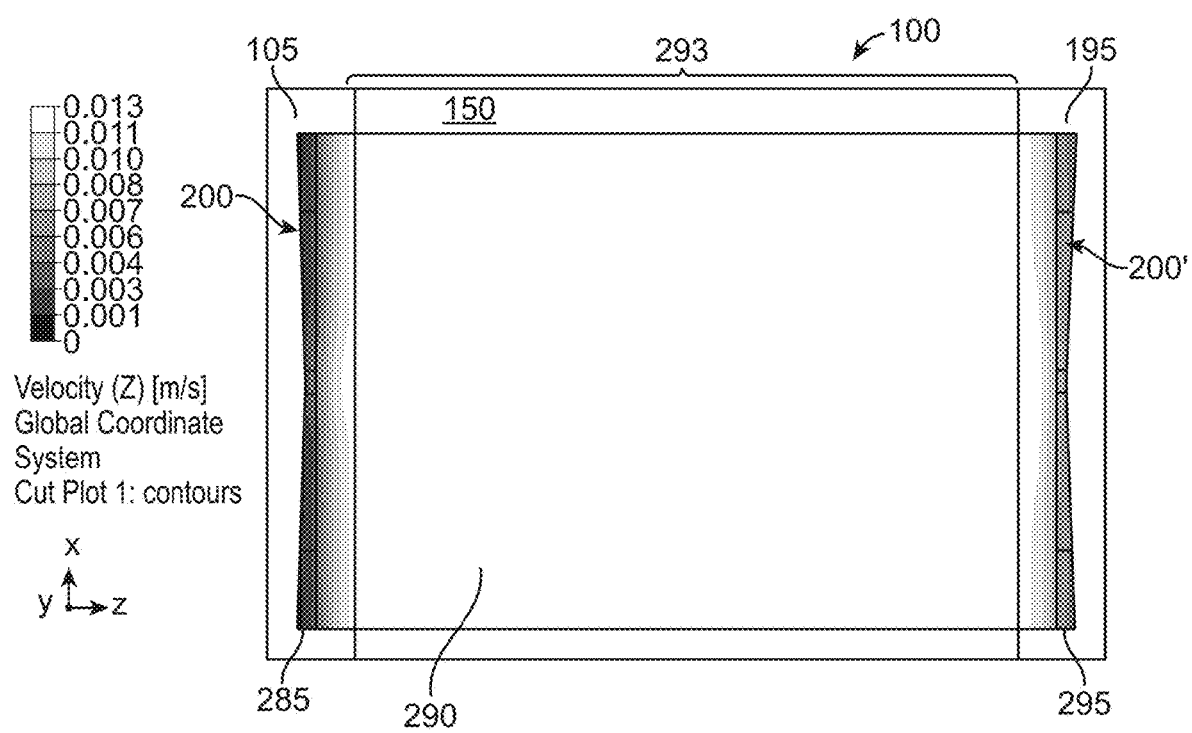
FIG. 27 is a plan wireframe view highlighting velocities of the fluid flowing at a volumetric flow rate of about 100 μL/sec in the XZ plane of the inlet transition, the channel, and the outlet transition of a type-α microfluidic device with a nine-tenths scale (90%) inlet/outlet according to an exemplary embodiment.

FIG. 27 is a plan wireframe view highlighting velocities of the fluid flowing at a volumetric flow rate of about 100 μL/sec in the XZ plane of the inlet transition, the channel, and the outlet transition of a type-α microfluidic device with a nine-tenths scale (90%) inlet 200/outlet 200' according to an exemplary embodiment. The depth 210 of the port 205 in the Z-direction may be about 0.9 mm, and the depth 235 in the Z-direction of the end of the curved and tapered region 230 may be about 1.8 mm. The total volume of the type-α microfluidic device 100 may be about 1,128 μL, the volume of the channel 290 may be about 742.5 μL, the volume of the inlet 200 or the outlet 200' may be about 192.75 μL, and the volume of the inlet 200 and the outlet 200' may be about 385.5 μL. As such, a percentage of the volume of the inlet 200 and the outlet 200' to the total volume of the type-α microfluidic device 100 may be about 34.18%.

With the exemplary embodiment of FIG. 27, the velocity of fluid flowing in the Z-direction in the inlet transition 285 and the channel 290 varies from about 0.0000 mm/sec to about 13.00 mm/sec in a region of the inlet transition 285 and the channel 290 located directly below the inlet body 105. Similarly, the velocity of fluid flowing in the Z-direction in the channel 290 and the outlet transition 295 varies from about 13.00 mm/sec to about 6.000 mm/sec in a region of the channel 290 and the outlet transition 295 located directly below the outlet body 195. That is, the velocity varies widely in the transitions 285 and 295. In contrast, the velocity of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 varies from about 11.00 mm/sec to about 13.00 mm/sec. The peak velocity is about 11.00 mm/sec to about 13.00 mm/sec and occurs across a substantial portion of or an entirety of the channel 290. From the standpoint of substantially uniform velocity in the Z-direction, at the volumetric flow rate of about 100 μL/sec, the nine-tenths scale (90%) inlet 200/outlet 200' is closer to ideal than the relatively smaller scale devices and comparable with that of the designs with a full-scale (100%) inlet 200/outlet 200' at the same or similar volumetric flow rates.

Figure 28:
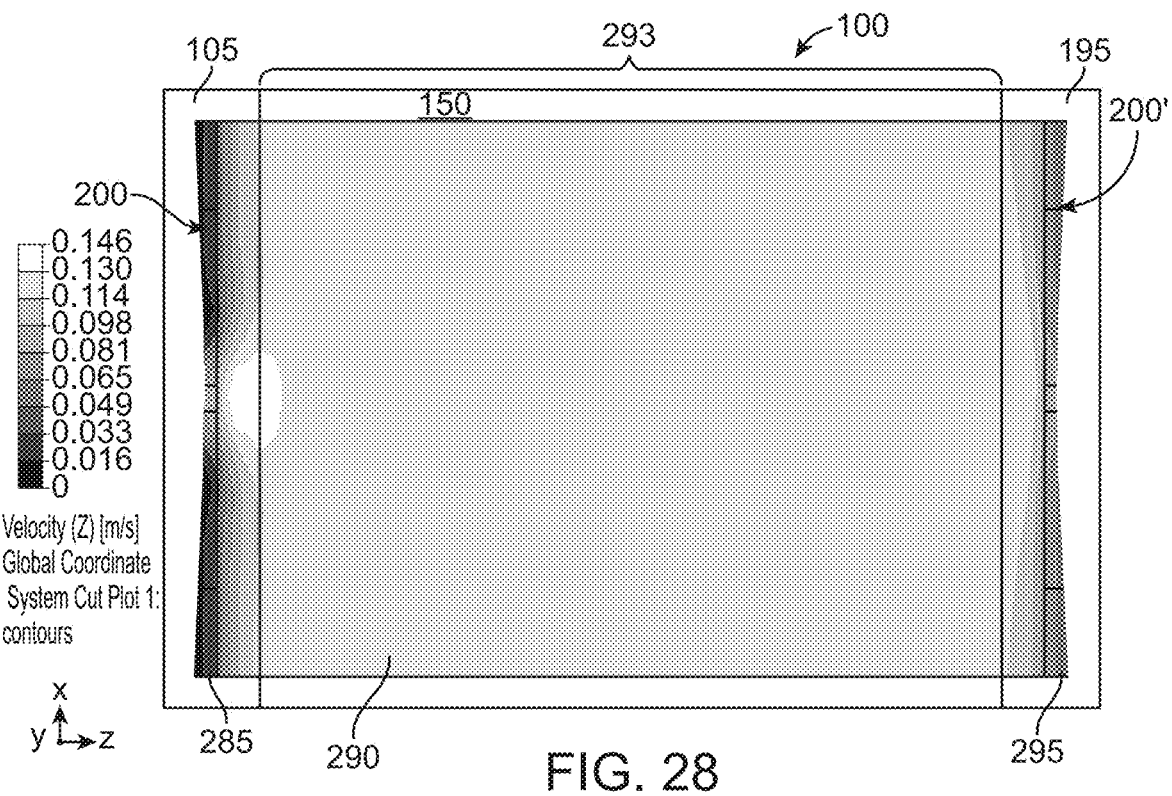
FIG. 28 is a plan wireframe view highlighting velocities of the fluid flowing at a volumetric flow rate of about 1 mL/sec in the XZ plane of the inlet transition, the channel, and the outlet transition of the type-α microfluidic device with the nine-tenths scale (90%) inlet/outlet according to an exemplary embodiment.
Figure 29:
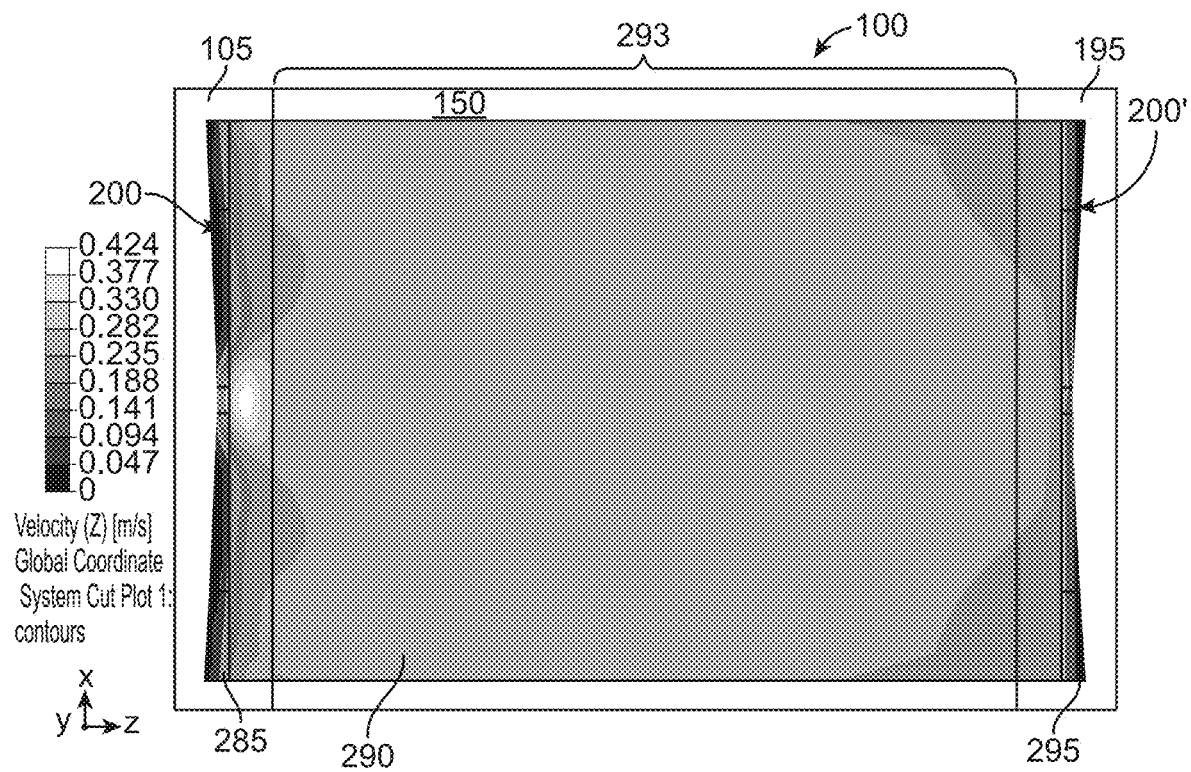
FIG. 29 is a plan wireframe view highlighting velocities of the fluid flowing at a volumetric flow rate of about 2 mL/sec in the XZ plane of the inlet transition, the channel, and the outlet transition of the type-α microfluidic device with a full-scale (100%) inlet/outlet according to an exemplary embodiment.

FIG. 28 is a plan wireframe view highlighting velocities of the fluid flowing at a volumetric flow rate of about 1 mL/sec in the XZ plane of the inlet transition, the channel, and the outlet transition of the type-α microfluidic device 100 with the nine-tenths scale (90%) inlet 200/outlet 200' according to an exemplary embodiment. That is, the volumetric flow rate is about 10 times greater than that for the trial shown in FIG. 27.

With the exemplary embodiment of FIG. 28, the velocity of fluid flowing in the Z-direction in the inlet transition 285 and the channel 290 varies from about 16.00 mm/sec to about 146.0 mm/sec in a region of the inlet transition 285 and the channel 290 located directly below the inlet body 105. Similarly, the velocity of fluid flowing in the Z-direction in the channel 290 and the outlet transition 295 varies from about 130.0 mm/sec to about 49.00 mm/sec in a region of the channel 290 and the outlet transition 295 located directly below the outlet body 195. The velocity of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 varies from about 98.00 mm/sec to about 146.0 mm/sec. Over a substantial portion of the channel 290, the velocity of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 varies from about 114.0 mm/sec to about 130.0 mm/sec. The peak velocity is about 130.0 mm/sec to about 146.0 mm/sec and occurs in one region relatively close to the port 205 of the inlet 200. From the standpoint of substantially uniform velocity in the Z-direction, at the volumetric flow rate of about 1 mL/sec, the nine-tenths scale (90%) inlet 200/outlet 200' is less ideal than other scales at the same or similar volumetric flow rates but substantially closer to ideal than many of the relatively smaller scale devices.

FIG. 29 is a plan wireframe view highlighting velocities of the fluid flowing at a volumetric flow rate of about 2 mL/sec in the XZ plane of the inlet transition, the channel, and the outlet transition of the type-α microfluidic device 100 with a full-scale (100%) inlet 200/outlet 200' according to an exemplary embodiment. As noted in detail above, for the type-α microfluidic device 100 with the full-scale (100%) inlet 200/outlet 200', the depth 210 in the Z-direction of the port 205 may be about 1.0 mm, and the depth 235 in the Z-direction of the end of the curved and tapered region 230 may be about 2.0 mm.

In FIG. 29, the velocity of the fluid flowing in the Z-direction of the device 100 is between about 0.0000 mm/sec and about 424.0 mm/sec beneath the inlet body 105; between about 188.0 mm/sec and about 282.0 mm/sec in the channel 290; and between about 47.00 mm/sec and about 282.0 mm/sec beneath the outlet body 195. The highest velocities, between about 377.0 mm/sec to about 424.0 mm/sec, are observed near the port 205 of the inlet 200; and the lowest velocities, between about 0.0000 mm/sec and about 47.00 mm/sec, are observed at the left side of FIG. 29 in two zones on either side of the port 205 of the inlet 200. Within the channel 290, the highest velocities are observed in an irregular shaped region across a substantial portion of the channel 290 having velocities between about 235.0 mm/sec and about 282.0 mm/sec.

When FIG. 29 is viewed in sequence after FIG. 9 (about 1 mL/sec) and before FIG. 10 (about 10 mL/sec), i.e., in a progression from FIG. 4 to FIG. 10, inclusive, the type-α microfluidic device 100 with the full-scale (100%) inlet 200/outlet 200' exhibits substantially uniform velocity of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 at multiple volumetric flow rates including 1 μL/sec (FIG. 4B), 10 μL/sec (FIG. 5), 100 μL/sec (FIGS. 6 and 7), and 500 μL/sec (FIG. 8). Between the volumetric flow rate of 0.1 μL/sec (FIG. 4A) and 1 μL/sec (FIG. 4B), the velocity of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 transitions from partially uniform to substantially uniform. Conversely, between the volumetric flow rate of 500 μL/sec (FIG. 8) and 1 mL/sec (FIG. 9), the velocity of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 transitions from substantially uniform to partially uniform. Between the volumetric flow rate of 1 mL/sec (FIG. 9) and 2 mL/sec (FIG. 29) and 5 mL/sec (FIG. 10), the velocity of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 transitions from partially uniform to substantially non-uniform. That is, the type-α microfluidic device 100 with the full-scale (100%) inlet 200/outlet 200' exhibits substantially uniform velocity of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 at volumetric flow rates between about 0.5 μL/sec and about 750 μL/sec, more specifically between about 1 μL/sec and about 500 μL/sec.

A range of a maximum substantially uniform velocity in the Z-direction of the channel 290 in the sensor region 293 of the device 100 located between the inlet body 105 and the outlet body 195 of between about 47.00 mm/sec and about 52.00 mm/sec was achieved with the type-α microfluidic device 100 with the full-scale (100%) inlet 200/outlet 200' when the volumetric flow rate of the fluid was about 500 μL/sec (FIG. 8). Also, a range of a minimum substantially uniform velocity in the Z-direction of the channel 290 in the sensor region 293 of the device 100 located between the inlet body 105 and the outlet body 195 of between about 0.08788 mm/sec to about 0.09886 mm/sec was achieved with the type-α microfluidic device 100 with the full-scale (100%) inlet 200/outlet 200' when the volumetric flow rate of the fluid was about 1 μL/sec (FIG. 4B).

Figure 30:
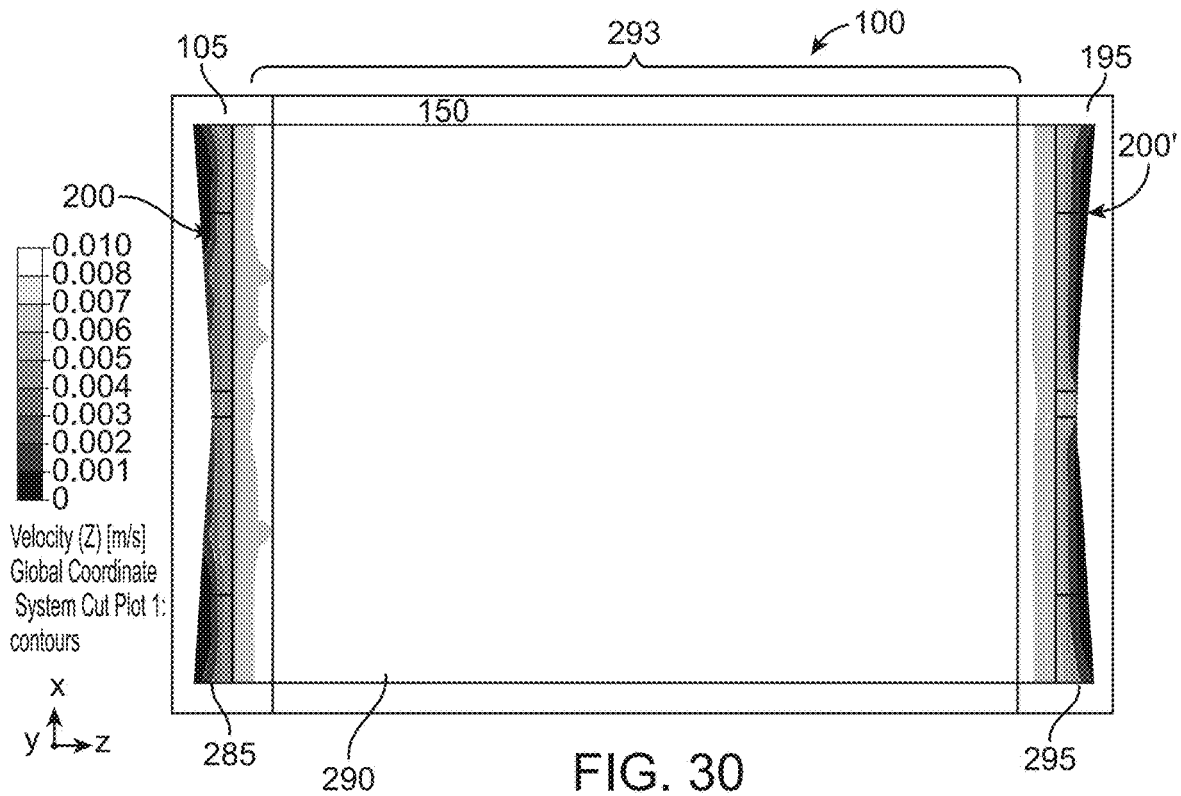
FIG. 30 is a plan wireframe view highlighting velocities of the fluid flowing at a volumetric flow rate of about 100 μL/sec in the XZ plane of the inlet transition, the channel, and the outlet transition of a type-α microfluidic device with a three-to-two scale (150%) inlet/outlet according to an exemplary embodiment.

FIG. 30 is a plan wireframe view highlighting velocities of the fluid flowing at a volumetric flow rate of about 100 μL/sec in the XZ plane of the inlet transition, the channel, and the outlet transition of a type-α microfluidic device with a three-to-two scale (150%) inlet 200/outlet 200' according to an exemplary embodiment. For the type-α microfluidic device 100 with the three-to-two scale (150%) inlet 200/outlet 200', the depth 210 in the Z-direction of the port 205 may be about 1.5 mm, and the depth 235 in the Z-direction of the end of the curved and tapered region 230 may be about 3.0 mm. The total volume of the type-α microfluidic device 100 with the three-to-two scale (150%) inlet 200/outlet 200' may be about 1,370 μL, the volume of the channel 290 may be about 742.5 μL, the volume of the inlet 200 or the outlet 200' may be about 313.75 μL, and the volume of the inlet 200 and the outlet 200' may be about 627.5 μL. As such, a percentage of the volume of the inlet 200 and the outlet 200' to the total volume of the type-α microfluidic device 100 may be about 45.80%. FIG. 30 is a velocity profile in the XZ plane for the type-α microfluidic device having the three-to-two scale (150%) inlet 200 and outlet 200' structures with fluid flowing at a volumetric flow rate of about 100 μL/sec.

When FIG. 30 is viewed in a progression from FIG. 26 to FIG. 27 to FIG. 6 to FIG. 30, each of the type-α microfluidic device 100 with the nine-tenths scale (90%) inlet 200/outlet 200' (FIG. 27), with the full-scale (100%) inlet 200/outlet 200' (FIG. 6), and with the three-to-two scale (150%) inlet 200/outlet 200' (FIG. 30) exhibits substantially uniform velocity of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 at the volumetric flow rate of about 100 μL/sec. Between the three-quarter scale (75%) inlet 200/outlet 200' (FIG. 26) and the nine-tenths scale (90%) inlet 200/outlet 200' (FIG. 27), the velocity of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 transitions from partially non-uniform to substantially or entirely uniform. The type-α microfluidic device 100 with the nine-tenths scale (90%) inlet 200/outlet 200' (FIG. 27) at the volumetric flow rate of about 100 μL/sec exhibits substantially uniform velocity of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 in a range of about 11.00 mm/sec to about 13.00 mm/sec. The type-α microfluidic device 100 with the full-scale (100%) inlet 200/outlet 200' (FIG. 6) at the volumetric flow rate of about 100 μL/sec exhibits substantially uniform velocity of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 in a range of about 9.000 mm/sec to about 10.00 mm/sec. The type-α microfluidic device 100 with the three-to-two scale (150%) inlet 200/outlet 200' (FIG. 30) at the volumetric flow rate of about 100 μL/sec exhibits substantially uniform velocity of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 in a range of about 8.000 mm/sec to about 10.00 mm/sec.

Figure 31:
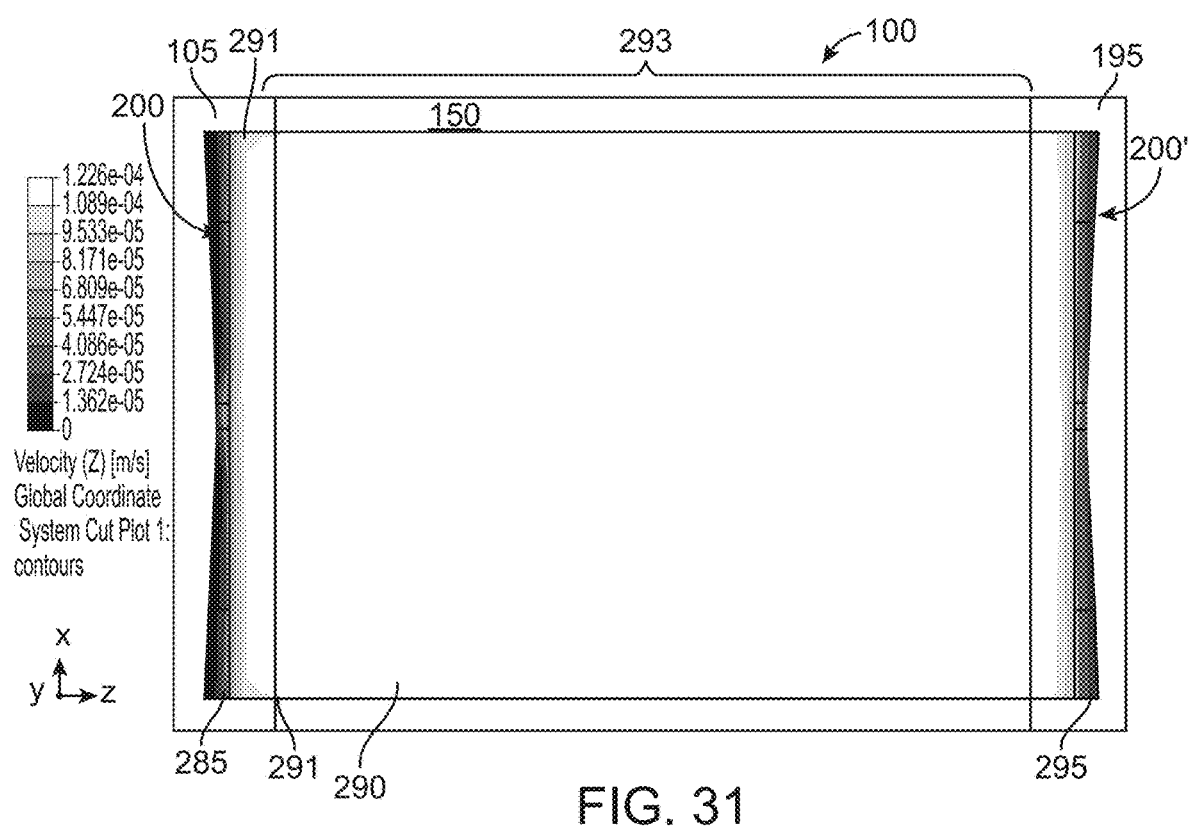
FIG. 31 is a plan wireframe view highlighting velocities of a fluid having 100 times greater viscosity than water flowing at a volumetric flow rate of about 1 μL/sec in the XZ plane of the inlet transition, the channel, and the outlet transition of the type-α microfluidic device according to an exemplary embodiment.
Figure 32:
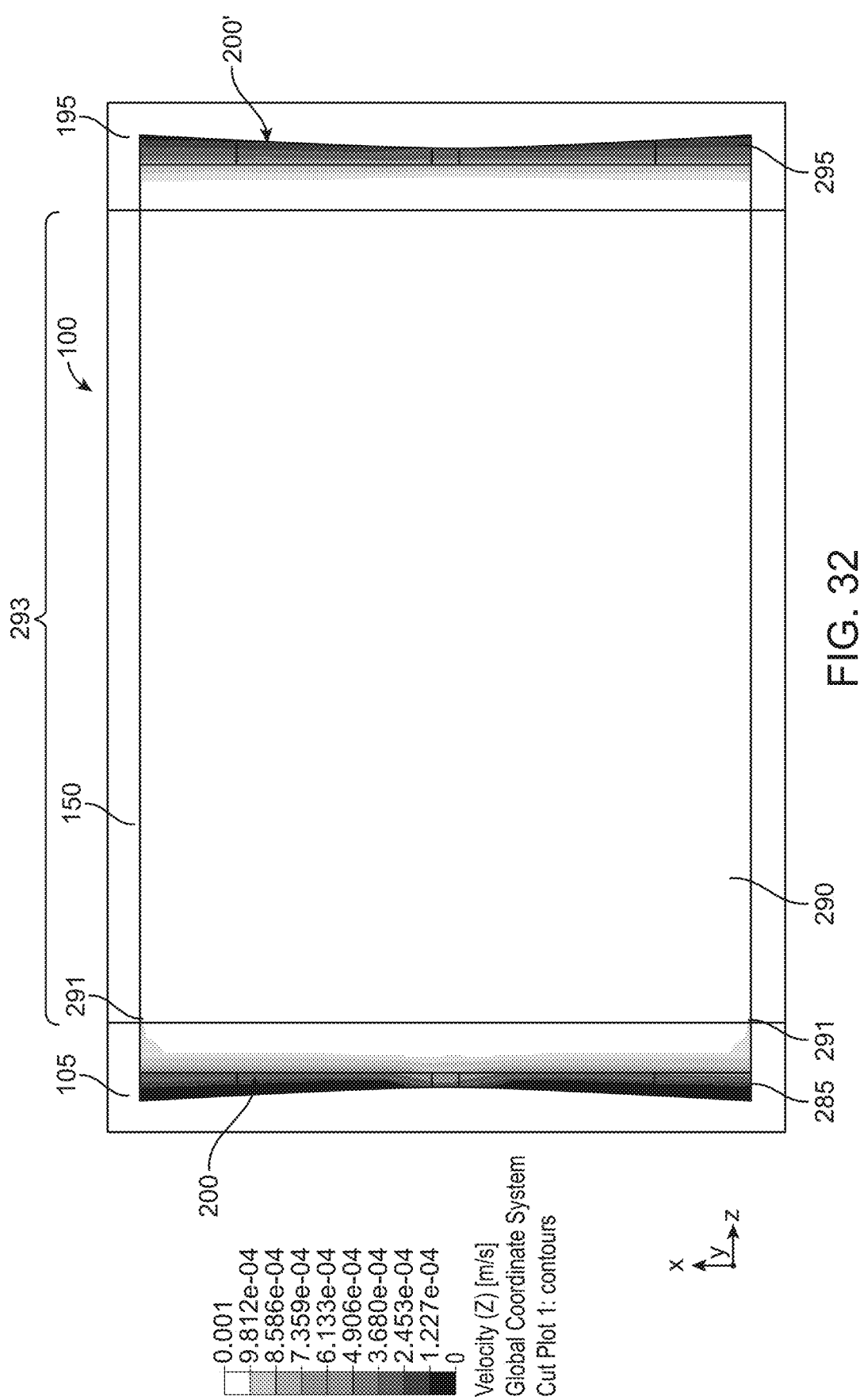
FIG. 32 is a plan wireframe view highlighting velocities of the fluid having 100 times greater viscosity than water flowing at a volumetric flow rate of about 10 μL/sec in the XZ plane of the inlet transition, the channel, and the outlet transition of the type-α microfluidic device according to an exemplary embodiment.
Figure 33:
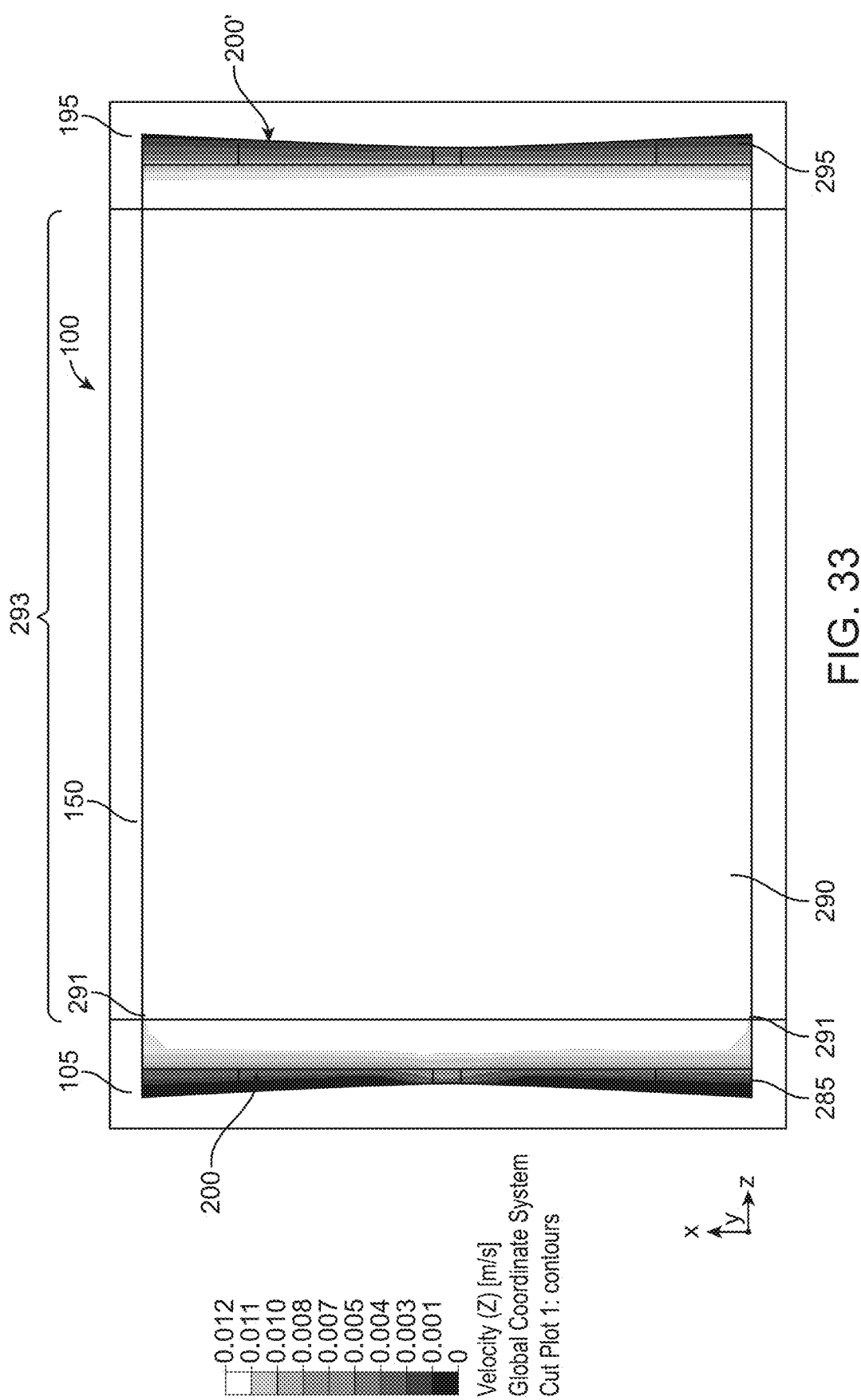
FIG. 33 is a plan wireframe view highlighting velocities of the fluid having 100 times greater viscosity than water flowing at a volumetric flow rate of about 100 μL/sec in the XZ plane of the inlet transition, the channel, and the outlet transition of the type-α microfluidic device according to an exemplary embodiment.

In the trials associated with FIGS. 31-38, the viscosity of the fluid is substantially greater than in the trials associated with FIGS. 4A, 4B, 5-10, 14, 15, 16A, 16B, 17, 22A, 22B, 23-30, 39 and 40, inclusive. FIGS. 31-33 are plan wireframe views highlighting velocities of a fluid having 100 times greater viscosity than water flowing at a volumetric flow rate of about 1 μL/sec, about 10 μL/sec and about 100 μL/sec, respectively, in the XZ plane of the inlet transition 285, the channel 290, and the outlet transition 295 of the type-α microfluidic device 100 according to an exemplary embodiment. FIGS. 34-38 are plan wireframe views highlighting velocities of a fluid having 1,000 times greater viscosity than water flowing at a volumetric flow rate of about 0.1 μL/sec, about 100 μL/sec, about 2 mL/sec, about 5 mL/sec and about 10 mL/sec, respectively, in the XZ plane of the inlet transition 285, the channel 290, and the outlet transition 295 of the type-α microfluidic device 100 according to an exemplary embodiment. FIGS. 31-36 demonstrate the ability of the type-α microfluidic device 100 to generate substantially uniform flow in the channel 290 for fluid at substantially relatively higher viscosities up to about 1,000 times greater than water and at a volumetric flow rate up to about 2 mL/sec. For purposes of comparison, the trial associated with FIG. 31 could be compared with the trial of FIG. 4B (about 1 μL/sec); the trial associated with FIG. 32 could be compared with the trial of FIG. 5 (about 10 μL/sec); each of the trials associated with FIGS. 33 and 35 could be compared with each of the trials of FIGS. 6, 7, 22A, 22B, 23, 24, 26, 27, 30, 39 and 40 (about 100 µL/sec); the trial of FIG. 34 could be compared with the trial of FIG. 4A (about 0.1 µL/sec); the trial of FIG. 36 could be compared with the trial of FIG. 29 (about 2,000 µL/sec); and the trial of FIG. 37 could be compared with the trial of FIG. 10 (about 5,000 µL/sec).

Specifically, with the exemplary embodiment of FIG. 31, the velocity of a fluid having 100 times greater viscosity than water flowing at a volumetric flow rate of about 1 µL/sec and flowing in the Z-direction in the inlet transition 285 and the channel 290 varies from about 0.0000 mm/sec to about 0.1226 mm/sec in a region of the inlet transition 285 and the channel 290 located directly below the inlet body 105, but this region of varying velocity is substantially contained to the region below the inlet body 105. Similarly, the velocity of fluid flowing in the Z-direction in the channel 290 and the outlet transition 295 varies from about 0.1226 mm/sec to about 0.0000 mm/sec in a region of the channel 290 and the outlet transition 295 located directly below the outlet body 195, but this region of varying velocity is substantially contained to the region below the outlet body 195. Conversely, the velocity of substantially all of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 is within a relatively narrow range, i.e., about 0.1089 mm/sec to about 0.1226 mm/sec. However, with the exemplary embodiment of FIG. 31, in two corners of the channel 290, in regions 291 of the sensor region 293 of the device 100 located between the inlet body 105 and the outlet body 195, the velocity in the Z-direction is about 0.09533 mm/sec to about 0.1089 mm/sec. In other words, the velocity of substantially all of the fluid flowing in the Z-direction of the channel 290 in the sensor region 293 of the device 100 is substantially uniform. The substantially uniform flow of the fluid is an advantageous effect of the above-referenced exemplary configuration of the inlet 200 and the above-referenced configuration of the outlet 200'.

With the exemplary embodiment of FIG. 32, the velocity of a fluid having 100 times greater viscosity than water flowing at a volumetric flow rate of about 10 µL/sec and flowing in the Z-direction in the inlet transition 285 and the channel 290 varies from about 0.0000 mm/sec to about 1.000 mm/sec in a region of the inlet transition 285 and the channel 290 located directly below the inlet body 105, but this region of varying velocity is substantially contained to the region below the inlet body 105. Similarly, the velocity of fluid flowing in the Z-direction in the channel 290 and the outlet transition 295 varies from about 1.000 mm/sec to about 0.0000 mm/sec in a region of the channel 290 and the outlet transition 295 located directly below the outlet body 195, but this region of varying velocity is substantially contained to the region below the outlet body 195. Conversely, the velocity of substantially all of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 is within a relatively narrow range, i.e., about 0.9812 mm/sec and about 1.000 mm/sec. However, with the exemplary embodiment of FIG. 32, in two corners of the channel 290, in regions 291 of the sensor region 293 of the device 100 located between the inlet body 105 and the outlet body 195, the velocity in the Z-direction is about 0.8586 mm/sec to about 0.9812 mm/sec. In other words, the velocity of substantially all of the fluid flowing in the Z-direction of the channel 290 in the sensor region 293 of the device 100 is substantially uniform. The substantially uniform flow of the fluid is an advantageous effect of the above-referenced exemplary configuration of the inlet 200 and the above-referenced configuration of the outlet 200'.

With the exemplary embodiment of FIG. 33, the velocity of a fluid having 100 times greater viscosity than water flowing at a volumetric flow rate of about 100 µL/sec and flowing in the Z-direction in the inlet transition 285 and the channel 290 varies from about 0.0000 mm/sec to about 12.00 mm/sec in a region of the inlet transition 285 and the channel 290 located directly below the inlet body 105, but this region of varying velocity is substantially contained to the region below the inlet body 105. Similarly, the velocity of fluid flowing in the Z-direction in the channel 290 and the outlet transition 295 varies from about 12.00 mm/sec to about 0.0000 mm/sec in a region of the channel 290 and the outlet transition 295 located directly below the outlet body 195, but this region of varying velocity is substantially contained to the region below the outlet body 195. Conversely, the velocity of substantially all of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 is within a relatively narrow range, i.e., about 11.00 mm/sec to about 12.00 mm/sec. However, with the exemplary embodiment of FIG. 33, in two corners of the channel 290, in regions 291 of the sensor region 293 of the device 100 located between the inlet body 105 and the outlet body 195, the velocity in the Z-direction is about 10.00 mm/sec to about 11.00 mm/sec. In other words, the velocity of substantially all of the fluid flowing in the Z-direction of the channel 290 in the sensor region 293 of the device 100 is substantially uniform. The substantially uniform flow of the fluid is an advantageous effect of the above-referenced exemplary configuration of the inlet 200 and the above-referenced configuration of the outlet 200'.

Figure 34:
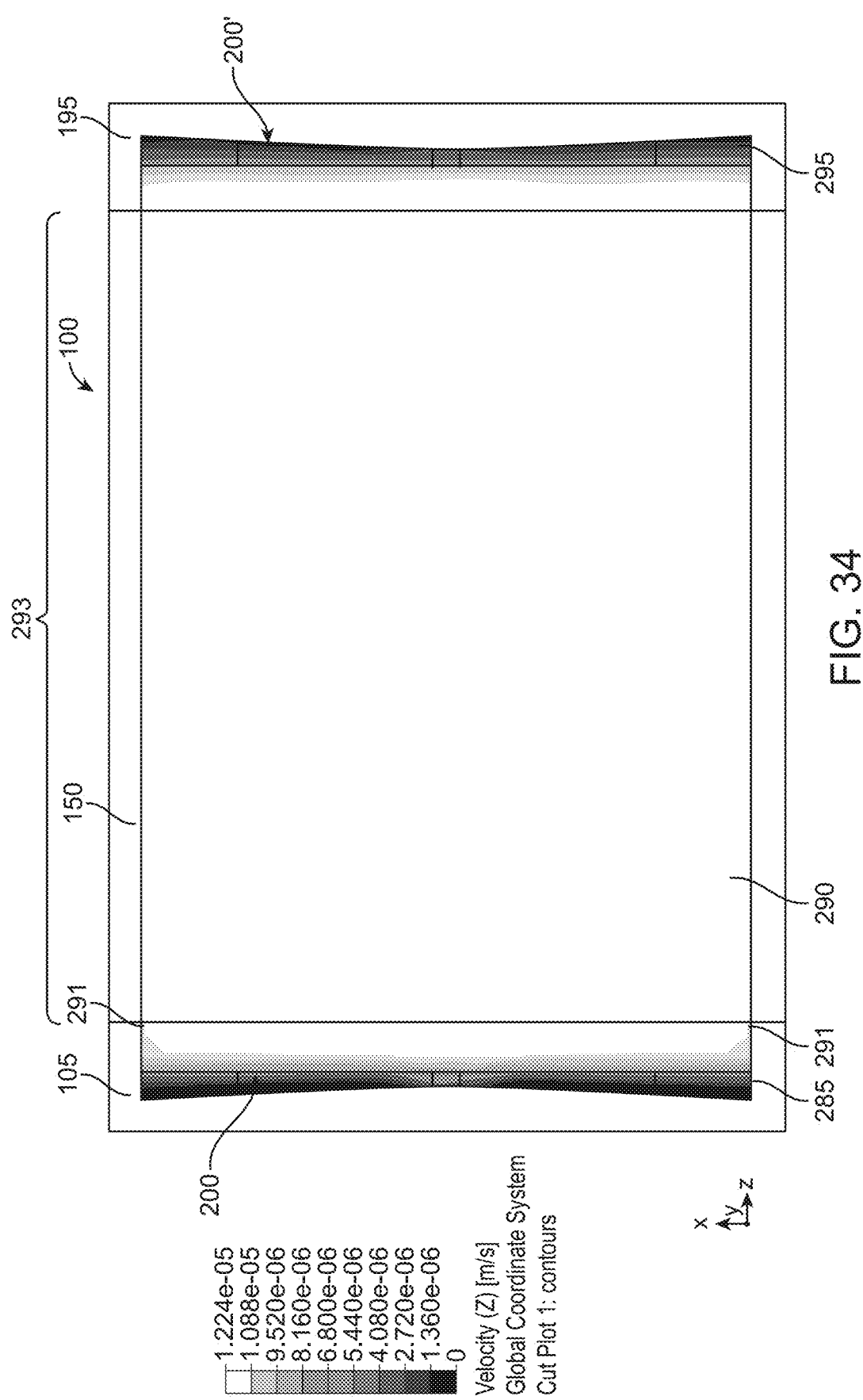
FIG. 34 is a plan wireframe view highlighting velocities of a fluid having 1,000 times greater viscosity than water flowing at a volumetric flow rate of about 0.1 μL/sec in the XZ plane of the inlet transition, the channel, and the outlet transition of the type-α microfluidic device according to an exemplary embodiment.

With the exemplary embodiment of FIG. 34, the velocity of a fluid having 1,000 times greater viscosity than water flowing at a volumetric flow rate of about 0.1 µL/sec and flowing in the Z-direction in the inlet transition 285 and the channel 290 varies from about 0.0000 mm/sec to about 0.01224 mm/sec in a region of the inlet transition 285 and the channel 290 located directly below the inlet body 105, but this region of varying velocity is substantially contained to the region below the inlet body 105. Similarly, the velocity of fluid flowing in the Z-direction in the channel 290 and the outlet transition 295 varies from about 0.01224 mm/sec to about 0.0000 mm/sec in a region of the channel 290 and the outlet transition 295 located directly below the outlet body 195, but this region of varying velocity is substantially contained to the region below the outlet body 195. Conversely, the velocity of substantially all of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 is within a relatively narrow range, i.e., about 0.01088 mm/sec to about 0.01224 mm/sec. However, with the exemplary embodiment of FIG. 34, in two corners of the channel 290, in regions 291 of the sensor region 293 of the device 100 located between the inlet body 105 and the outlet body 195, the velocity in the Z-direction is about 0.009520 mm/sec to about 0.01088 mm/sec. In other words, the velocity of substantially all of the fluid flowing in the Z-direction of the channel 290 in the sensor region 293 of the device 100 is substantially uniform. The substantially uniform flow of the fluid is an advantageous effect of the above-referenced exemplary configuration of the inlet 200 and the above-referenced configuration of the outlet 200'.

Figure 35:
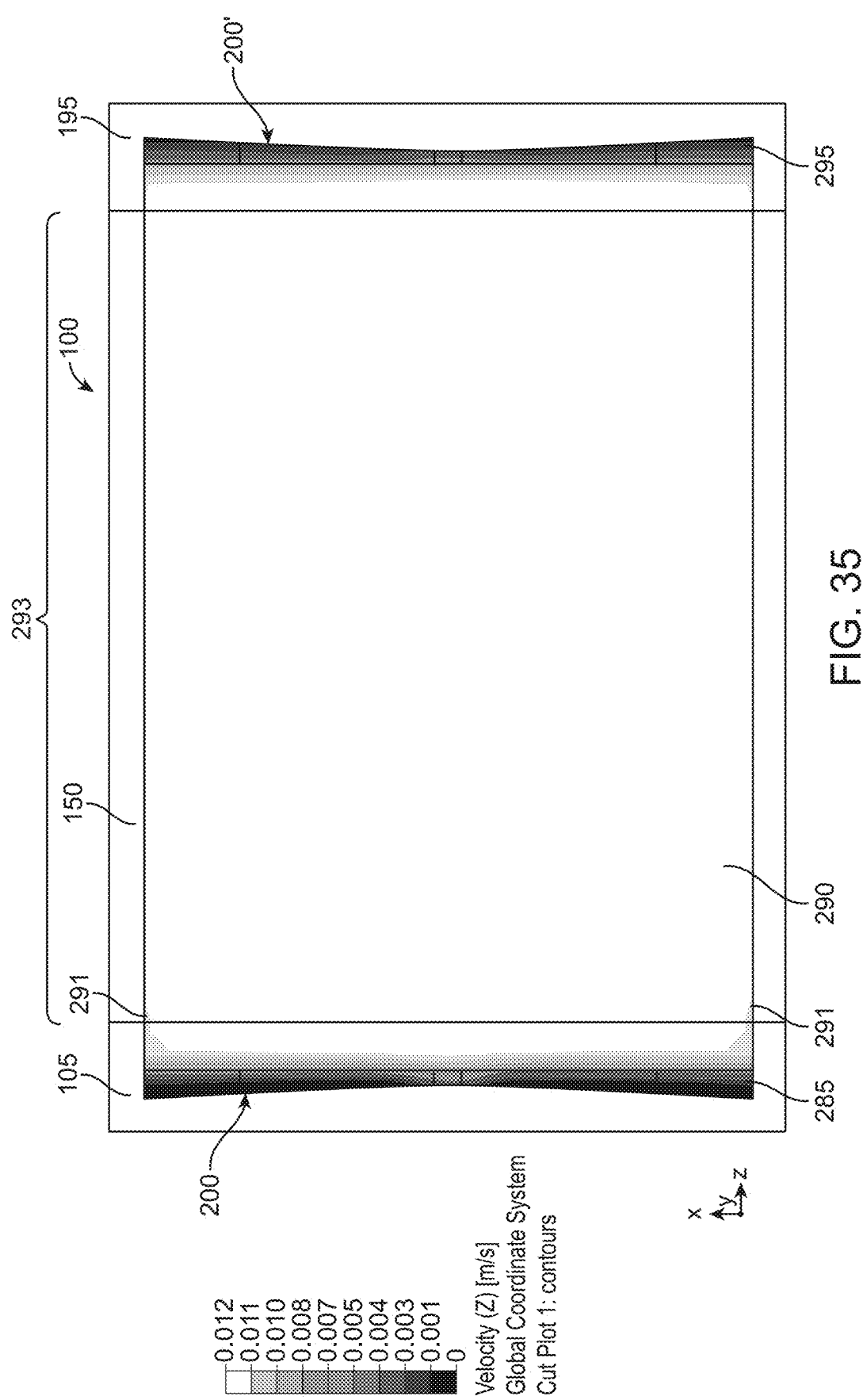
FIG. 35 is a plan wireframe view highlighting velocities of the fluid having 1,000 times greater viscosity than water flowing at a volumetric flow rate of about 100 μL/sec in the XZ plane of the inlet transition, the channel, and the outlet transition of the type-α microfluidic device according to an exemplary embodiment.

With the exemplary embodiment of FIG. 35, the velocity of a fluid having 1,000 times greater viscosity than water flowing at a volumetric flow rate of about 100 μL/sec and flowing in the Z-direction in the inlet transition 285 and the channel 290 varies from about 0.0000 mm/sec to about 12.00 mm/sec in a region of the inlet transition 285 and the channel 290 located directly below the inlet body 105, but this region of varying velocity is substantially contained to the region below the inlet body 105. Similarly, the velocity of fluid flowing in the Z-direction in the channel 290 and the outlet transition 295 varies from about 12.00 mm/sec to about 0.0000 mm/sec in a region of the channel 290 and the outlet transition 295 located directly below the outlet body 195, but this region of varying velocity is substantially contained to the region below the outlet body 195. Conversely, the velocity of substantially all of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 is within a relatively narrow range, i.e., about 11.00 mm/sec to about 12.00 mm/sec. However, with the exemplary embodiment of FIG. 35, in two corners of the channel 290, in regions 291 of the sensor region 293 of the device 100 located between the inlet body 105 and the outlet body 195, the velocity in the Z-direction is about 10.00 mm/sec to about 11.00 mm/sec. In other words, the velocity of substantially all of the fluid flowing in the Z-direction of the channel 290 in the sensor region 293 of the device 100 is substantially uniform. The substantially uniform flow of the fluid is an advantageous effect of the above-referenced exemplary configuration of the inlet 200 and the above-referenced configuration of the outlet 200'.

Figure 36:
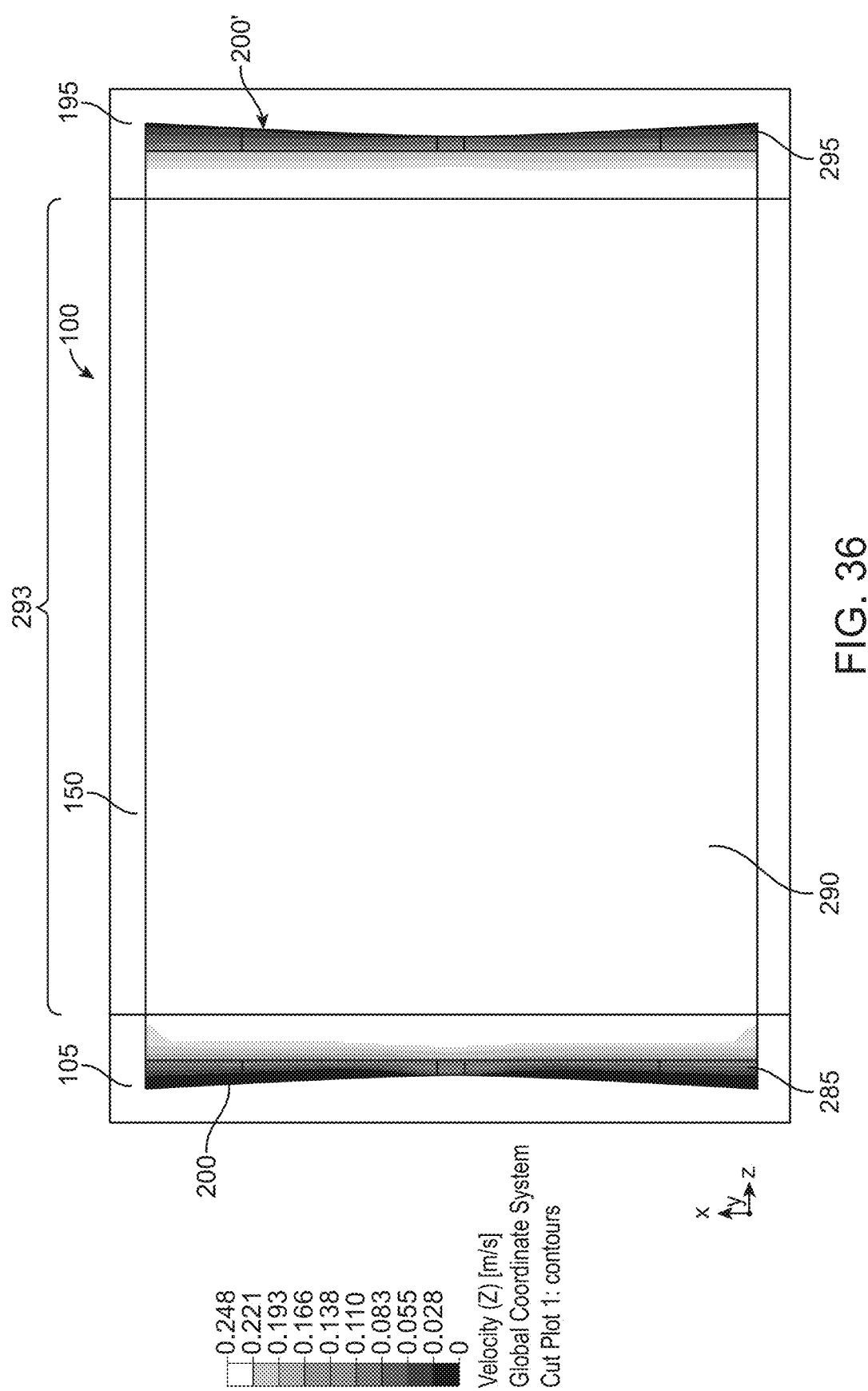
FIG. 36 is a plan wireframe view highlighting velocities of the fluid having 1,000 times greater viscosity than water flowing at a volumetric flow rate of about 2 mL/sec in the XZ plane of the inlet transition, the channel, and the outlet transition of the type-α microfluidic device according to an exemplary embodiment.

With the exemplary embodiment of FIG. 36, the velocity of a fluid having 1,000 times greater viscosity than water flowing at a volumetric flow rate of about 2,000 μL/sec (about 2 mL/sec) and flowing in the Z-direction in the inlet transition 285 and the channel 290 varies from about 0.0000 mm/sec to about 248.0 mm/sec in a region of the inlet transition 285 and the channel 290 located directly below the inlet body 105, but this region of varying velocity is substantially contained to the region below the inlet body 105. Similarly, the velocity of fluid flowing in the Z-direction in the channel 290 and the outlet transition 295 varies from about 248.0 mm/sec to about 0.0000 mm/sec in a region of the channel 290 and the outlet transition 295 located directly below the outlet body 195, but this region of varying velocity is substantially contained to the region below the outlet body 195. Conversely, the velocity of substantially all or all of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 is within a relatively narrow range, i.e., about 221.0 mm/sec to about 248.0 mm/sec. In other words, the velocity of substantially all or all of the fluid flowing in the Z-direction of the channel 290 in the sensor region 293 of the device 100 is substantially uniform. The substantially uniform flow of the fluid is an advantageous effect of the above-referenced exemplary configuration of the inlet 200 and the above-referenced configuration of the outlet 200'.

Figure 37:
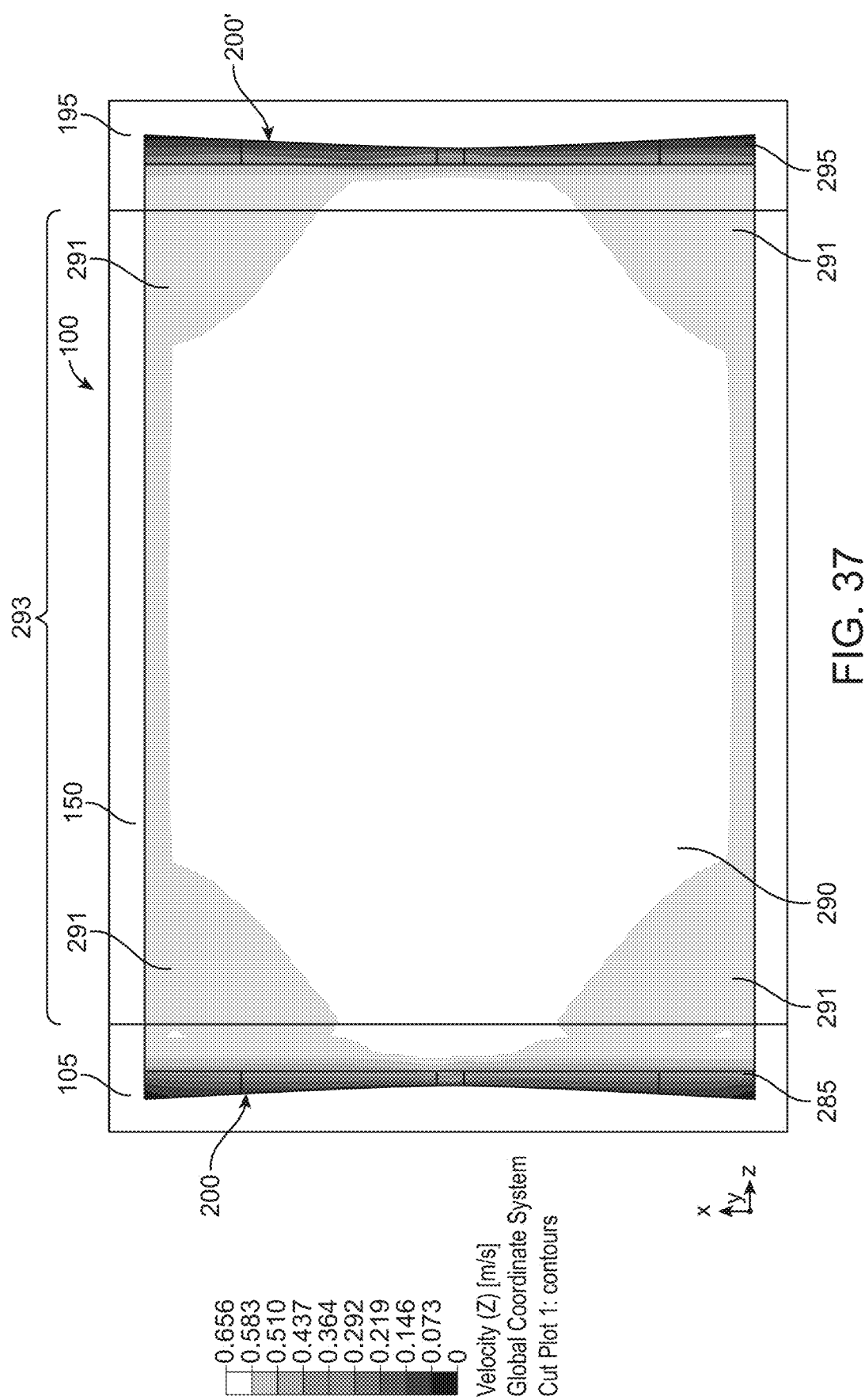
FIG. 37 is a plan wireframe view highlighting velocities of the fluid having 1,000 times greater viscosity than water flowing at a volumetric flow rate of about 5 mL/sec in the XZ plane of the inlet transition, the channel, and the outlet transition of the type-α microfluidic device according to an exemplary embodiment.
Figure 38:
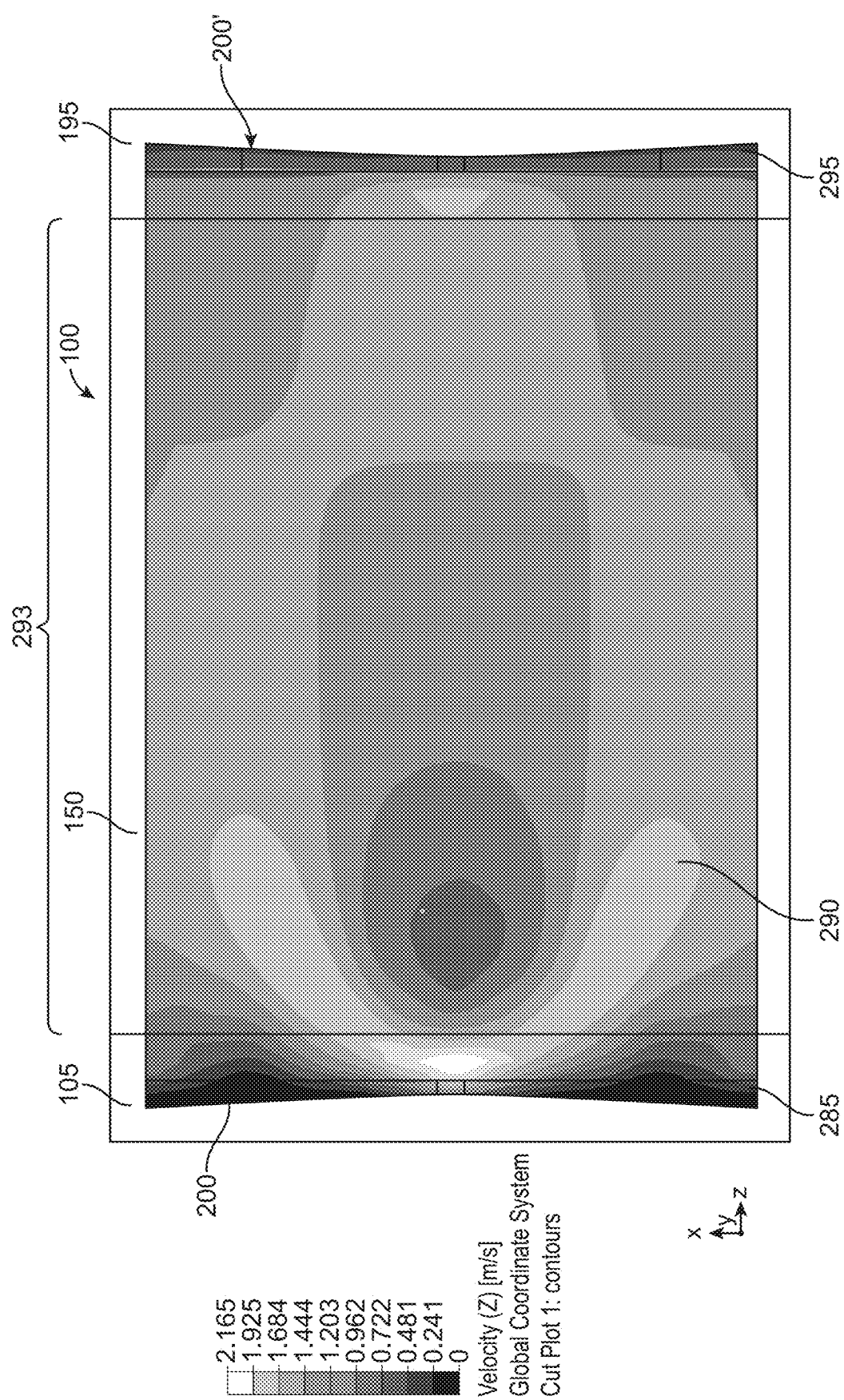
FIG. 38 is a plan wireframe view highlighting velocities of the fluid having 1,000 times greater viscosity than water flowing at a volumetric flow rate of about 10 mL/sec in the XZ plane of the inlet transition, the channel, and the outlet transition of the type-α microfluidic device according to an exemplary embodiment.

With the exemplary embodiment of FIG. 37, the velocity of a fluid having 1,000 times greater viscosity than water flowing at a volumetric flow rate of about 5,000 μL/sec (about 5 mL/sec) and flowing in the Z-direction in the inlet transition 285 and the channel 290 varies from about 0.0000 mm/sec to about 656.0 mm/sec in a region of the inlet transition 285 and the channel 290 located directly below the inlet body 105. Similarly, the velocity of fluid flowing in the Z-direction in the channel 290 and the outlet transition 295 varies from about 656.0 mm/sec to about 0.0000 mm/sec in a region of the channel 290 and the outlet transition 295 located directly below the outlet body 195. The velocity of the fluid flowing in the Z-direction of the channel 290 in the sensor region 293 of the device 100 located between the inlet body 105 and the outlet body 195 measured at a height in the Y-direction about halfway between the lower and upper surfaces of the channel 290 varies from about 510.0 mm/sec to about 656.0 mm/sec. In four corners of the channel 290 and along the side edges of the channel 290, in regions 291 of the sensor region 293 of the device 100 located between the inlet body 105 and the outlet body 195, the velocity in the Z-direction is about 510.0 mm/sec to about 583.0 mm/sec. The peak velocity is about 583.0 mm/sec to about 656.0 mm/sec and occurs across a substantial portion of the channel 290 and in portions of the device 100 below the inlet body 105 and below the outlet body 195 adjacent to the channel 290. The minimum velocity of about 0.000 mm/sec occurs in each of four corners of the device 100 below each of the inlet 200 and the outlet 200'.

in FIG. 38, the velocity of the fluid having 1,000 times greater viscosity than water flowing at a volumetric flow rate of about 10,000 μL/sec (about 10 mL/sec) and flowing in the Z-direction of the channel 290 in the sensor region 293 of the device 100 at a height in the Z-direction of about 0.125 mm above the bottom surface of the channel 290 is significantly less than substantially uniform (even less uniform that the trial illustrated in FIG. 37). On the left side of FIG. 38, below the inlet body 105, the velocity of the fluid flowing in the Z-direction of the channel 290 in the sensor region 293 of the device 100 varies relatively widely. That is, the velocity of the fluid flowing in the Z-direction of the device 100 is between about 0.0000 mm/sec and about 2,165 mm/sec beneath the inlet body 105; between about 481.0 mm/sec and about 1,684 mm/sec in the channel 290; and between about 241.0 mm/sec and about 1,684 mm/sec beneath the outlet body 195. The highest velocities are observed near the port 205 of the inlet 200; and the lowest velocities are observed at the left side of FIG. 10 in two zones on either side of the port 205 of the inlet 200. Within the channel 290, the highest velocities are observed on either side of the port 205 of the inlet 200, and a localized relatively slow spot occurs within the channel 290 immediately to the right (in the Z-direction) of the port 205 of the inlet 200 as seen in FIG. 38.

Figure 39:
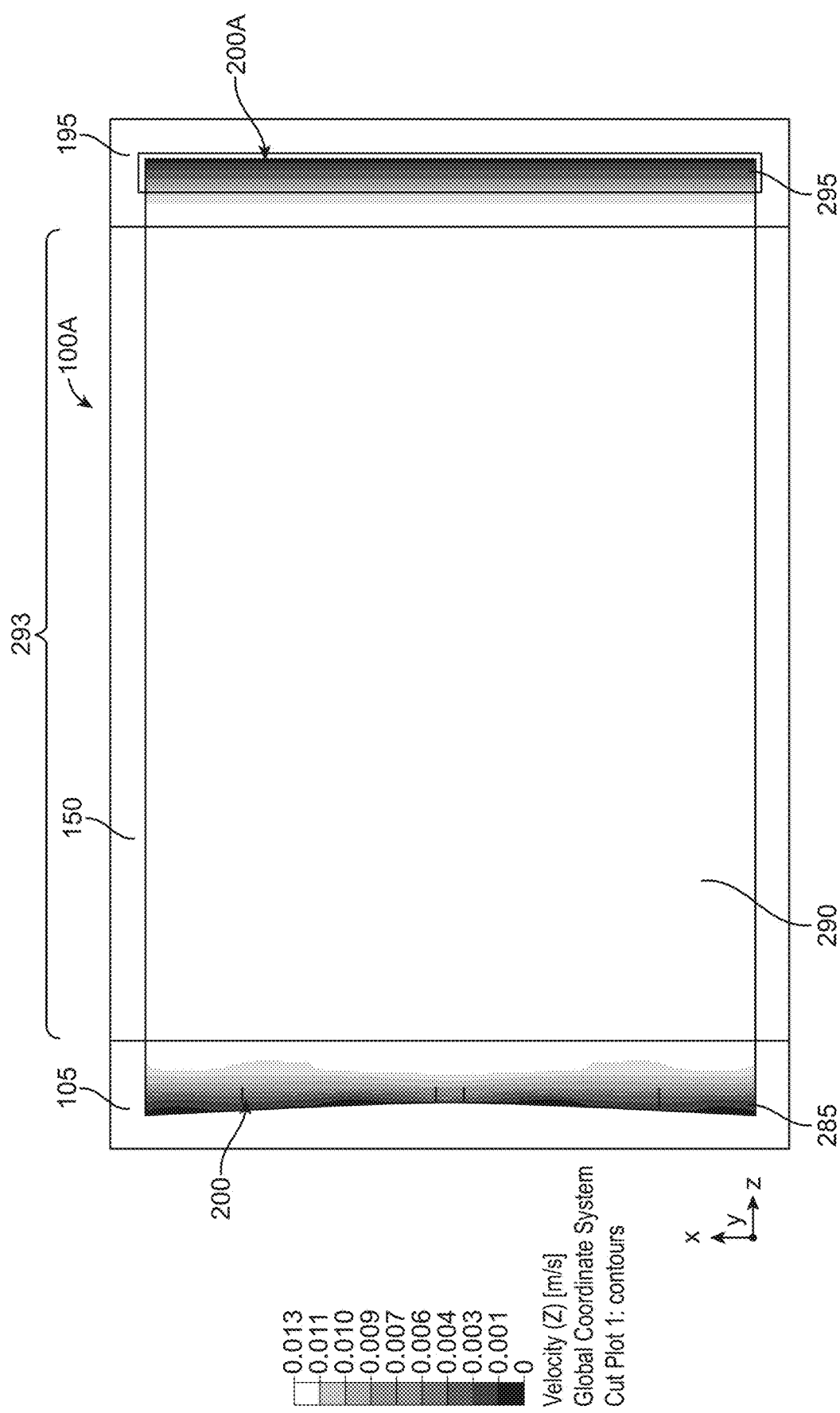
FIG. 39 is a plan wireframe view highlighting velocities of the fluid flowing at a volumetric flow rate of about 100 μL/sec in the XZ plane of the inlet transition, the channel, and the outlet transition of an alternative type-α microfluidic device having an inlet similar to other embodiments but having a relatively large volume unrestricted outlet structure according to an exemplary embodiment.

FIG. 39 is a plan wireframe view highlighting velocities of the fluid flowing at a volumetric flow rate of about 100 μL/sec in the XZ plane of the inlet transition 285, the channel 290, and the outlet transition 295 of an alternative type-α microfluidic device 100A having an inlet 200 similar to other embodiments, but, instead of an outlet 200', the alternative type-α microfluidic device 100A has a relatively large volume unrestricted outlet 200A according to an exemplary embodiment. Specifically, the outlet 200A may have a substantially rectilinear shape with an open bottom adjacent to the outlet transition and an open top accessible from above the device 100A and four side walls defined by and within the outlet body 195. The opening in the outlet 200A may have a width in the X-direction substantially equal to the channel 290, and a dimension in the Z-direction of about 2.0 mm.

With the exemplary embodiment of FIG. 39, the velocity of a fluid flowing at a volumetric flow rate of about 100 µL/sec and flowing in the Z-direction in the inlet transition 285 and the channel 290 varies from about 0.0000 mm/sec to about 13.00 mm/sec in a region of the inlet transition 285 and the channel 290 located directly below the inlet body 105, but this region of varying velocity is substantially contained to the region below the inlet body 105. Similarly, the velocity of fluid flowing in the Z-direction in the channel 290 and the outlet transition 295 varies from about 13.00 mm/sec to about 0.0000 mm/sec in a region of the channel 290 and the outlet transition 295 located directly below the outlet body 195, but this region of varying velocity is substantially contained to the region below the outlet body 195. Conversely, the velocity of substantially all or all of the fluid flowing in the Z-direction of the channel 290 in the sensor region 293 of the device 100A located between the inlet body 105 and the outlet body 195 measured at a height in the Y-direction about halfway between the lower and upper surfaces of the channel 290 is within a relatively narrow range, i.e., about 11.00 mm/sec to about 13.00 mm/sec. In other words, the velocity of substantially all or all of the fluid flowing in the Z-direction of the channel 290 in the sensor region 293 of the device 100A is substantially uniform. The substantially uniform flow of the fluid is an advantageous effect of the above-referenced exemplary configuration of the inlet 200 and independent of the structure of the outlet 200A.

Figure 40:
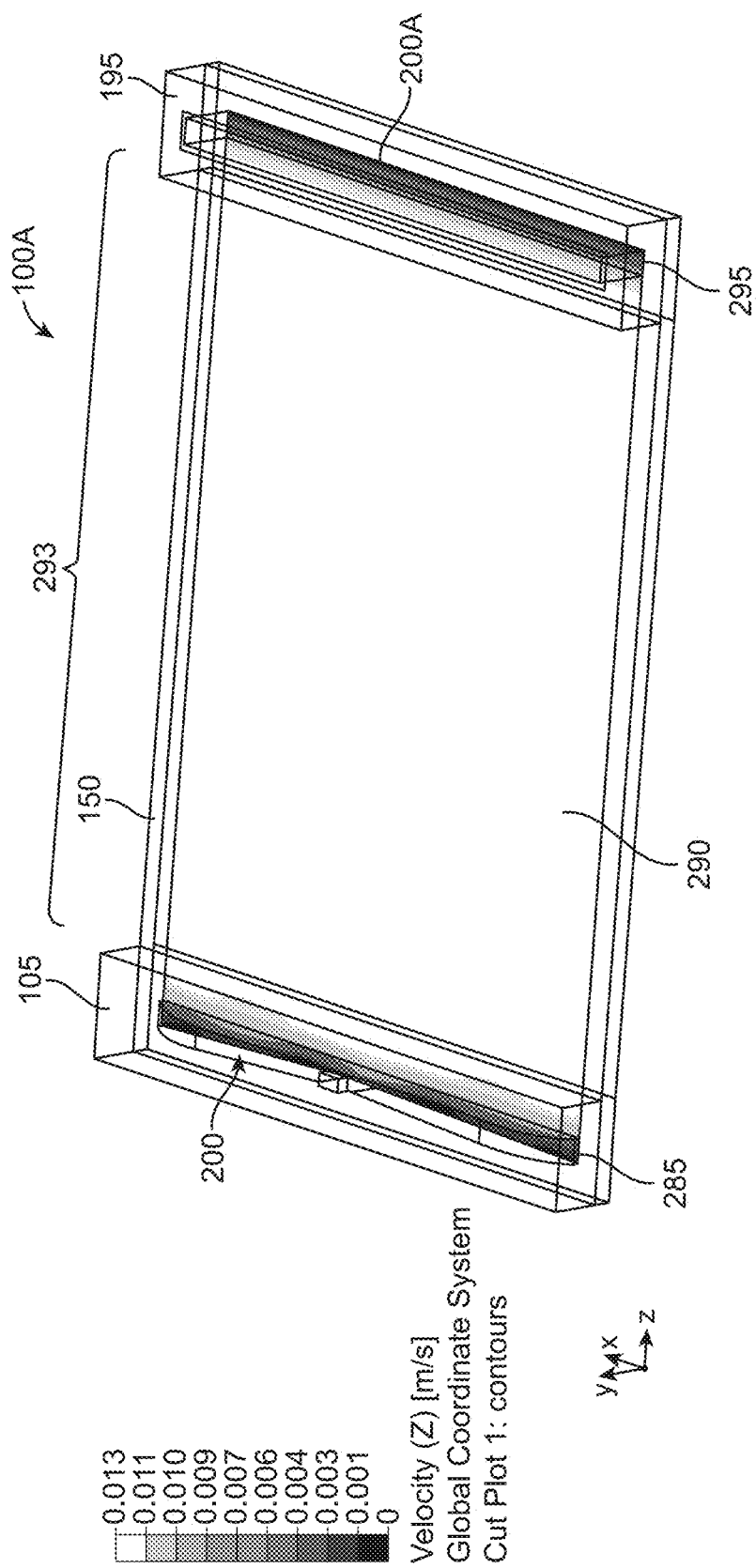
FIG. 40 is a perspective wireframe view highlighting velocities of the fluid flowing at a volumetric flow rate of about 100 μL/sec in the XZ plane of the inlet transition, the channel, and the outlet transition of the alternative type-α microfluidic device according to an exemplary embodiment.

FIG. 40 is a perspective wireframe view highlighting velocities of the fluid flowing at a volumetric flow rate of about 100 µL/sec in the XZ plane of the inlet transition 285, the channel 290, and the outlet transition 295 of the alternative type-α microfluidic device 100A according to an exemplary embodiment. The only difference between FIG. 39 and FIG. 40 is the viewpoint.

FIGS. 39 and 40 collectively demonstrate that the inlet 200 of the type-α microfluidic devices 100 and 100A may be sufficient (without a need for any particular constrictive structure for the outlet 200' or outlet 200A) to achieve substantially uniform flow in the Z-direction of the channel 290 as described and demonstrated hereinabove.

Type-β Microfluidic Devices

FIGS. 11-15, 16A, and 16B illustrate a type-β microfluidic device 300 according to an exemplary embodiment. The type-β microfluidic device 300 in FIGS. 11-15, 16A, and 16B is substantially similar to the type-α microfluidic device 100 in FIGS. 1-3, 4A, 4B, and 5-10, except, in FIGS. 1-3, 4A, 4B, and 5-10, only one side of the inlet 200 and the outlet 200' is flat (approximately coplanar with the XY plane), i.e., the side facing the channel 290 is flat (approximately coplanar with the XY plane), and the side facing away from the channel 290 is tapered. Whereas, in FIGS. 11-15, 16A and 16B, both sides of the inlet 400 and the outlet 400' are tapered, i.e., both the side facing a channel 490 and the side facing away from the channel 490 are tapered. Otherwise, one or more features of the type-β microfluidic device 300 in FIGS. 11-15, 16A and 16B may be substantially similar to corresponding features of the type-α microfluidic device 100 in FIGS. 1-3, 4A, 4B, and 5-10.

Figure 14:
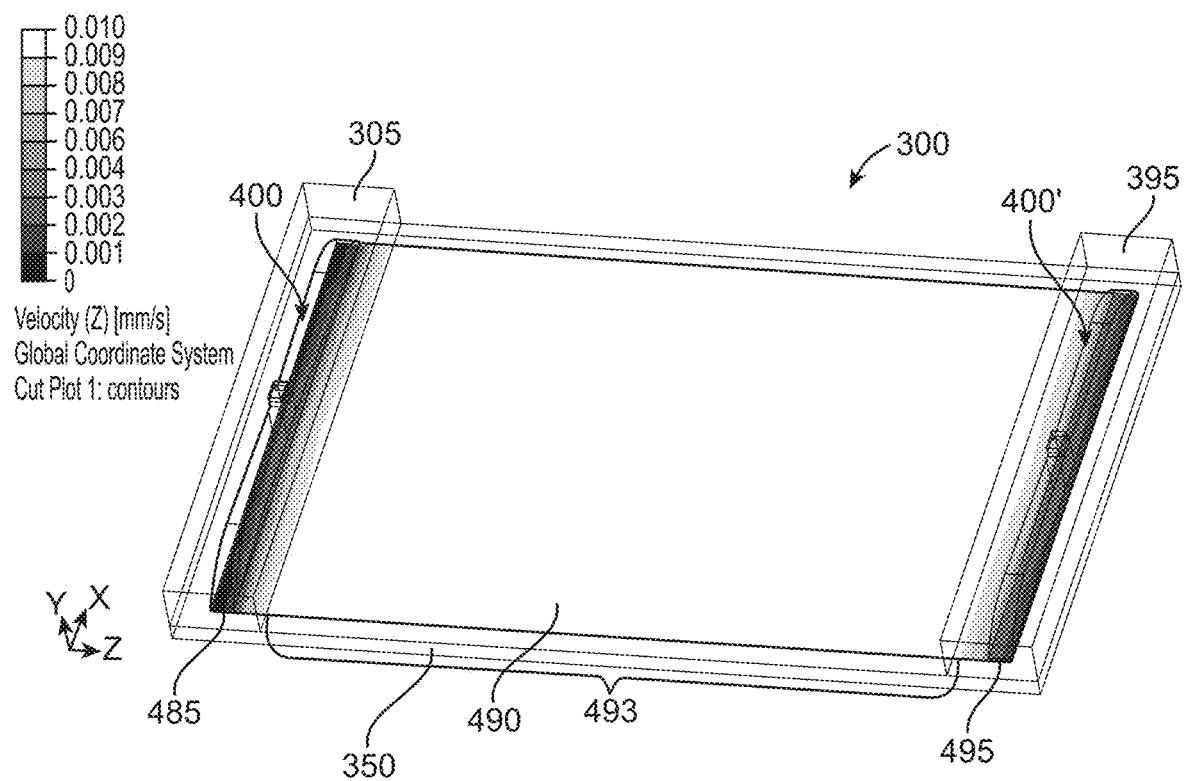
FIG. 14 is a perspective wireframe view highlighting velocities of a fluid flowing at a volumetric flow rate of about 100 μL/sec in the XZ plane of the inlet transition, the channel, and the outlet transition of the type-β microfluidic device according to an exemplary embodiment.
Figure 15:
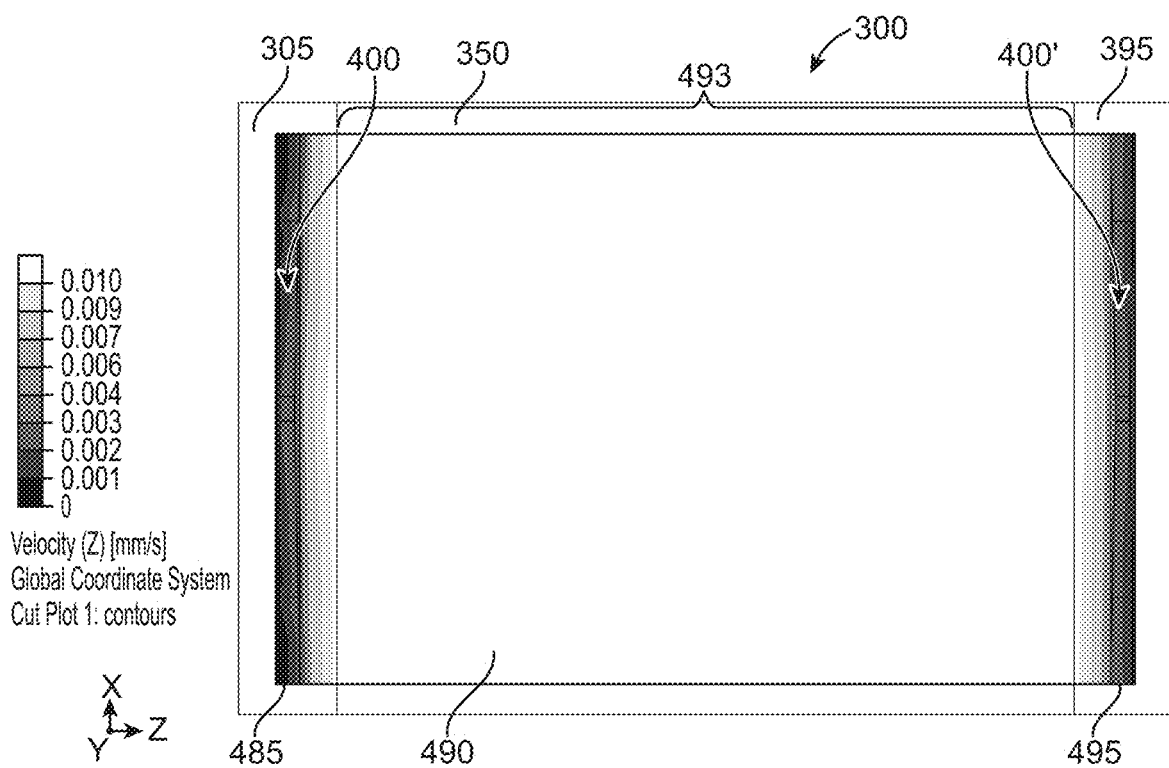
FIG. 15 is a plan wireframe view highlighting the velocities of the fluid flowing at a volumetric flow rate of about 100 μL/sec in the XZ plane of the inlet transition, the channel, and the outlet transition of the type-β microfluidic device according to an exemplary embodiment.

FIG. 14 is a perspective wireframe view highlighting velocities of the fluid flowing at a volumetric flow rate of about 100 µL/sec in the XZ plane of an inlet transition 485, the channel 490, and an outlet transition 495 of the type-β microfluidic device 300 according to an exemplary embodiment. FIG. 15 is a plan wireframe view highlighting the velocities of the fluid flowing at a volumetric flow rate of about 100 µL/sec in the XZ plane of the inlet transition 485, the channel 490, and the outlet transition 495 of the type-β microfluidic device 300 according to an exemplary embodiment.

The velocity of fluid flowing in the Z-direction in the inlet transition 485 and the channel 490 varies from about 0.0000 mm/sec to about 10.00 mm/sec in a region of the inlet transition 485 and the channel 490 located directly below the inlet body 305, but this region of varying velocity is substantially contained to the region below the inlet body 305. Similarly, the velocity of fluid flowing in the Z-direction in the channel 490 and the outlet transition 495 varies from about 10.00 mm/sec to about 0.0000 mm/sec in a region of the channel 490 and the outlet transition 495 located directly below the outlet body 395, but this region of varying velocity is substantially contained to the region below the outlet body 395. Conversely, the velocity of substantially all or an entirety of the fluid flowing in the Z-direction of the channel 490 in a sensor region 493 (i.e., a rectilinear region of the channel 490) of the device 300, the sensor region 493 being located between the inlet body 305 and the outlet body 395 is about 9.000 mm/sec to about 10.00 mm/sec. In other words, the velocity of substantially all or an entirety of the fluid flowing in the Z-direction of the channel 490 in the sensor region 493 of the device 300 is substantially uniform. The substantially uniform flow of the fluid is an advantageous effect of the above-referenced exemplary configuration of the inlet 400 and the above-referenced configuration of the outlet 400'.

Figure 16A:
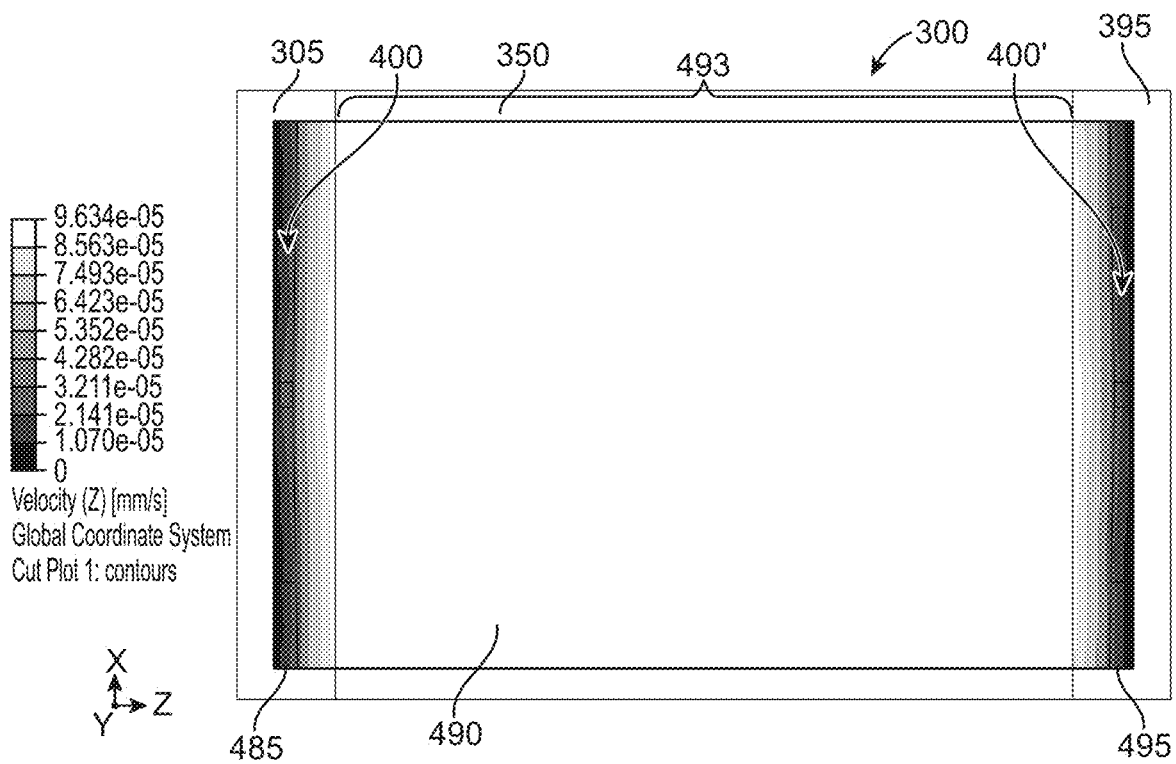
FIG. 16A is a plan wireframe view highlighting velocities of the fluid flowing at a volumetric flow rate of about 1 μL/sec in the XZ plane of the inlet transition, the channel, and the outlet transition of the type-β microfluidic device according to an exemplary embodiment.

FIG. 16A is a plan wireframe view highlighting velocities of the fluid flowing at a relatively low volumetric flow rate of about 1 µL/sec (about 100 times less than FIGS. 14-15) in the XZ plane of the inlet transition 485, the channel 490, and the outlet transition 495 of the type-α microfluidic device 300 according to an exemplary embodiment. With the exemplary embodiment of FIG. 16A, the velocity of fluid flowing in the Z-direction in the inlet transition 485 and the channel 490 varies from about 0.0000 mm/sec to about 0.09634 mm/sec in a region of the inlet transition 485 and the channel 490 located directly below the inlet body 305, but this region of varying velocity is substantially contained to the region below the inlet body 305. Similarly, the velocity of fluid flowing in the Z-direction in the channel 490 and the outlet transition 495 varies from about 0.09634 mm/sec to about 0.0000 mm/sec in a region of the channel 490 and the outlet transition 495 located directly below the outlet body 395, but this region of varying velocity is substantially contained to the region below the outlet body 395. Conversely, the velocity of substantially all or all of the fluid flowing in the Z-direction of the channel 490 in the sensor region 493 of the device 300 located between the inlet body 305 and the outlet body 395 is about 0.08563 mm/sec to about 0.09634 mm/sec. The substantially uniform flow of the fluid is an advantageous effect of the above-referenced exemplary configuration of the inlet 400 and the above-referenced configuration of the outlet 400'.

Figure 16B:
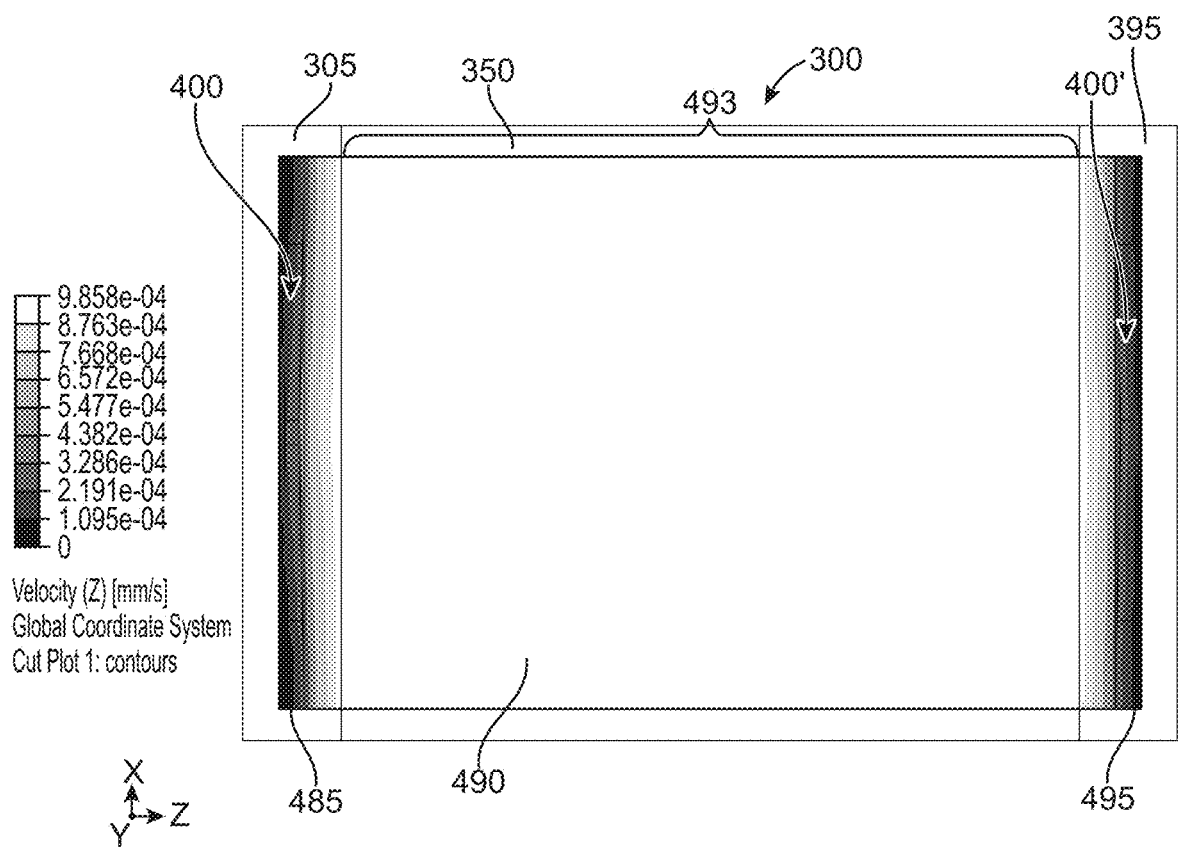
FIG. 16B is a plan wireframe view highlighting velocities of the fluid flowing at a volumetric flow rate of about 10 μL/sec in the XZ plane of the inlet transition, the channel, and the outlet transition of the type-β microfluidic device according to an exemplary embodiment.

FIG. 16B is a plan wireframe view highlighting velocities of the fluid flowing at a relatively low volumetric flow rate of about 10 µL/sec (about 10 times less than FIG. 15) in the XZ plane of the inlet transition 485, the channel 490, and the outlet transition 495 of the type-α microfluidic device 300 according to an exemplary embodiment. With the exemplary embodiment of FIG. 16B, the velocity of fluid flowing in the Z-direction in the inlet transition 485 and the channel 490 varies from about 0.0000 mm/sec to about 0.9858 mm/sec in a region of the inlet transition 485 and the channel 490 located directly below the inlet body 305, but this region of varying velocity is substantially contained to the region below the inlet body 305. Similarly, the velocity of fluid flowing in the Z-direction in the channel 490 and the outlet transition 495 varies from about 0.9858 mm/sec to about 0.0000 mm/sec in a region of the channel 490 and the outlet transition 495 located directly below the outlet body 395, but this region of varying velocity is substantially contained to the region below the outlet body 395. Conversely, the velocity of substantially all of the fluid flowing in the Z-direction of the channel 490 in the sensor region 493 of the device 300 located between the inlet body 305 and the outlet body 395 is between about 0.8763 mm/sec to about 0.9858 mm/sec. In other words, the velocity of substantially all or all of the fluid flowing in the Z-direction of the channel 490 in the sensor region 493 of the device 300 is substantially uniform. The substantially uniform flow of the fluid is an advantageous effect of the above-referenced exemplary configuration of the inlet 400 and the above-referenced configuration of the outlet 400'.

In some exemplary embodiments, a first ratio of a cross-sectional area (i.e., X-dimension×Z-dimension) of the port 405 to a cross-sectional area (i.e., X-dimension×Y-dimension) of an entrance of the channel 490 is about 2.0 (e.g., 1.0 mm×2.0 mm) to about 11.25 (e.g., 0.25 mm×45.0 mm) or about 1.0 to about 5.625. In some exemplary embodiments, a second ratio of the cross-sectional area (i.e., X-dimension×Z-dimension) of the port 405 to a cross-sectional area (i.e., X-dimension×Z-dimension) of the opening 440 is about 2.0 (e.g., 1.0 mm×2.0 mm) to about 45.0 ((2.0 mm×45.0 mm)/2) or about 1.0 to about 22.5. In some exemplary embodiments, a third ratio of the cross-sectional area (i.e., X-dimension×Z-dimension) of the opening 440 to the cross-sectional area (i.e., X-dimension×Y-dimension) of the entrance of the channel 490 is about 100.0 (2.0 mm×50.0 mm) to about 15.0 (e.g., 0.25 mm×60.0 mm) or about 6.67 to about 1.00. In some exemplary embodiments, a fourth ratio of the depth 410 of the port 405 to the depth 435 at the end of the inlet 400 or outlet 400' is about 1.0 to about 2.0. In some exemplary embodiments, a fifth ratio of the depth 410 of the port 405 to the depth 435 at the end of the inlet 400 or outlet 400' to the height 415 at or near the port 405 is about 1.0 to about 2.0 to about 3.0. In some exemplary embodiments, a sixth ratio of the height of the channel 490 to the depth 410 of the port 405 to the depth 435 at the end of the inlet 400 or the outlet 400' to the height 415 at or near the port 405 is about 0.25 to about 1.0 to about 2.0 to about 3.0 or about 1.0 to about 4.0 to about 8.0 to about 12.0. In some exemplary embodiments, a cross-sectional shape of the inlet 400 or the outlet 400' in the XZ plane is a bowtie shape, i.e., resembling a piece of apparel worn about the neck known as a bowtie, or a Venturi shape. In some exemplary embodiments, a cross-sectional shape of the inlet 400 or the outlet 400' in the XY plane is a bow shape, i.e., resembling a bow for a bow and arrow, or a bracket shape, i.e., resembling an open bracket ("{") or resembling a closed bracket ("}").

Type-γ Microfluidic Devices

Figure 17:
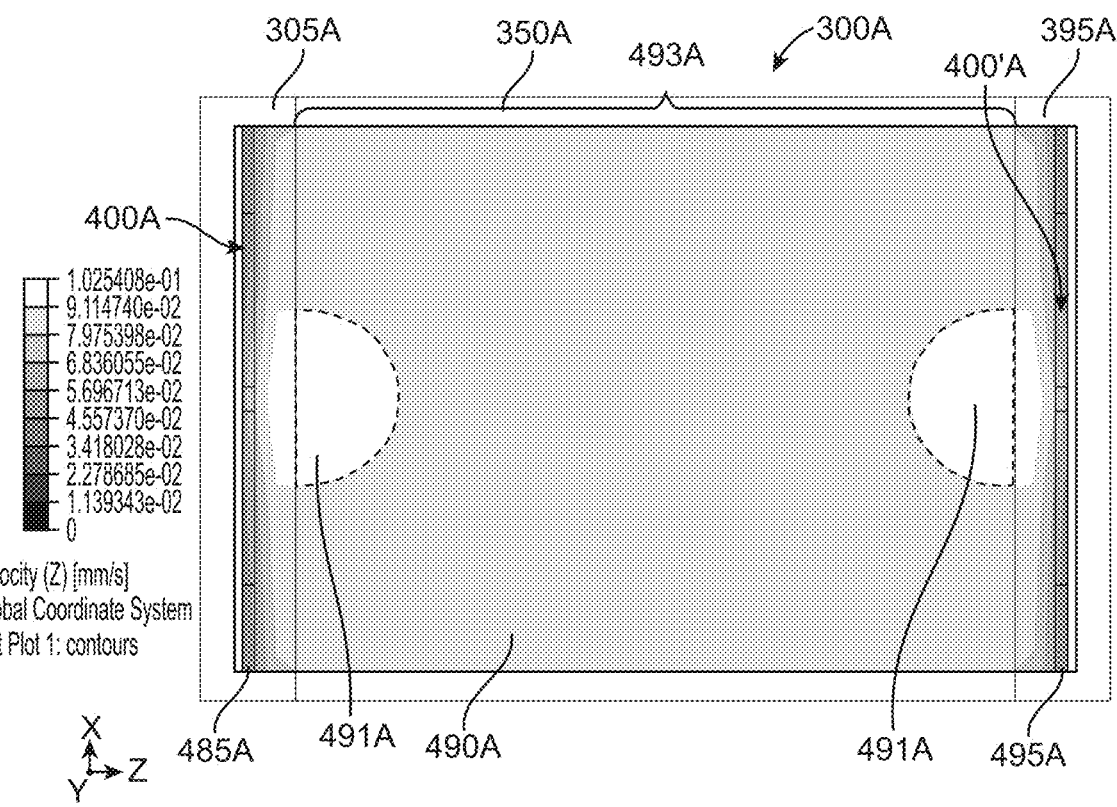
FIG. 17 is a plan wireframe view highlighting velocities of the fluid flowing at a volumetric flow rate of about 10 μL/sec in the XZ plane of the inlet transition, the channel, and the outlet transition of a type-gamma (type-γ) microfluidic device according to an exemplary embodiment.

FIG. 17 is a plan wireframe view highlighting velocities of the fluid flowing at a volumetric flow rate of about 1,000 μL/sec in the XZ plane of an inlet transition 485A, a channel 490A which may be an assay channel, and an outlet transition 495A of a type-γ microfluidic device 300A according to an exemplary embodiment. The type-γ microfluidic device 300A may be substantially similar to type-α microfluidic device 300; as such, like structures are similarly numbered, and some like structures are omitted for brevity. One difference between the type-γ microfluidic device 300A and the type-α microfluidic device 300 may be the lack of tapering in the XZ plane of the inlet 400A and the outlet 400'A (as compared to the inlet 400 and the outlet 400' of the type-α microfluidic device 300). That is, instead of being tapered from the port to the ends, each of the inlet 400A and the outlet 400'A may have a uniform depth in the Z-direction. The depth of each of the inlet 400A and the outlet 400'A (including their respective ports) may be about 1.0 mm. The present exemplary design demonstrates that the inlet conduit taper in the Z-direction may be provided to achieve uniform velocities in the channel 490A.

For example, as shown in FIG. 17, the velocity of fluid flowing in the Z-direction in the inlet transition 485A and the channel 490A varies from about 0.046 mm/sec to about 0.103 mm/sec in a region of the inlet transition 485A and the channel 490A located directly below the inlet body 305A. Similarly, the velocity of fluid flowing in the Z-direction in the channel 490A and the outlet transition 495A varies from about 0.103 mm/sec to about 0.046 mm/sec in a region of the channel 490A and the outlet transition 495A located directly below the outlet body 395A. In most of a sensor region 493A of the device 300A, the velocity in the Z-direction is about 0.080 mm/sec to about 0.091 mm/sec. However, with the exemplary embodiment of FIG. 17, in roughly semicircular regions 491A (marked with dashed lines) of the sensor region of the device 300A located near the ports of the inlet 400A and the outlet 400'A, the velocity in the Z-direction is about 0.091 mm/sec to about 0.103 mm/sec. In other words, the velocity of a majority of the fluid flowing in the Z-direction of the channel 490A in the sensor region 493A of the device 300A is substantially uniform. By comparing FIGS. 14, 15, 16A, and 16B (particularly FIGS. 14 and 15) with FIG. 17, an improvement in providing substantially uniform velocity in the channel 490 associated with the taper of the tapered region 420 and the curved and tapered region 430 (FIGS. 14, 15, 16A, and 16B, particularly FIGS. 14 and 15) relative to the design omitting such taper (FIG. 17) is demonstrated. Also, with the type-γ microfluidic device 300A, there is a relatively small difference between the maximum observed velocity (about 0.103 mm/sec) and the minimum observed velocity (about 0.046 mm/sec) relative to the difference observed with the type-α microfluidic device 300.

Type-δ Microfluidic Devices

Figure 18:
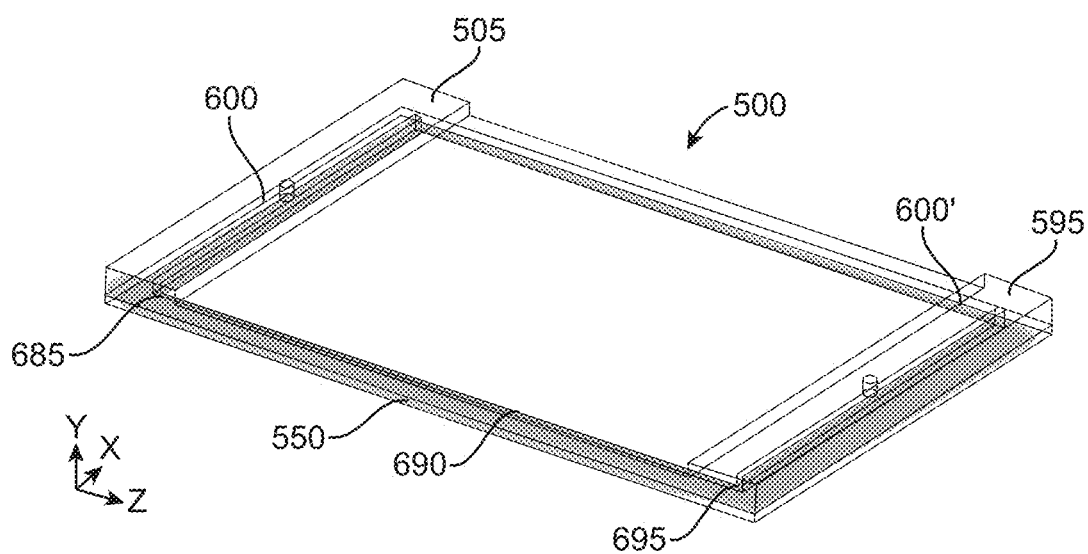
FIG. 18 is a perspective wireframe view of a type-delta (type-δ) microfluidic device according to an exemplary embodiment.

FIG. 18 is a perspective wireframe view of a type-δ microfluidic device 500 according to an exemplary embodiment. The type-δ microfluidic device 500 may be substantially similar to type-α microfluidic device 100 or the type-β microfluidic device 300 or the type-γ microfluidic device 300A; as such, like structures are similarly numbered, and some like structures are omitted for brevity. One difference between the type-δ microfluidic device 500 and the type-α microfluidic device 100 or the type-β microfluidic device 300 or the type-γ microfluidic device 300A may be a shape of the ports. Instead of a generally rectilinear shape as provided for the type-α microfluidic device 100 and the type-β microfluidic device 300 or the type-γ microfluidic device 300A, for the type-δ microfluidic device 500, the port of the inlet 600 and the outlet 600' may have a cylindrical shape. Like the type-β microfluidic device 300 or the type-γ microfluidic device 300A, the type-δ microfluidic device 500 may include a lack of tapering in the XZ plane of the inlet 600 and the outlet 600' (as compared to the inlet 200 and the outlet 200' of the type-α microfluidic device 100).

Any one or more features of the type-α microfluidic device 100, the type-β microfluidic device 300, the type-γ microfluidic device 300A, and the type-δ microfluidic device 500 may be combined in any combination without limitation. Any one or more features of the type-α microfluidic device 100, the type-β microfluidic device 300, the type-γ microfluidic device 300A, and the type-δ microfluidic device 500 may be omitted or duplicated without limitation.

Figure 19:
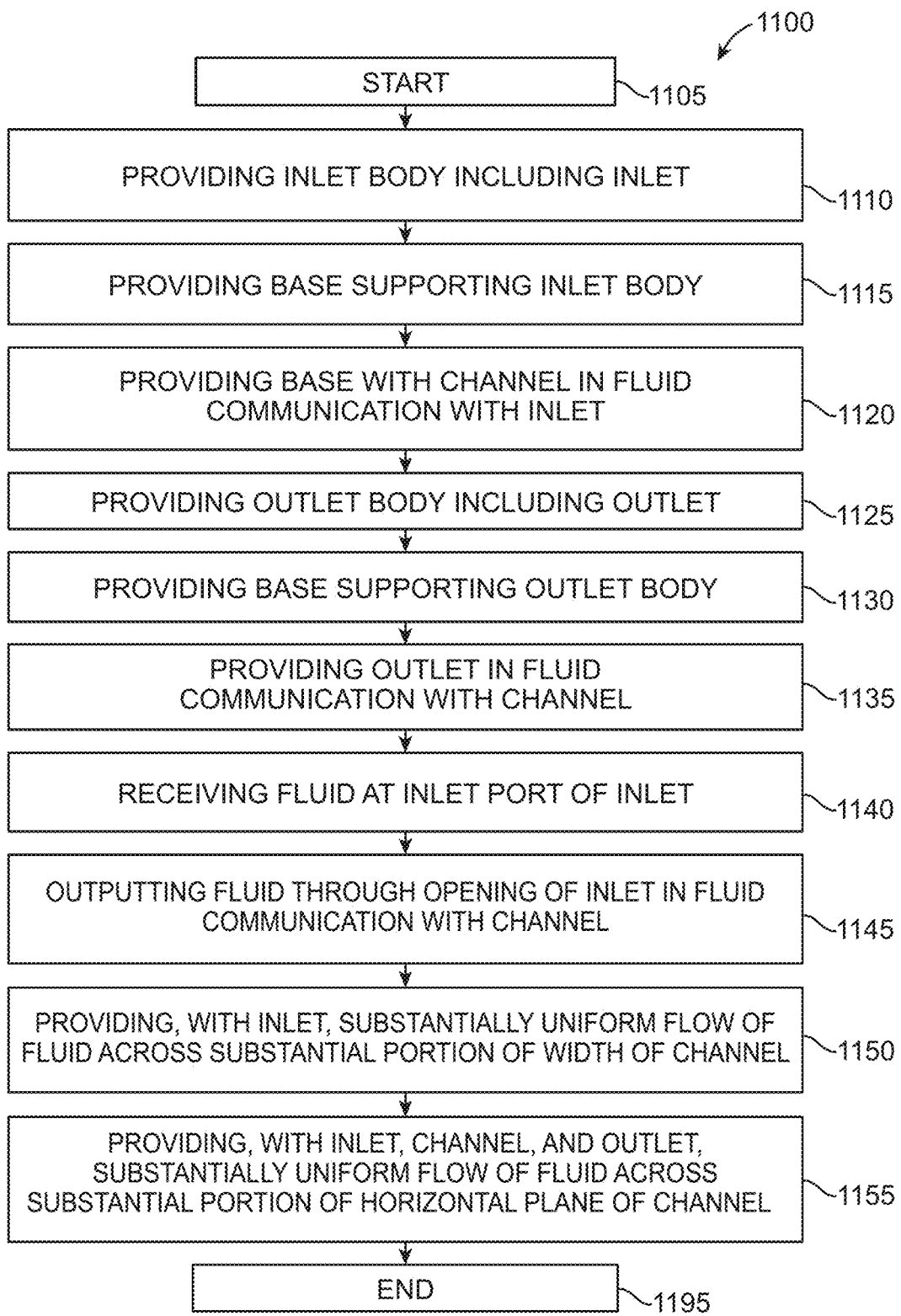
FIG. 19 is a diagram of a process according to an exemplary embodiment.

FIG. 19 is a diagram of a process 1100 (or method) according to an exemplary embodiment. Although the process 1100 below is described with reference to exemplary features of the type-α device 100, the process 1100 may be applied to any of the devices described above including the alternative type-α device 100A, the type-β device 300, the type-γ device 300A or the type-δ device 500. The process 1100 may include a start 1105 and an end 1195. The process 1100 may include providing an inlet body (e.g., 105) including an inlet (e.g., 200) (step 1110). The process 1100 may include providing a base (e.g., 150) supporting the inlet body (e.g., 105) (step 1115). The process 1100 may include providing the base (e.g., 150) with a channel (e.g., 290) in fluid communication with the inlet (e.g., 200) (step 1120). The process 1100 may include providing an outlet body (e.g., 195) including an outlet (e.g., 200') (step 1125). The process 1100 may include providing the base (e.g., 150) supporting the outlet body (e.g., 195) (step 1130). The process 1100 may include providing the outlet (e.g., 200') in fluid communication with the channel (e.g., 290) (step 1135). The process 1100 may include receiving the fluid at an inlet port (e.g., 205) of the inlet (e.g., 200) (step 1140). The process 1100 may include outputting the fluid through an opening (e.g., 240) of the inlet (e.g., 200) in fluid communication with the channel (e.g., 290) (step 1145). The process 1100 may include providing, with the inlet (e.g., 200), substantially uniform flow of the fluid across a substantial portion of a width (in the X-direction) of the channel (e.g., 290) (step 1150). The process 1100 may include providing, with the inlet (e.g., 200), the channel (e.g., 290), and the outlet (e.g., 200'), substantially uniform flow of the fluid across a substantial portion of a horizontal plane (the XZ plane) of the channel (e.g., 290) (step 1155), as demonstrated, for example, in at least FIGS. 4B, 5-8, 14, 15, 16A, 16B, 27 and 36, inclusive. One or more steps of the process 1100 may be rearranged, omitted or duplicated without limitation.

In some exemplary embodiments, the channel 290 may have a non-parallel plate structure. For example, between the inlet 200 and the outlet 200', the channel 290 may have two or more non-parallel walls. The channel 290 may have a shape of a truncated pyramid, i.e., a pyramid with the tip removed and having rectilinear cross-sections along the entire length in the Z-direction. An inlet of the channel 290 may have a rectilinear shape, an outlet of the channel 290 may have a rectilinear shape, and angled walls may be provided between the inlet and the outlet of the channel 290. The inlet 200 may be smaller or larger than the outlet 200'. For an exemplary embodiment with the channel 290 having a smaller inlet 200 and a larger outlet 200' and a rectilinear shape, at least two of the four walls defining the channel 290 may linearly increase in size from the inlet 200 to the outlet 200'. For an exemplary embodiment with the channel 290 having a larger inlet 200 and a smaller outlet 200' and a rectilinear shape, at least two of the four walls defining the channel 290 may linearly decrease in size from the inlet 200 to the outlet 200'. In some exemplary embodiments, all four walls of the rectilinear shape channel 290 may increase or decrease in size between the inlet 200 and the outlet 200'.

The channel 290 may have a non-rectilinear cross-sectional shape in the XY plane, such as an elliptical, circular, regular or irregular shape.

In one exemplary embodiment, the inlet 200 may have a structure similar to any of the inlets described hereinabove, i.e., type-α, type-β, type-γ, type-δ, or the like. An outlet of the channel may be a scaled up or scaled down version of the outlet 200'. For a truncated pyramidical channel 290 having rectilinear XY cross-sections, at least two of the four walls of the channel 290 may gradually increase or decrease in size. With such structure, when the inlet 200 is smaller than the outlet 200', the channel 290 may gradually and consistently increase in size across the Z-direction, and the inlet 200 may be configured to deliver substantially uniform flow to the entrance of the channel 290. The velocity profile of fluid flowing through the channel 290 substantially uniformly decreases as the fluid travels through the gradually and consistently larger channel 290 to the relatively large outlet 200'. Conversely, when the inlet 200 is larger than the outlet 200', the channel 290 may gradually and consistently decrease in size across the Z-direction, and the inlet 200 may be configured to deliver substantially uniform flow to the entrance of the channel 290. The velocity profile of fluid flowing through the channel 290 substantially uniformly increases as the fluid travels through the gradually and consistently smaller channel 290 to the relatively small outlet 200'. The walls of the channel 290 may be linear, curved or irregular in shape, which would have linear, curved or irregular changes in the velocity profile across the Z-direction of the channel 290. In an exemplary embodiment where a width of the channel 290 is less than ten times a height of the channel 290, with a non-parallel plate structure, the velocity across the width (Z-direction) of the channel would be substantially uniform except for a decrease by a relative change in cross-sectional area, assuming a constant volumetric flow rate.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although at least one exemplary embodiment is described as using a plurality of units to perform the exemplary process, it is understood that the exemplary processes may also be performed by one or plurality of modules.

The use of the terms "first", "second", "third" and so on, herein, are provided to identify various structures, dimensions or operations, without describing any order, and the structures, dimensions or operations may be executed in a different order from the stated order unless a specific order is definitely specified in the context.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein may be embodied in systems, apparatus, methods, and/or articles depending on the desired configuration. The embodiments set forth in the foregoing description do not represent all embodiments consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the embodiments described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other embodiments may be within the scope of the following claims.

What is claimed is:

1. A device for fluid transport, the device comprising:
an inlet body comprising an inlet, the inlet comprising an inlet port; and
a base supporting the inlet body, the base comprising a channel in fluid communication with the inlet,
wherein the inlet is configured to receive the fluid at an inlet port,
wherein the inlet is configured to output the fluid through an opening at a bottom portion of the inlet and in fluid communication with the channel, and
wherein a first ratio of a first distance to a second distance is substantially equal, to a cubic root of a second ratio between a first length dimension and a second length dimension of the inlet body, the first distance being measured from an entrance of the inlet port to a first position within the inlet body, the second distance being measured from the entrance of the inlet port to a second position within the inlet body, the first length dimension and the second length dimension each being measured along a direction orthogonal to a direction along which the first distance and the second distance are measured, and the first length dimension being measured at the first position and the second length dimension being measured at the second position.

2. The device of claim 1, wherein the at least one dimension is one of a vertical plane and a horizontal plane.

3. The device of claim 1, wherein the inlet, the channel, and the outlet are configured to provide substantially uniform flow of the fluid across a substantial portion of a horizontal plane of the channel.

4. The device of claim 1, wherein the inlet, the channel, and the outlet are configured to provide substantially uniform flow of the fluid through a substantial portion of a cubic area within the channel.

5. The device of claim 1, wherein the device is a microfluidic device, and the channel is a microfluidic channel.

6. The device of claim 1, wherein the inlet body, the base, and the outlet body form a unitary body.

7. The device of claim 1, wherein the inlet is a single inlet of the device, the channel is a single channel of the device, and the outlet is a single outlet of the device.

8. The device of claim 1, wherein a ratio of a cross-sectional area of the inlet port to a cross-sectional area of an entrance of the channel is about 1 to about 7.5.

9. The device of claim 1, wherein a ratio of a cross-sectional area of the inlet port to a cross-sectional area of the opening is about 1 to about 50.

10. The device of claim 1, wherein a ratio of a cross-sectional area of the opening to a cross-sectional area of an entrance of the channel is about 6.67 to about 1.

11. The device of claim 1, wherein a ratio of a depth of the inlet port to a depth at an end of the inlet is about 1 to about 2.

12. The device of claim 1, wherein a ratio of a depth of the inlet port to a depth at an end of the inlet to a height at or near the inlet port is about 1 to about 2 to about 3.

13. The device of claim 1, wherein a ratio of a height of the channel to a depth of the inlet port to a depth at an end of the inlet to a height at or near the inlet port is about 1 to about 4 to about 8 to about 12.

14. The device of claim 1, wherein a ratio of a width to a depth of the opening in a horizontal plane is about 25 to about 1.

15. The device of claim 1, wherein a ratio of a width to a height of the channel in a vertical plane is about 180 to about 1.

16. The device of claim 1, wherein a cross-sectional shape of at least one side of the inlet and/or the outlet in a horizontal plane has a bowtie shape or a Venturi shape, the at least one side facing away from the channel.

17. The device of claim 16, wherein both sides of the inlet and/or the outlet in the horizontal plane have a bowtie shape or a Venturi shape.

18. The device of claim 1, wherein a cross-sectional shape of the inlet and/or the outlet in a vertical plane is a bow shape or a bracket shape.

19. The device of claim 1, wherein the base comprises a parallel plate structure.

20. A method for fluid transport, the method comprising:
providing an inlet body comprising an inlet;
providing a base supporting the inlet body, the base comprising a channel in fluid communication with the inlet;
receiving the fluid at an inlet port of the inlet; and
outputting the fluid through an opening of the inlet at a bottom portion of the inlet and in fluid communication with the channel, wherein a first ratio of a first distance to a second distance is substantially equal, to a cubic root of a second ratio between a first length dimension and a second length dimension of the inlet body, the first distance being measured from an entrance of the inlet port to a first position within the inlet body, the second distance being measured from the entrance of the inlet port to a second position within the inlet body, the first length dimension and the second length dimension each being measured along a direction orthogonal to a direction along which the first distance and the second distance are measured, and the first length dimension being measured at the first position and the second length dimension being measured at the second position.

\* \* \* \* \*